US012770218B2

(12) United States Patent
Kuckreja et al.

(10) Patent No.: US 12,770,218 B2
(45) Date of Patent: Oct. 20, 2026

(54) SYSTEM AND METHOD OF GROUNDED LARGE VISION-LANGUAGE MODEL FOR REMOTE SENSING

(71) Applicant: Mohamed bin Zayed University of Artificial Intelligence, Abu Dhabi (AE)

(72) Inventors: Kartik Kuckreja, Abu Dhabi (AE); Muhammad Sohail Danish, Abu Dhabi (AE); Muzammal Naseer, Abu Dhabi (AE); Salman Khan, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 204 days.

(21) Appl. No.: 18/793,352

(22) Filed: Aug. 2, 2024

(65) Prior Publication Data

US 2026/0038084 A1 Feb. 5, 2026

(51) Int. Cl.
*G06T 3/4046* (2024.01)
*G06T 3/4007* (2024.01)

(52) U.S. Cl.
CPC .......... *G06T 3/4046* (2013.01); *G06T 3/4007* (2013.01)

(58) Field of Classification Search
CPC ............................ G06T 3/4007; G06T 3/4046
USPC .......................................................... 382/155
See application file for complete search history.

(56) References Cited

U.S. PATENT DOCUMENTS

2025/0196347 A1* 6/2025 Riedmiller ............. B25J 9/1661
2025/0251985 A1* 8/2025 Mancuso .............. G06F 9/4843
2025/0390532 A1* 12/2025 Buch ....................... G06F 16/75

FOREIGN PATENT DOCUMENTS

CN 115761222 B 11/2023
CN 117036967 A 11/2023
WO WO-2025160388 A1 * 7/2025 ............... G06N 7/01
WO WO-2025255236 A1 * 12/2025 ............. G06V 10/82

OTHER PUBLICATIONS

Utkarsh Mall, et al.; "Remote sensing vision-language foundation models without annotations via ground remote alignment", arXiv, Dec. 12, 2023.

* cited by examiner

*Primary Examiner* — Behrooz M Senfi
(74) *Attorney, Agent, or Firm* — Oblon, McClelland, Maier & Neustadt, L.L.P.

(57) ABSTRACT

A unified framework system and method for a computer implemented artificial intelligent assistant to perform multiple tasks for remote sensing, includes a task input field for receiving a task identity, a global image encoder configured to receive a remote-sensing image and a user query and encode patch-level tokens at a high resolution via interpolation positional encodings, an MLP adapter configured to receive the patch-level tokens and adapt the tokens to language space, and a large language model configured to generate natural language responses interleaved with corresponding object locations based on the language space and task specific prompts. The global image encoder further includes a region input field for receiving region location parameters. The framework system is configured to switch based on the input task identity between different types of remote sensing visual interpretation tasks.

20 Claims, 47 Drawing Sheets

SYSTEM AND METHOD OF GROUNDED LARGE VISION-LANGUAGE MODEL FOR REMOTE SENSING

STATEMENT REGARDING PRIOR DISCLOSURE BY THE INVENTORS

Aspects of this technology are described in an article Kuckreja, Kartik, Muhammad Sohail Danish, Muzammal Naseer, Abhijit Das, Salman Khan, and Fahad Shahbaz Khan. "Geochat: Grounded large vision-language model for remote sensing." *arXiv preprint arXiv:*2311.5826 (2023), and is herein incorporated by reference in its entirety.

BACKGROUND

Technical Field

The present disclosure is directed to a visual language machine learning model, method and system for remote sensing that offers multitask conversational capabilities with high-resolution remote sensing images. The model, method and system can accept region inputs to hold region-specific dialogue. The model, method and system can visually ground objects in its responses by referring to their spatial coordinates.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A Large Vision-Language Model (VLM) is a type of advanced artificial intelligence system that has the capability to allow users to hold a dialogue about given visual content. In the natural image domain, the abundance of aligned image-text data sourced from web imagery or manual annotations facilitate effective self-supervised vision-language modeling, as demonstrated by multimodal GPT-4 and open-source initiatives like LLaVA. GPT-4 is described in OpenAI. Gpt-4 technical report, 2023, incorporated herein by reference in its entirety. These vision-language models (VLMs), developed through generative pretraining and instruction-tuning, exhibit robust zero-shot task completion across various user-oriented multimodal tasks. The resulting capabilities have led to the development of versatile multimodal conversational assistants with broad applications in real-world scenarios. A model for generic remote sensing (RS) vision-language tasks is described in Yuan Hu, Jianlong Yuan, Congcong Wen, Xiaonan Lu, and Xiang Li. Rsgpt: A remote sensing vision language model and benchmark. *arXiv preprint arXiv:*2307.15266, 2023.

Large Vision-Language Models. A conventional architecture of instruction-following Vision Language Models (VLMs) includes utilizing a pre-trained visual backbone to encode visual data, a large language model for interpreting user instructions and generating responses, and a vision-language cross-modal connector, e.g., a linear projection layer or an multilayer perceptron (MLP), for fusing visual information with language models. A conventional vision-language model is described in Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An image is worth 16×16 words: Transformers for image recognition at scale. *ICLR,* 2021; Haotian Liu, Chunyuan Li, Qingyang Wu, and Yong Jae Lee. Visual instruction tuning. *arXiv preprint arXiv:*2304.08485, 2023; and Haotian Liu, Chunyuan Li, Yuheng Li, and Yong Jae Lee. Improved baselines with visual instruction tuning. *arXiv preprint arXiv:*2310.03744, 2023. The results achieved with VLMs show great promise; for example, LLaVA, Instruct-BLIP, Otter and MiniGPT-4 show remarkable gains in language instruction following and visual reasoning ability for natural scenes. A conventional vision-language model with instruction tuning is described in Haotian Liu, et al., *arXiv preprint arXiv:*2304.08485, 2023; Wenliang Dai, Junnan Li, Dongxu Li, Anthony Meng Huat Tiong, Junqi Zhao, Weisheng Wang, Boyang Li, Pascale Fung, and Steven Hoi. Instructblip: Towards general-purpose vision-language models with instruction tuning, 2023; Bo Li, Yuanhan Zhang, Liangyu Chen, Jinghao Wang, Jingkang Yang, and Ziwei Liu. Otter: A multi-modal model with in-context instruction tuning. *arXiv preprint arXiv:*2305.03726, 2023. More recent studies have shown that these models can be adapted to other domains such as videos and biomedical imaging. A conventional model for vision understanding is described in Muhammad Maaz, Hanoona Rasheed, Salman Khan, and Fahad Shahbaz Khan. Video-chatgpt: Towards detailed video understanding via large vision and language models. *arXiv preprint arXiv:*2306.05424, 2023; Omkar Thawkar, Abdelrahman Shaker, Sahal Shaji Mullappilly, Hisham Cholakkal, Rao Muhammad Anwer, Salman Khan, Jorma Laaksonen, and Fahad Shahbaz Khan. Xraygpt: Chest radiographs summarization using large medical vision-language models. *arXiv:*2306.07971, 2023.

However, general-domain VLMs designed for natural images, exhibit poor performance when presented with remotely sensed (RS) visual imagery. The performance disparity arises primarily from the distinct nature of content found in remote sensing image-text pairings compared to the publicly available web data. For example, to handle high-resolution RS imagery with diverse scale changes across categories and many small objects, region-level reasoning is necessary alongside holistic scene interpretation. Furthermore, the lack of domain-specific multimodal instruction following data as well as strong back-bone models for RS make it hard for the models to align their behavior with user queries. As a result, general-domain VLMs can provide inaccurate information or hallucinate when presented with spatial images from RS sensors. Although there has been significant progress in the field of remote sensing visual question answering (VQA), early methods have framed the task as a classification problem. A conventional visual question answering model for remote sensing is described in Zhenghang Yuan, Lichao Mou, Qi Wang, and Xiao Xiang Zhu. From easy to hard: Learning language-guided curriculum for visual question answering on remote sensing data. *IEEE Transactions on Geoscience and Remote Sensing,* 60: 1-11, 2022; and Zixiao Zhang, Licheng Jiao, Lingling Li, Xu Liu, Puhua Chen, Fang Liu, Yuxuan Li, and Zhicheng Guo. A spatial hierarchical reasoning network for remote sensing visual question answering. *IEEE Transactions on Geoscience and Remote Sensing,* 61:1-15, 2023. Here, the VQA model chooses answers from predetermined responses found in the training data. This limits their applicability to open-ended answer generation and instruction-following.

Remote Sensing VLMs. The application of generalized VLMs in remote sensing is relatively sparse. The majority of research so far has neglected the semantic understanding of the items and their relationships towards a deep visual comprehension. Beyond merely identifying the objects in an image, vision-language models are also capable of generating natural language descriptions of the image and inferring the connections between the objects. This makes them more appropriate for tasks like text-based image retrieval, captioning images, and answering visual questions that call for both visual and linguistic knowledge. Although there has been progress in vision language models for remote sensing tasks, such as image captioning, zero-shot classification and visual question answering, these models can only perform a specific task they are trained for, lack conversational capability and do not possess generic semantic knowledge about the remote sensing images. For background on conventional VLMs in remote sensing see Usman Zia, MMohsin Riaz, and Abdul Ghafoor. Transforming remote sensing images to textual descriptions. *International Journal of Applied Earth Observation and Geoinformation,* 108:102741, 2022; Xiang Li, CongcongWen, Yuan Hu, and Nan Zhou. Rs-clip: Zero shot remote sensing scene classification via contrastive vision-language supervision. *International Journal of Applied Earth Observation and Geoinformation,* 124: 103497, 2023; Christel Chappuis, Val'erie Zermatten, Sylvain Lobry, Bertrand Le Saux, and Devis Tuia. Prompt-rsvqa: Prompting visual context to a language model for remote sensing visual question answering. In *Proceedings of the IEEE/CVF Conference on Computer Vision and Pattern Recognition*, pages 1372-1381, 2022. A major gap exists in the remote sensing domain towards developing general-purpose models to solve all tasks together, while also maintaining conversation abilities. While RSGPT is an initial effort that has shown good conversation ability along with solving multiple tasks, it requires finetuning the model for each task separately, which makes it cumbersome and not generalizable. Further, RSGPT cannot work for region-level reasoning or visual grounding.

Accordingly, it is one object of the present disclosure to provide methods and systems for unification of multiple image and region-level reasoning tasks for RS imagery within a single pipeline. A further object is to leverage an existing object detection dataset to create short descriptions of images, followed by using Vicuna to create chatbot conversations using the generated text alone. Leveraging the dataset, a vision language model is finetuned to create the remote sensing-domain vision-language model. The fine-tuned model retains the conversation and instruction following abilities and extend its domain-knowledge to remote sensing tasks.

To facilitate model training and evaluation, an object of the present disclosure is to use 7 evaluation protocols for conversation grounding in RS, as well as a suite of tasks to allow comparisons with future efforts.

SUMMARY

An aspect of the present disclosure is a unified framework system for a computer implemented artificial intelligent assistant to perform multiple tasks for remote sensing, that can include a task input field for receiving a task identity; a global image encoder configured to receive a remote-sensing image and a user query and encode patch-level tokens at a high resolution via interpolation positional encodings; an MLP adapter configured to receive the patch-level tokens and adapt the patch-level tokens to a language space; and a large language model configured to generate natural language responses interleaved with corresponding object locations based on the language space and task specific prompts, wherein the global image encoder further includes a region input field for receiving region location parameters, and wherein the framework system is configured to switch based on the input task identity between different types of remote sensing visual interpretation tasks.

In a further aspect of the present disclosure, a non-transitory computer-readable storage medium including computer executable instructions, wherein the instructions, when executed by a computer, cause the computer to perform a method for performing multiple tasks for remote sensing, by a unified framework system, the method can include inputting a remote-sensing image and a user query; receiving a task identity; encoding, by a global image encoder, patch-level tokens at a high resolution via interpolation positional encodings using the image and user query; receiving, by an MLP adapter, the patch-level tokens and adapting the tokens to language space; and generating, by a large language model, natural language responses interleaved with corresponding object locations based on the language space and task specific prompts, inputting, by the global image encoder, region location parameters; and switching, based on the received task identity, between different types of remote sensing visual interpretation tasks.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
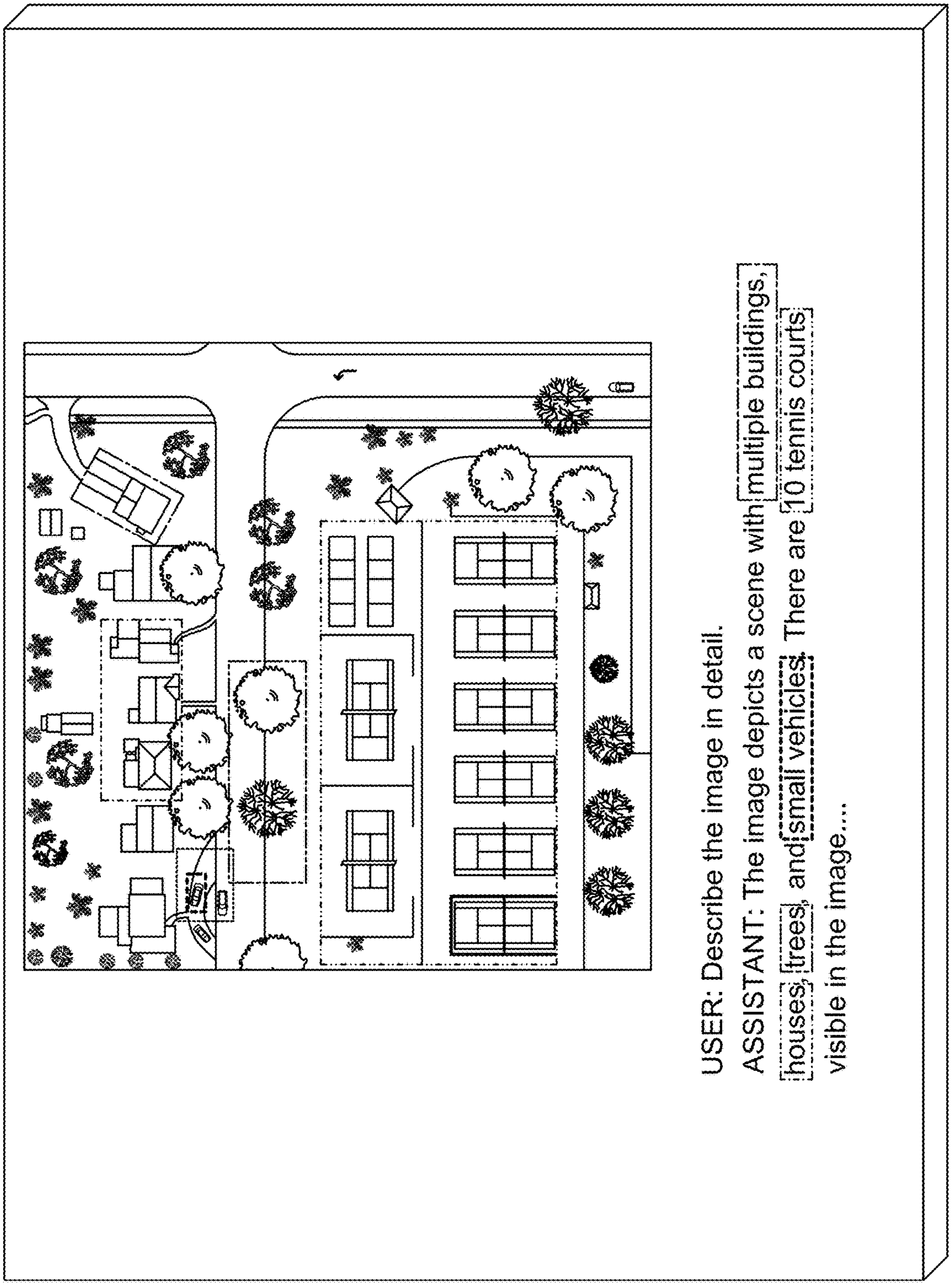
FIGS. 1A-1F are user interfaces that illustrate multiple tasks that can be accomplished by the disclosed unified framework for remote-sensing image comprehension, in accordance with an exemplary aspect of the disclosure.
Figure 1B:
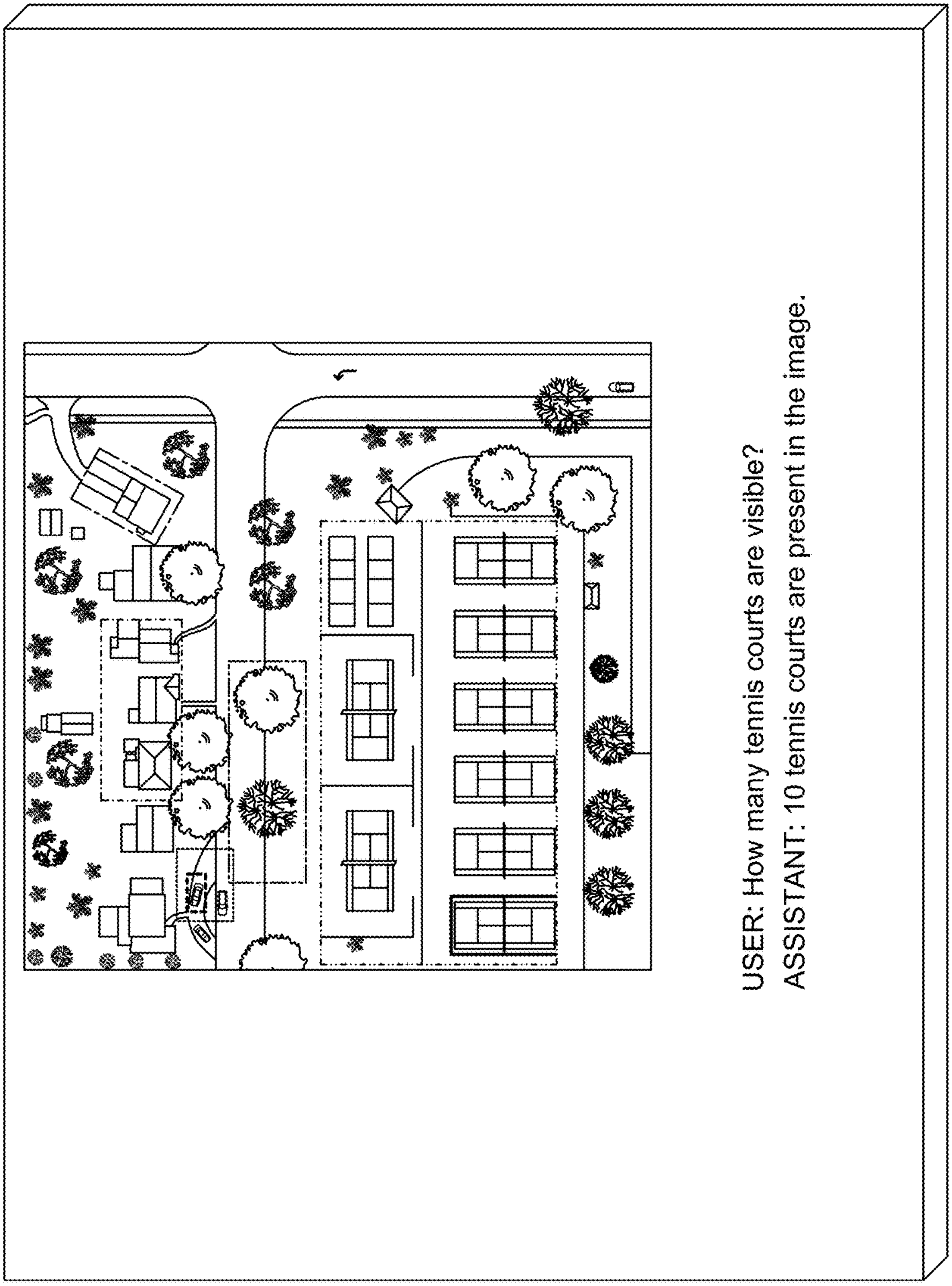
Figure 1C:
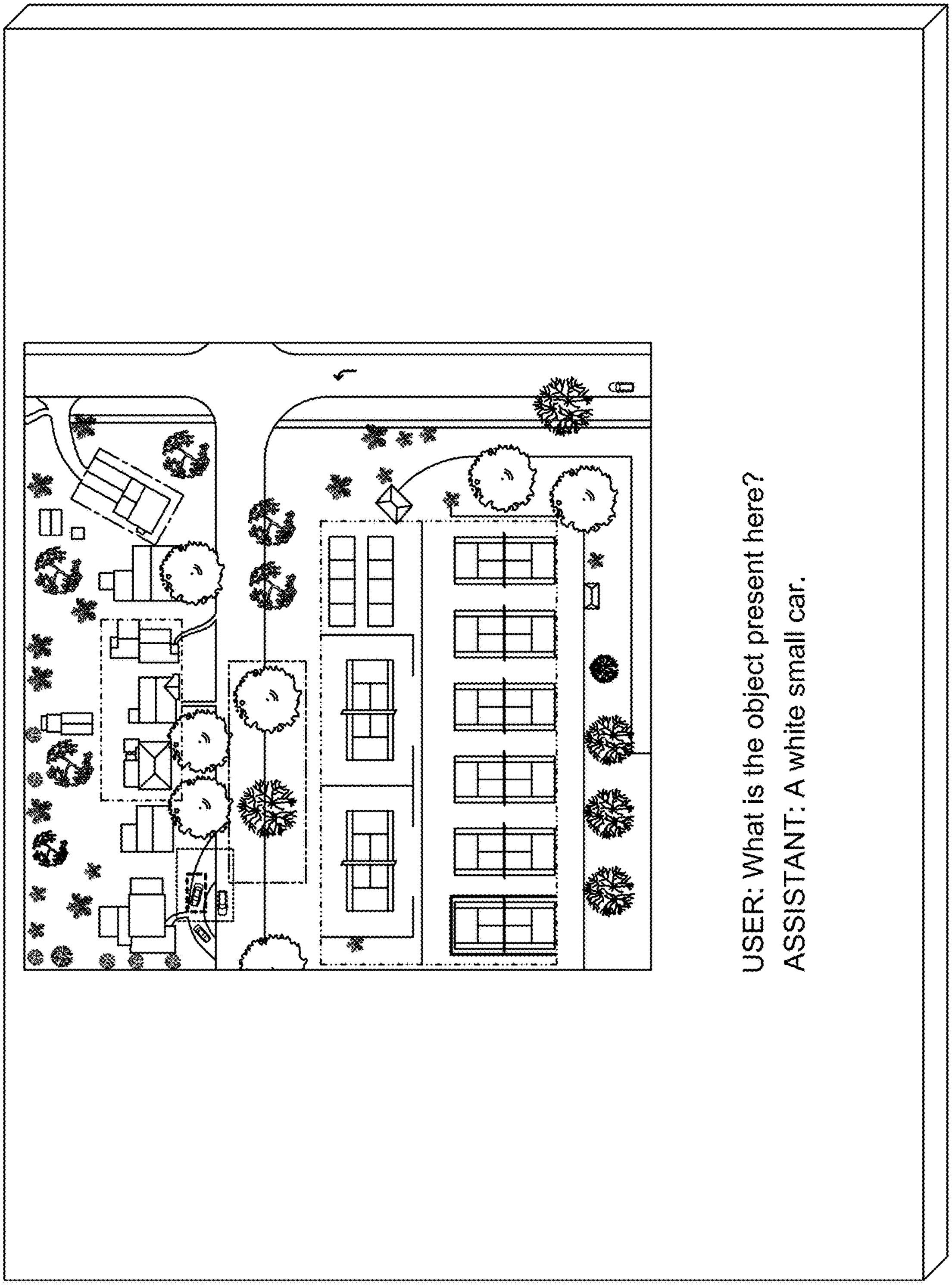
Figure 1D:
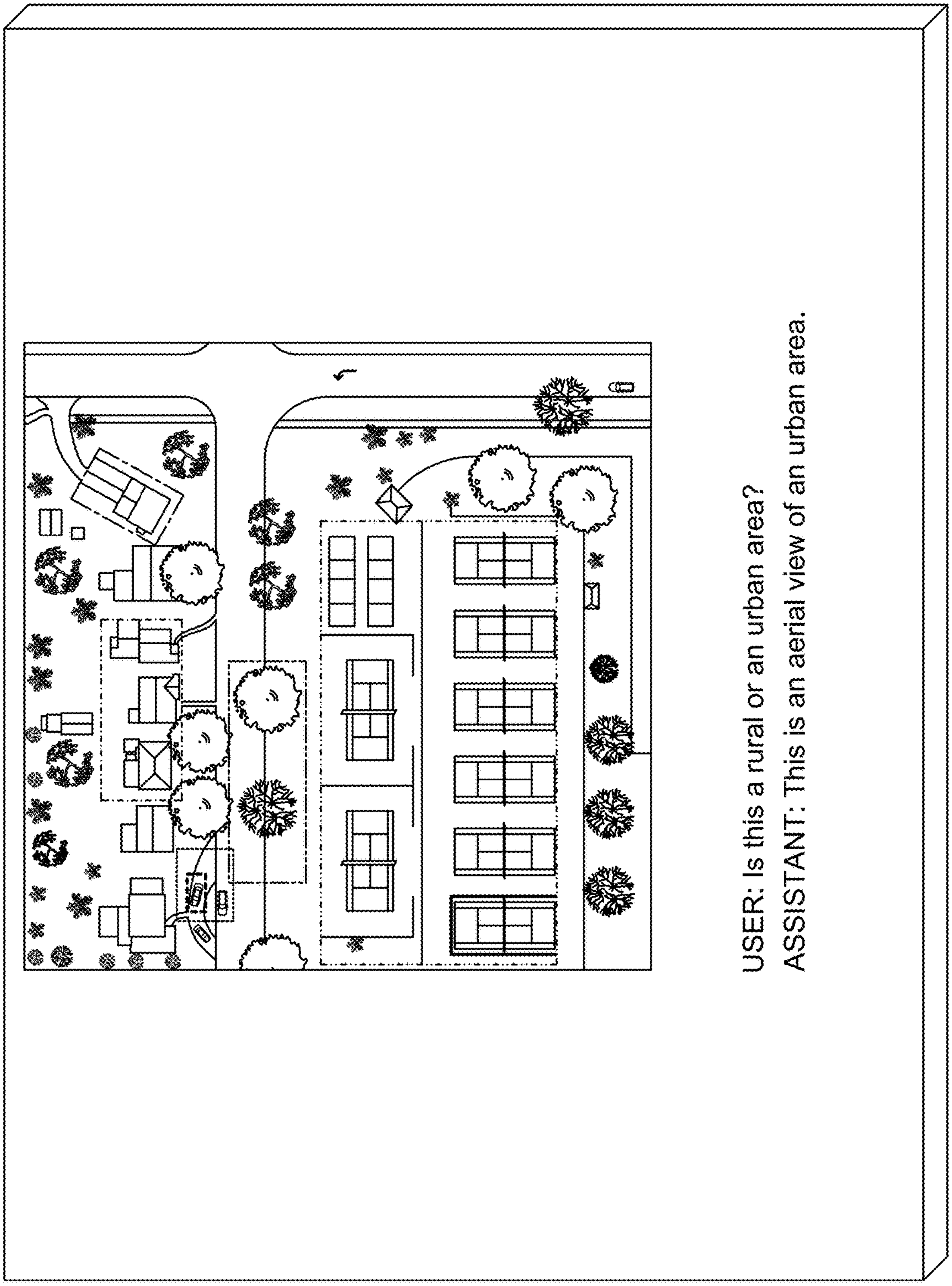
Figure 1E:
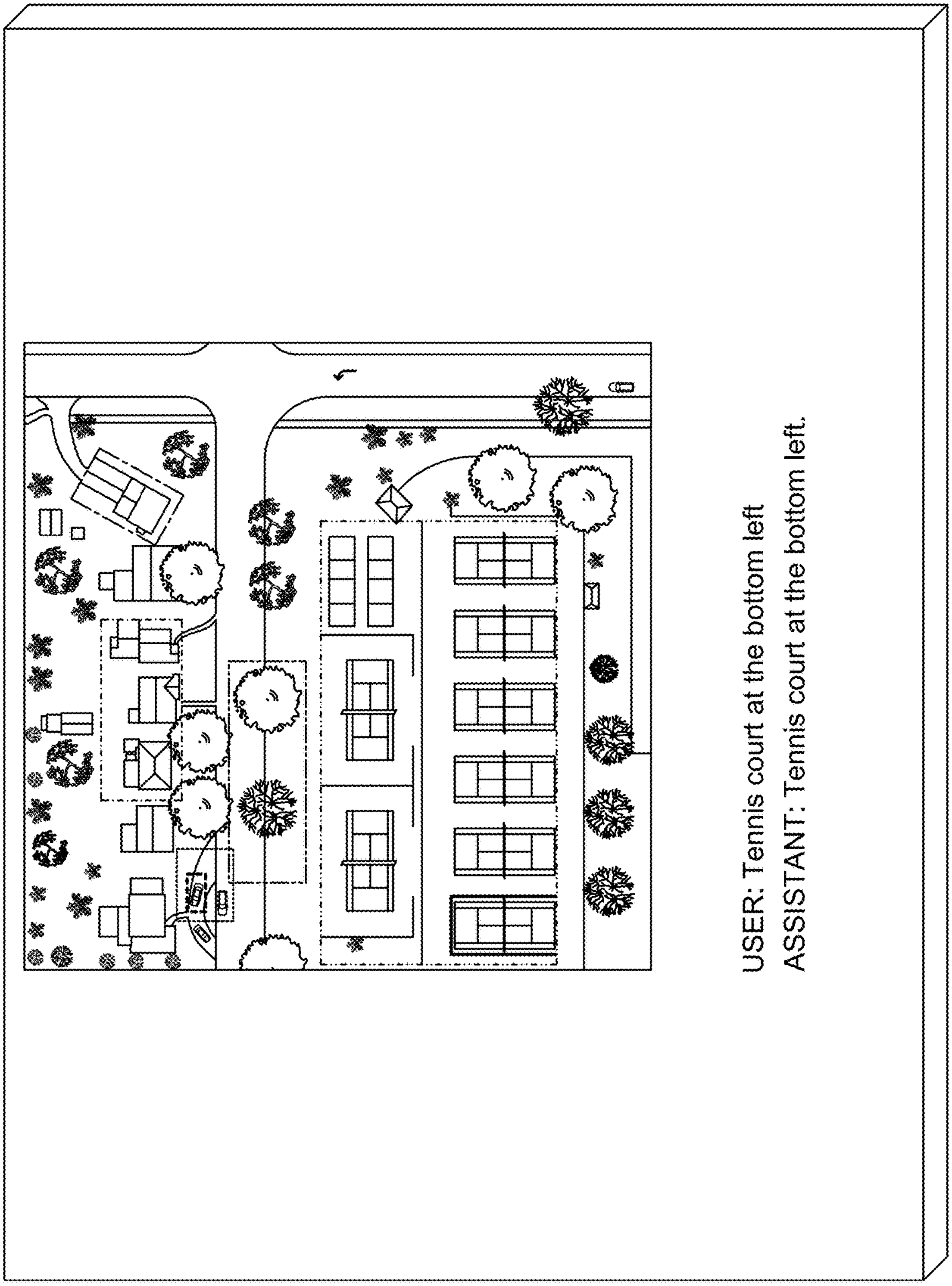

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and method for a remote sensing VLM that offers multitask conversational capabilities with high-resolution RS images. Specifically, an aspect is a VLM that can not only answer image-level queries but also accepts region inputs to hold region-specific dialogue. Furthermore, an aspect is a VLM that can visually ground objects in its responses by referring to their spatial coordinates. To address the lack of domain-specific datasets, an aspect is a VLM that can generate a novel RS multimodal instruction-following dataset by extending image-text pairs from existing diverse RS datasets.

The system and method extends multimodal instruction-tuning to the remote sensing domain for training a multitask conversational assistant. However, remote-sensing domain lacks a multimodal instruction-tuning conversational dataset. The system and method uses Vicuna-v1.5 and an automated pipeline to generate diverse remote sensing multimodal instruction-following data comprising of nearly 318 k instructions. For background on instruction following and conversational assistant generation, see Chunyuan Li, Cliff Wong, Sheng Zhang, Naoto Usuyama, Haotian Liu, Jianwei Yang, Tristan Naumann, Hoifung Poon, and Jianfeng Gao. Llava-med: Training a large language-and-vision assistant for biomedicine in one day. *arXiv preprint arXiv:*2306.00890, 2023; Haotian Liu et al., Visual instruction tuning, 2023; Deyao Zhu, Jun Chen, Xiaoqian Shen, Xiang Li, and Mohamed Elhoseiny. Minigpt-4: Enhancing vision-language understanding with advanced large language models. *arXiv preprint arXiv:*2304.10592, 2023; and Wei-Lin Chiang, Zhuohan Li, Zi Lin, Ying Sheng, Zhanghao Wu, Hao Zhang, Lianmin Zheng, Siyuan Zhuang, Yonghao Zhuang, Joseph E. Gonzalez, Ion Stoica, and Eric P. Xing. Vicuna: An open-source chatbot impressing gpt-4 with 90%* chatgpt quality, 2023, each incorporated herein by reference in their entirety. Image-text pairs are created from various existing remote sensing datasets developed for diverse tasks. These includes LRBEN for VQA, NWPU-RESISC-45 for scene classification and SAMRS for object detection. Conventional approaches to remote sensing are described in Sylvain Lobry, Diego Marcos, Jesse Murray, and Devis Tuia. Rsvqa: Visual question answering for remote sensing data. *IEEE Transactions on Geoscience and Remote Sensing,* 58 (12):8555-8566, 2020; Gong Cheng, Junwei Han, and Xiaoqiang Lu. Remote sensing image scene classification: Benchmark and state of the art. *Proceedings of the IEEE,* 105(10):1865-1883, 2017; and Di Wang, Jing Zhang, Bo Du, Dacheng Tao, and Liangpei Zhang. Scaling-up remote sensing segmentation dataset with segment anything model. In *arxiv,* 2023, each incorporated herein by reference in their entirety.

The system and method of the present disclosure unify multiple image and region-level reasoning tasks for RS imagery within a single pipeline. The single pipeline is achieved via distinct task tokens that help suitably direct the model's responses according to user requirements. In addition, the system and method uses spatial location representations in its inputs to seamlessly reason about local regions and can also generate object locations in its responses to visually ground objects. This enables a diverse set of tasks including referring expression detection, image/region captioning, scene classification, natural language conversations and VQA, besides visually grounded conversations.

Figure 1F:
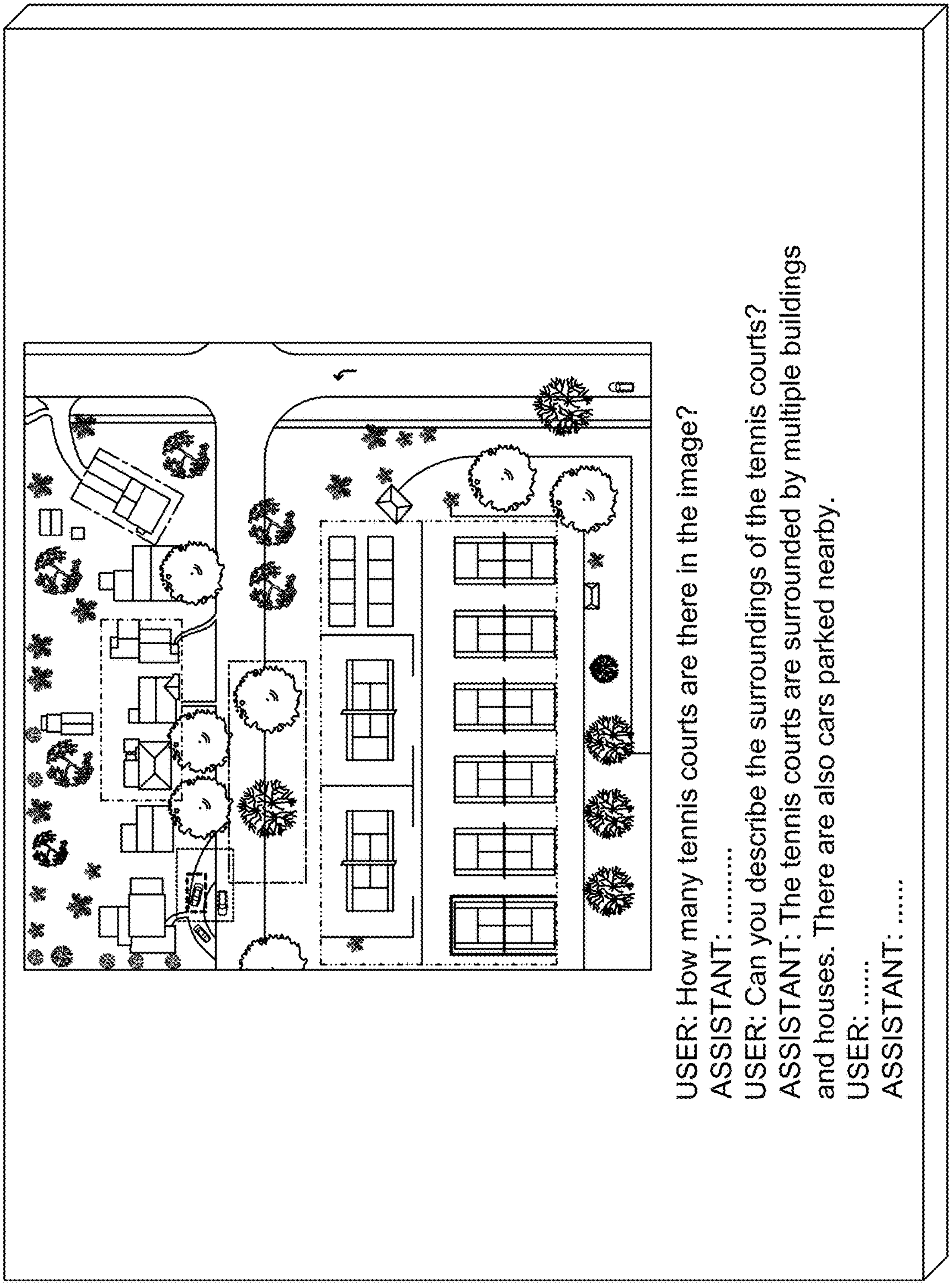

FIGS. 1A-1F include user interfaces that illustrate multiple tasks that can be accomplished by the disclosed unified framework system for remote-sensing image comprehension, with grounding capability. Given specific task tokens and user queries, the model can generate visually grounded responses (text with corresponding object locations—shown in FIG. 1A), visual question answering on images and regions (FIG. 1B and FIG. 1C, respectively) as well as scene classification (FIG. 1D), referring expression (FIG. 1E) and normal natural language conversations (FIG. 1F).

Aspects of the model are highlighted as follows.

RS multimodal instruction following dataset. An aspect is a data generation pipeline, to leverage an existing object detection dataset to create short descriptions of the images, followed by using Vicuna-v1.5 to create conversations using the generated text alone. Vicuna-v1.5 is described in Di Wang et al. *arxiv,* 2023, incorporated herein by reference. A further aspect is visual question-answering and scene classification abilities using their corresponding datasets. A visual question-answering dataset is introduced. This results in a total of 318 k instruction pairs for RS domain.

GeoChat. Leveraging the dataset, LLaVA-1.5 is finetuned to create the remote sensing-domain vision-language model—GeoChat. LLaVA-1.5 is described in Haotian Liu, Chunyuan Li, Yuheng Li, and Yong Jae Lee. Improved baselines with visual instruction tuning. *arXiv preprint arXiv:*2310.03744, 2023 [same question re: full citation]A LoRA fine-tuning is efficient and avoids forgetting the necessary context embedded in fully-tuned LLaVA model, whose MLP projection is trained to align images into the word embedding space of the LLM (Vicuna-v1.5). LoRA is described in Edward J Hu, Yelong Shen, Phillip Wallis, Zeyuan Allen-Zhu, Yuanzhi Li, Shean Wang, Lu Wang, and Weizhu Chen. LoRA: Low-rank adaptation of large language models. In *International Conference on Learning Representations,* 2022, each incorporated herein by reference in their entirety. LoRA is a strategy which freezes the pretrained model weights, in this case LLaVA-1.5, and injects trainable rank decomposition matrices with trainable parameters. This allows GeoChat to retain the conversation and instruction following abilities of LLaVA and extend its domain-knowledge to remote sensing tasks.

Due to a lack of evaluation benchmarks, an evaluation benchmark is created to assess the capability of existing VLMs on remote-sensing conversations. To this end, evaluation protocols are set up for conversation grounding in RS, as well as to setup a suite of tasks to allow comparisons with future efforts in this direction. Various supervised as well as zero-shot evaluations are used for different remote sensing tasks, including image captioning, visual question answering and scene classification to demonstrate the generalizability of GeoChat conversational VLM.

GeoChat: Grounded Remote Sensing VLM

Visually grounded conversations for remote sensing aim to generate textual responses interleaved with corresponding object locations. Further, a user can also provide visual prompts (e.g., a bounding box) besides natural language questions, and the model can answer questions about the specified Region of Interest (RoI). Such seamless interplay between visual and language modalities necessitate a deep comprehension of linguistic constructions that denote particular objects or elements in a visual scene.

As mentioned above, GeoChat is capable of holding visually grounded conversations about remotely sensed images. By construction, GeoChat can address not only the challenging task of visually grounded conversations, but can also perform a spectrum of other spatial reasoning tasks that span varying levels of granularity in visual imagery understanding e.g., image/region captioning, referring object detection and image/region-level conversations about remotely sensed images. The tasks possible with GeoChat are outlined below.

a) Image-Level Conversation Tasks. In this task, GeoChat processes an image x and a user text query q without any specific spatial coordinates in its inputs or outputs. The goal is to perform conversation-based tasks at a holistic level with image-wide context, such as visual question answering (VQA), scene classification and image captioning.

b) Region-Level Conversation Tasks. This task involves providing spatial box locations b in the input to GeoChat besides x and q. Region locations b guide the model's attention to specific regions within the image, so that the model can perform tasks such as region-level captioning, region-specific VQA or multi-turn conversation.

c) Grounded Conversation Tasks. With the use of special tokens, termed as task-specification tokens t, GeoChat can be guided to provide object locations at different granularities, while maintaining conversation abilities. Object locations help in tasks including grounded image captioning/conversation, object grounding and referring expression detection.

1. GeoChat Architecture

Figure 2A:
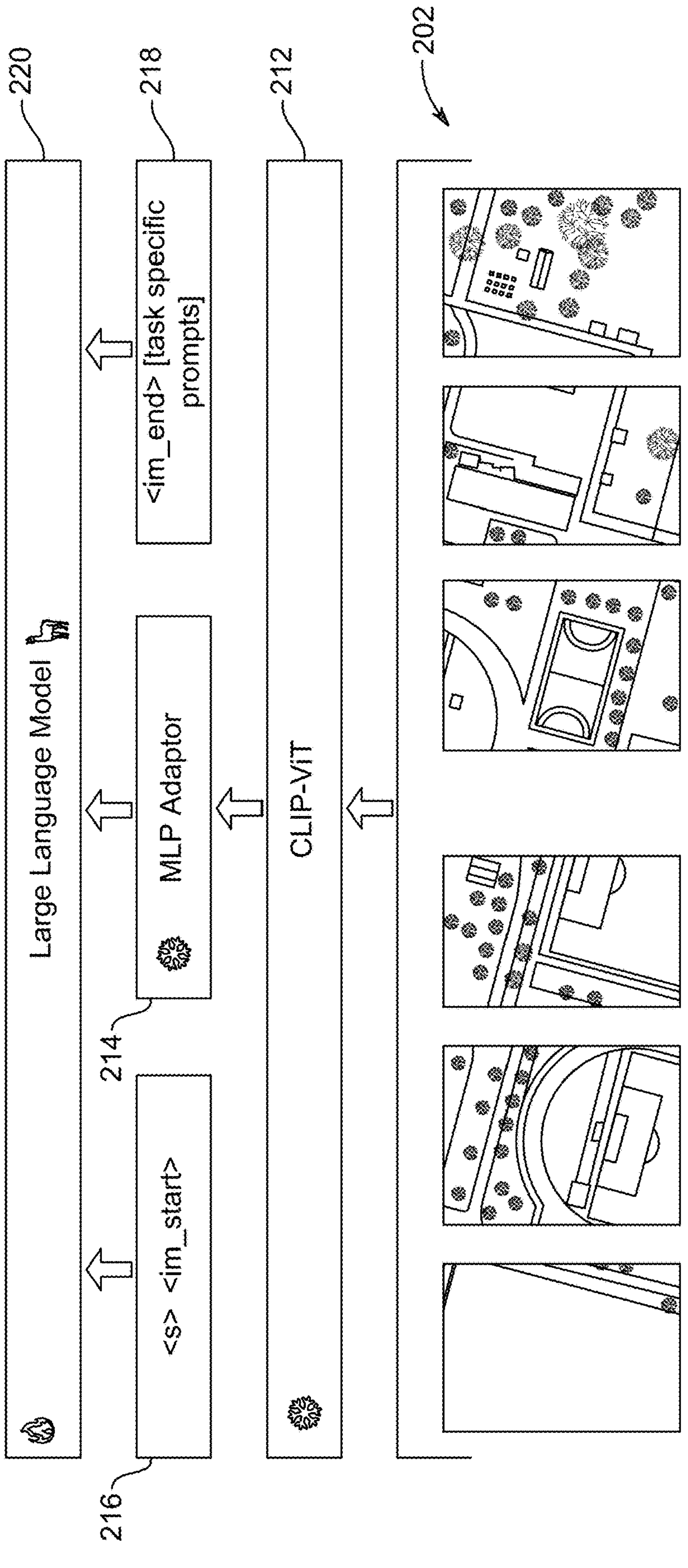
FIGS. 2A-2F illustrate an architecture for a grounded large vision-language model for remote sensing that can perform multiple tasks including scene classification, image/region captioning, VQA and grounded conversations, in accordance with an exemplary aspect of the disclosure.
Figure 2B:
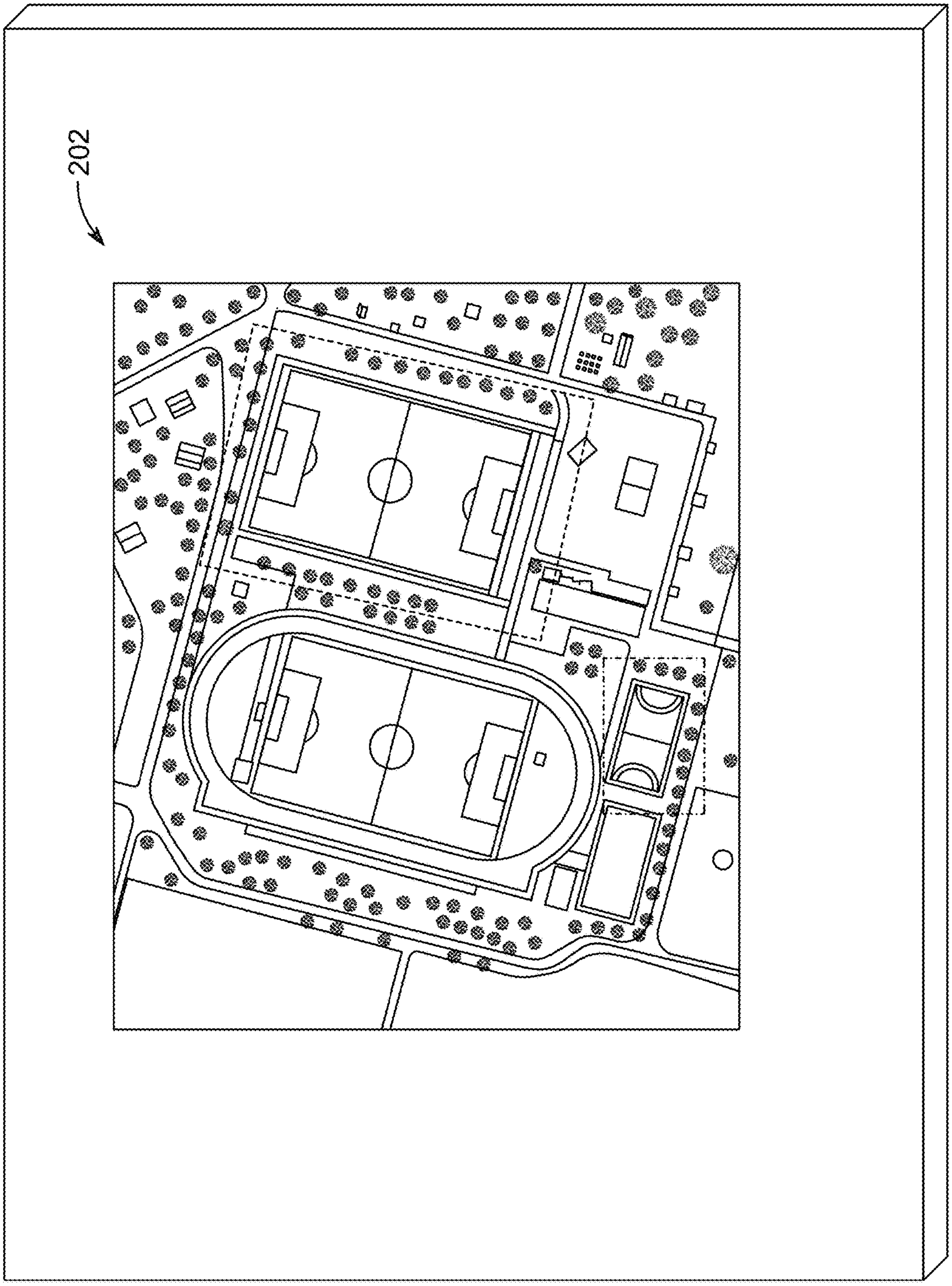

FIGS. 2A-2F illustrate an architecture for a grounded large vision-language model for remote sensing that can perform multiple tasks including scene classification, image/region captioning, VQA and grounded conversations. Referring to FIG. 2A, given an image 202 input together with a user query 204, a visual backbone 212 is first used to encode patch-level tokens at a higher resolution via interpolating positional encodings. A multi-layer perceptron (MLP 214) is used to adapt vision-tokens to language space suitable for input to a Large Language Model (220).

Figure 3:
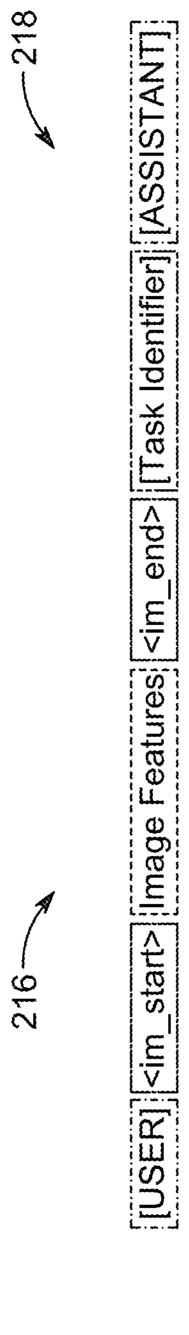
FIG. 3 is multi-task instruction template, in accordance with an exemplary aspect of the disclosure.

FIG. 3 is multi-task instruction template. Besides visual inputs 202, region locations 216 can also be input to the model together with task-specific prompts 218 that specify the desired task required by the user. Given this context, the LLM 220 can generate natural language responses interleaved with corresponding object locations.

In an embodiment, GeoChat has an architecture that, at a high level, is based on LLaVA-v1.5, which consists of three core components, i) Global Image encoder, ii) an MLP adaptor (two linear layers) and iii) LLM. LLaVA-v1.5 is described in Haotian Liu, et al., *arXiv preprint arXiv:* 2310.03744, 2023, incorporated herein by reference. Different to LLaVA, the system and method adds a specific task prompt that indicates the type of task desired from the model i.e., grounding, image-level or region-level conversations. Additionally, the system and method allow spatial positions within both inputs and outputs, enabling visual prompts as inputs and grounded objects in GeoChat outputs. Notably, the original LLaVA model cannot perform object grounding or accept region inputs. Further, the original LLaVA cannot reason about remote sensing images which is enabled via the domain-specific dataset. Each component in the architecture is described as follows:

Task Token: GeoChat has an ability to easily switch between different types of remote sensing visual interpretation tasks. To eliminate uncertainty among tasks, the system and method assigns a unique task identification to each one. Three distinct task identities include, t∈{grounding, identify, refer}, each for grounded conversations, region captioning and referring expression comprehension, respectively. As for the case of visual question answering and scene classification, the model can be asked to output the answer in a single word or phrase, as shown in Table 1. The system and method does not employ any task identification tokens for vision-irrelevant commands. This unified approach is supported by a modular design that efficiently integrates spatial data, giving the model flexibility in its reasoning about visual content.

TABLE 1

Instruction following data used to train GeoChat.

| Data | Size | Response formatting prompts |
|---|---|---|
| Detailed Description | 30k | Describe the image in detail. |
| Multi-Round Conversation | 65k | — |
| Complex Questions | 10k | — |
| RSVQA-LRBEN | 56k | Answer the question using a single word or phrase. |
| NWPU-RESISC-45l | 31.5k | |
| Floodnetl | 4k | |
| Grounding Description | 45k | [grounding] Describe the image in detail. |
| Region Captioning | 40k | [identify] $\{b_{x\_left}, b_{y\_top}, b_{x\_right}, b_{y\_bottom} \vert \theta\}$ |
| Referring Expression | 25k | [refer] < p > Object < /p > |

Instruction types and format are shown in Table 1. A 306 k set is used for training and a separate 12 k instruction-set is used for testing. A training/testing dataset is described in Maryam Rahnemoonfar, Tashnim Chowdhury, Argho Sarkar, Debvrat Varshney, Masoud Yari, and Robin Murphy. Floodnet: A high resolution aerial imagery dataset for post flood scene understanding. *arXiv preprint arXiv:* 2012.02951, 2020, incorporated herein by reference in their entirety.

Spatial Location Representation. The system and method must precisely identify the spatial position of the referenced items for tasks such as grounded conversations, referring expression generation, and comprehension. To this end, the box locations are represented in a textual format to express the geographical position:

$$b = \{b_{x\_left}, b_{y\_top}, b_{x\_right}, b_{y\_bottom} \mid \theta\}.$$

Here, $b_{x\_left}$, $b_{y\_top}$, denote the top left corner point of box while the $b_{x\_right}$, $b_{y\_bottom}$ represent the bottom right corner coordinates. The angle θ represents the angle of rotation for the bounding box, from the lower edge. Numerical values normalized within the interval [0, 100] are used to represent the x and y coordinates. Region locations in this format are used to interact with the model via its inputs and outputs.

Visual Backbone. GeoChat adapts the pretrained vision backbone 212 of CLIP-ViT(L-14), which has an input resolution of 336×336. CLIP-ViT is described in Yi Tay, Minh C Phan, Luu Anh Tuan, and Siu Cheung Hui. Learning to rank question answer pairs with holographic dual lstm architecture. In *Proceedings of the* 40*th International ACM SIGIR Conference on Research and Development in Information Retrieval*, pages 695-704. ACM, 2017, incorporated herein by reference in its entirety. This results in effectively 576 patches per image. Since this resolution is not sufficient to understand details presented in remote sensing imagery (e.g., small objects and object details), the positional encoding is interpolated in the transformer-based CLIP model to scale with input image sizes of 504×504. Although this leads to an increase in the number of patches to almost double (i.e., 1296 per image), this enhanced resolution allows larger image sizes and also supports better visual grounding in high-resolution RS images.

MLP Cross-modal Adaptor. From the frozen CLIP-ViT, the output tokens ($\in \mathbb{R}^{1296\times1024}$) with dimensions 1024 are projected onto the language model space, using an MLP adaptor 214 with one hidden layer. The adaptor 214 has an input dimensionality of 1024 and outputs a vector of size 4096, corresponding to the input size of the LLM. A GeLU is used as the activation function. GeLU is described in Dan Hendrycks and Kevin Gimpel. Gaussian error linear units (gelus). *arXiv preprint arXiv:*1606.08415, 2016, incorporated herein by reference in its entirety.

Large Language Model. The open source Vicunav1.5(7B) large language model is utilized as the LLM 220 for GeoChat. The language model functions as a single interface for diverse vision-language inputs in the disclosed framework. To accomplish different vision-language tasks, the framework directly depends on the Vicuna-v1.5(7B) language tokens. The framework explicitly interacts with the language model to construct textual representations of bounding boxes to express their spatial coordinates for the visual grounding tasks that require the production of spatial locations. Similarly, the safe, aligned and effective behavior of the LLM 220 is ensured via system prompts appended together with given inputs. A Low-Rank Adaptation (LoRA) based strategy is used for fine-tuning the LLM 220. While training, instead of finetuning all of the weights that comprise the weight matrix of the pre-trained Vicuna-v1.5, the framework finetunes two smaller matrices in LoRA that approximate the original larger matrix. After that, the fine-tuned adaptor is fed into the pretrained model and utilized for inference. The LoRA adaptation ensures faster training and avoids forgetting original knowledge embedded in the LLM trained and fine-tuned on generic natural language instructions. This is an important feature since it allows the model to bring in external context about generic object types, landmarks and affordances in the remote-sensing reasoning framework of GeoChat.

Figure 2C:
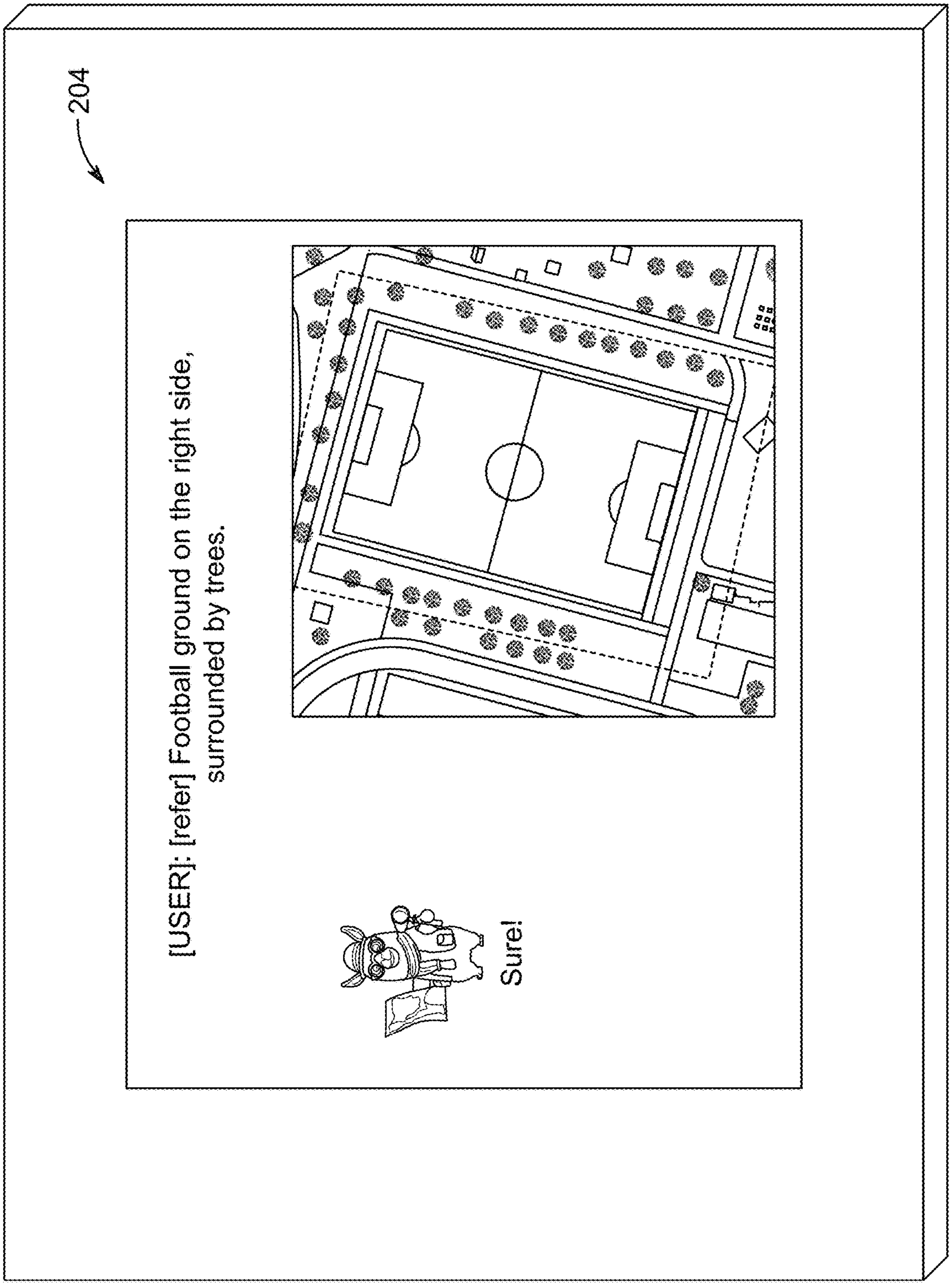
Figure 2D:
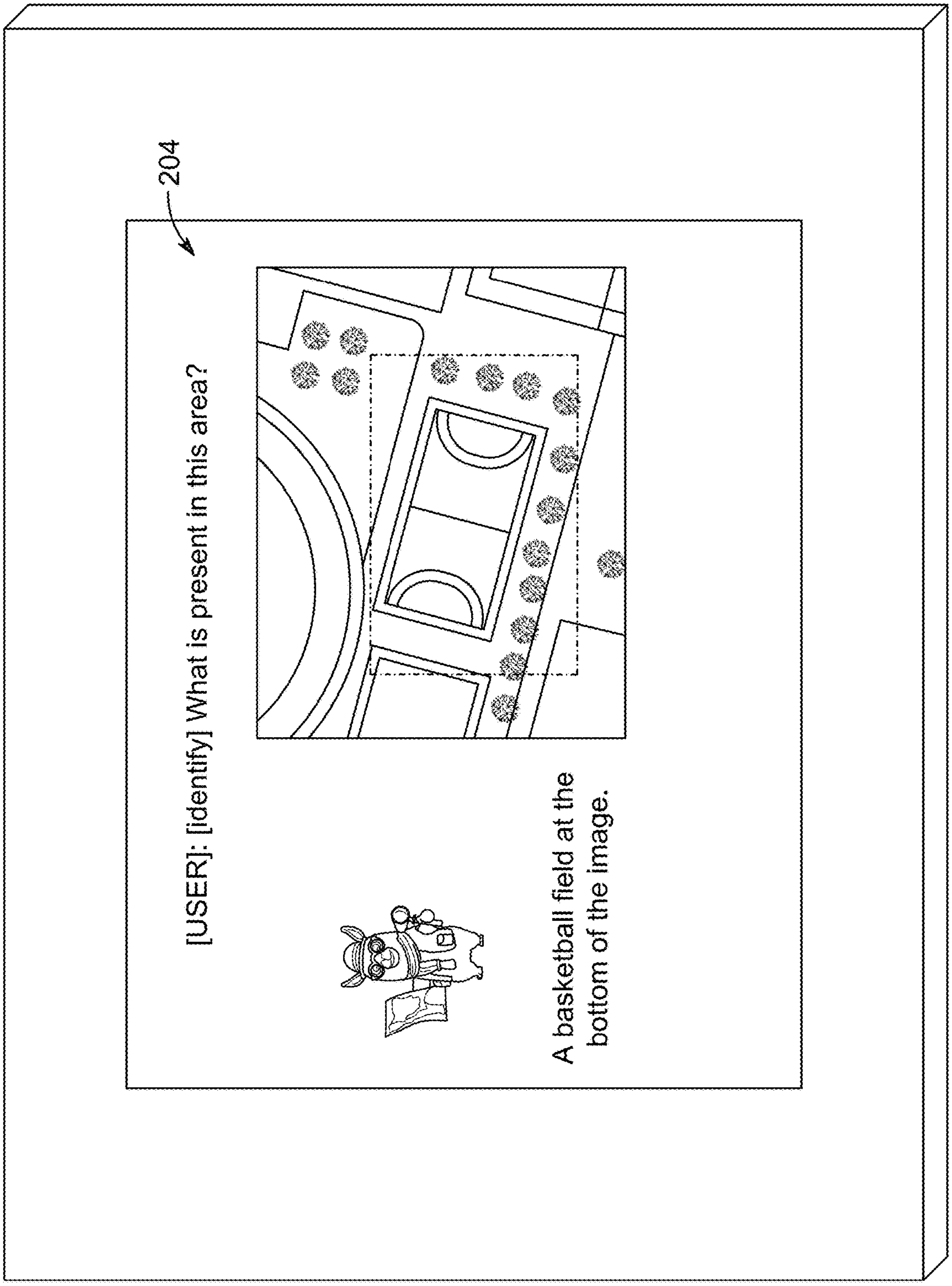
Figure 2E:
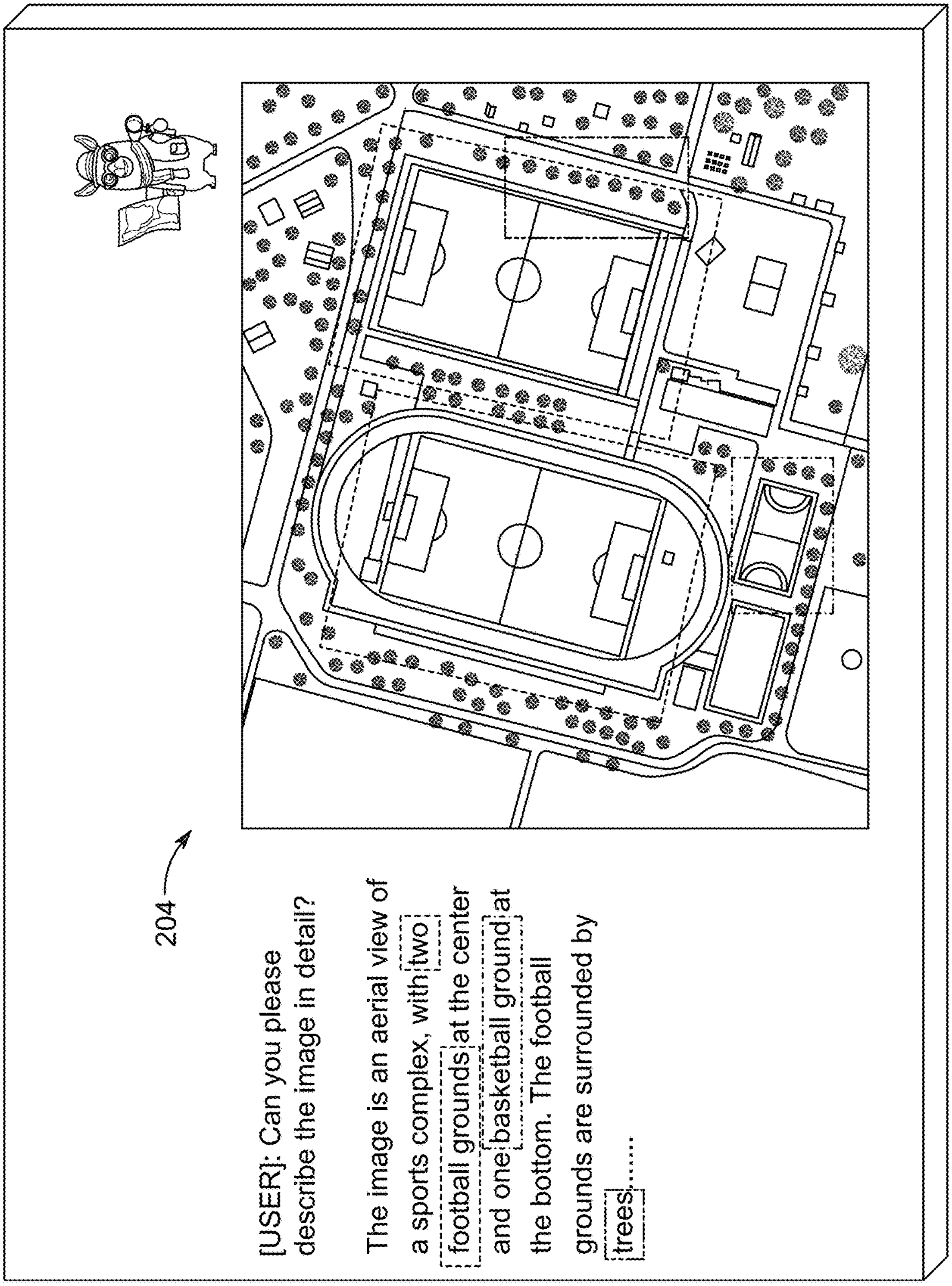
Figure 2F:
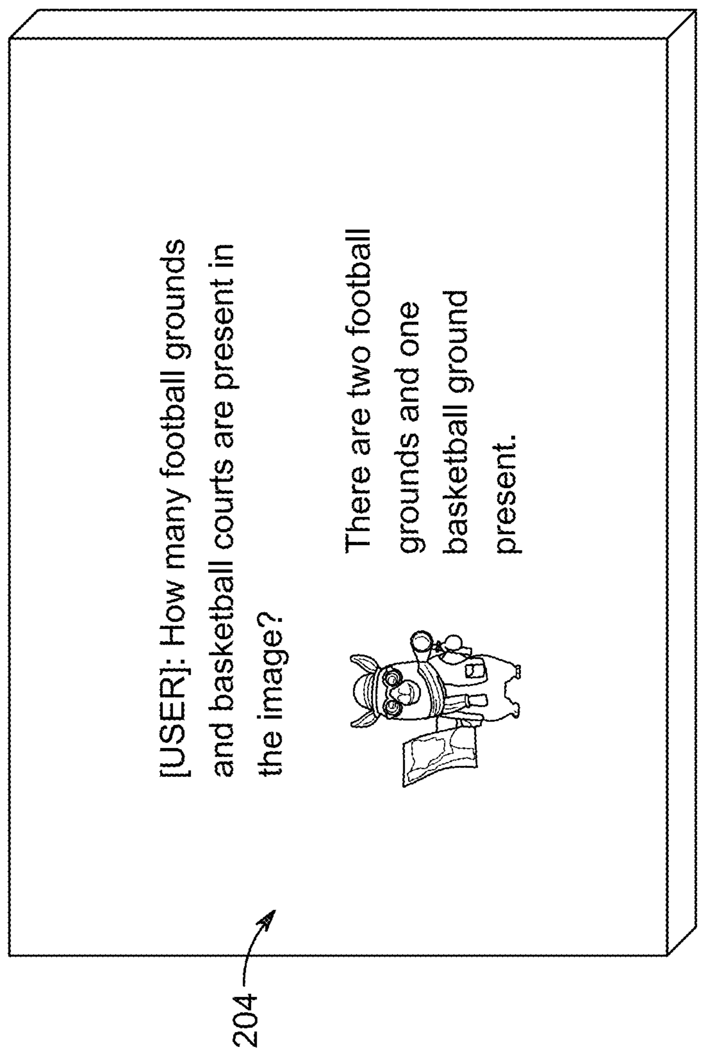

GeoChat can perform multiple tasks including referring expression in FIG. 2C, scene classification in FIG. 2E, image/region captioning in FIG. 2D, VQA and grounded conversations in FIG. 2F.

2. Training Details

To enhance the effectiveness of the model on general visual tasks and optimize training efficiency, a strategy is employed that involves initializing the network with pre-trained weights and fine-tuning specific segments for remote sensing related tasks. A pre-trained CLIP-ViT(L-14) encoder is trained on large amounts of textual and visual data and a pretrained MLP adaptor, pretrained on a 558K subset of the LAION-CC-SBU dataset with BLIP captions, and Vicuna-v1.5 initialize the model. See CLIP-ViT described in Haotian Liu, et al., *arXiv preprint arXiv:*2310.03744, 2023; Christoph Schuhmann, Richard Vencu, Romain Beaumont, Robert Kaczmarczyk, Clayton Mullis, Aarush Katta, Theo Coombes, Jenia Jitsev, and Aran Komatsuzaki. Laion-400m: Open dataset of clip-filtered 400 million image-text pairs. *arXiv preprint arXiv:*2111.02114, 2021; Junnan Li, Dongxu Li, Caiming Xiong, and Steven Hoi. Blip: Bootstrapping language-image pre-training for unified vision-language understanding and generation. In *International Conference on Machine Learning*, pages 12888-12900. PMLR, 2022, each incorporated herein by reference in their entirety. To adapt the model to remote sensing images, subsequently LoRA fine-tune the LLM, while keeping the MLP adaptor and the CLIP encoder frozen during training.

RS Multimodal Instruction Dataset

By using LLM Vicuna the model is aligned to follow a range of instructions by presenting and curating varied instruction-following data with multi-round conversations regarding remote sensing imagery (Table 1). System instructions are specifically provided as prompts that ask Vicuna to generate multi-round question and answer pairs in a manner as if it could visualize the image (although it only has access to the text). This is achieved by providing few-shot in-context examples manually composed within the prompt to show Vicuna how to build high-quality instruction-response pairs based on the caption and information supplied. Specifically, from short descriptions created using the below pipeline, randomly sample 65 k images to create multi-round conversations, 10 k images to generate complex question answers and 30 k images to generate detailed descriptions for the given short descriptions.

In combination, after conversion to instruction format, a total of nearly 306 k image-instruction pairs are obtained for training and 12 k for testing. Next, the instruction-set creation process is outlined.

Figure 4A:
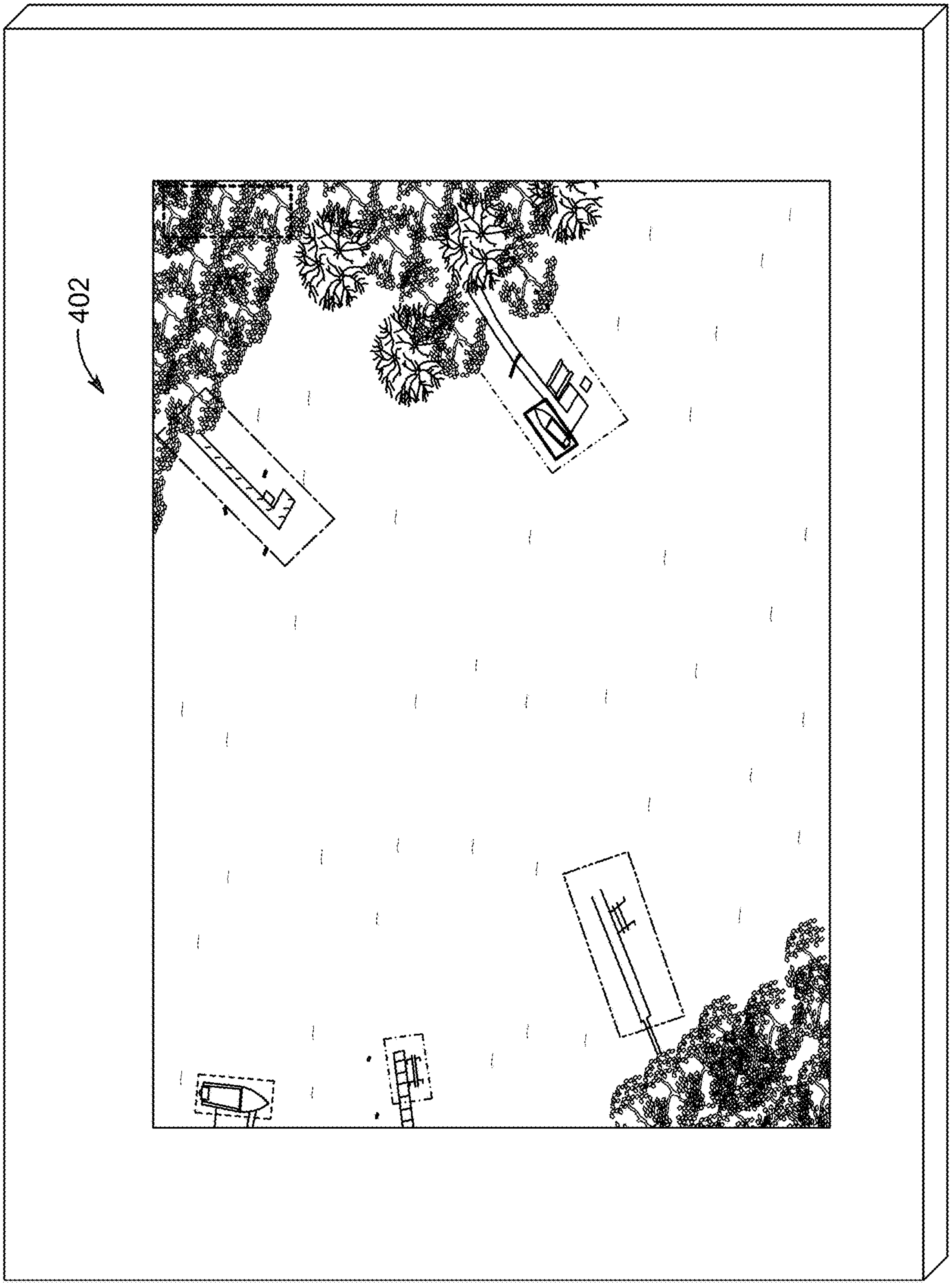
FIGS. 4A-4C illustrate types of annotations available in the instruction-set, in accordance with an exemplary aspect of the disclosure.
Figure 4B:
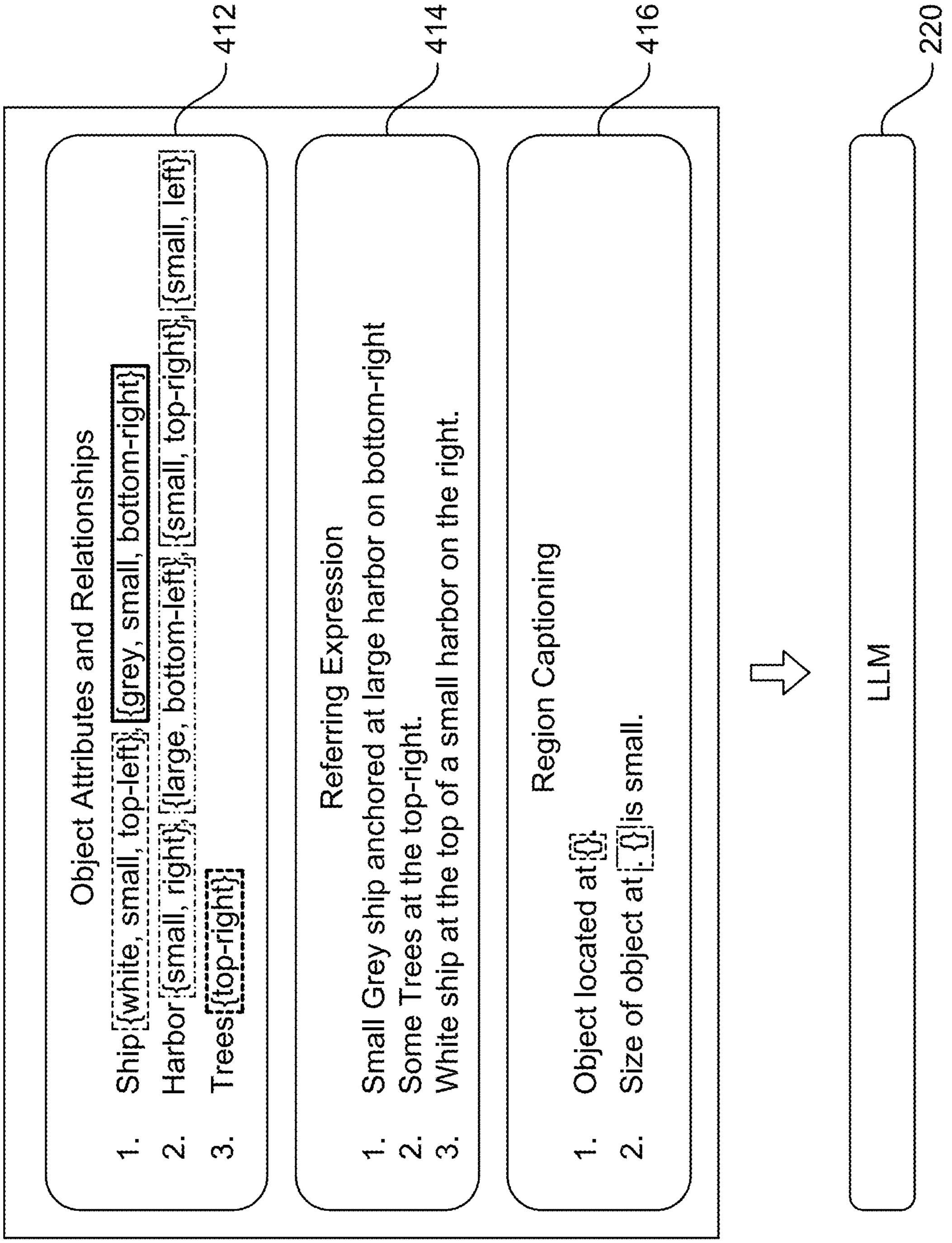
Figure 4C:
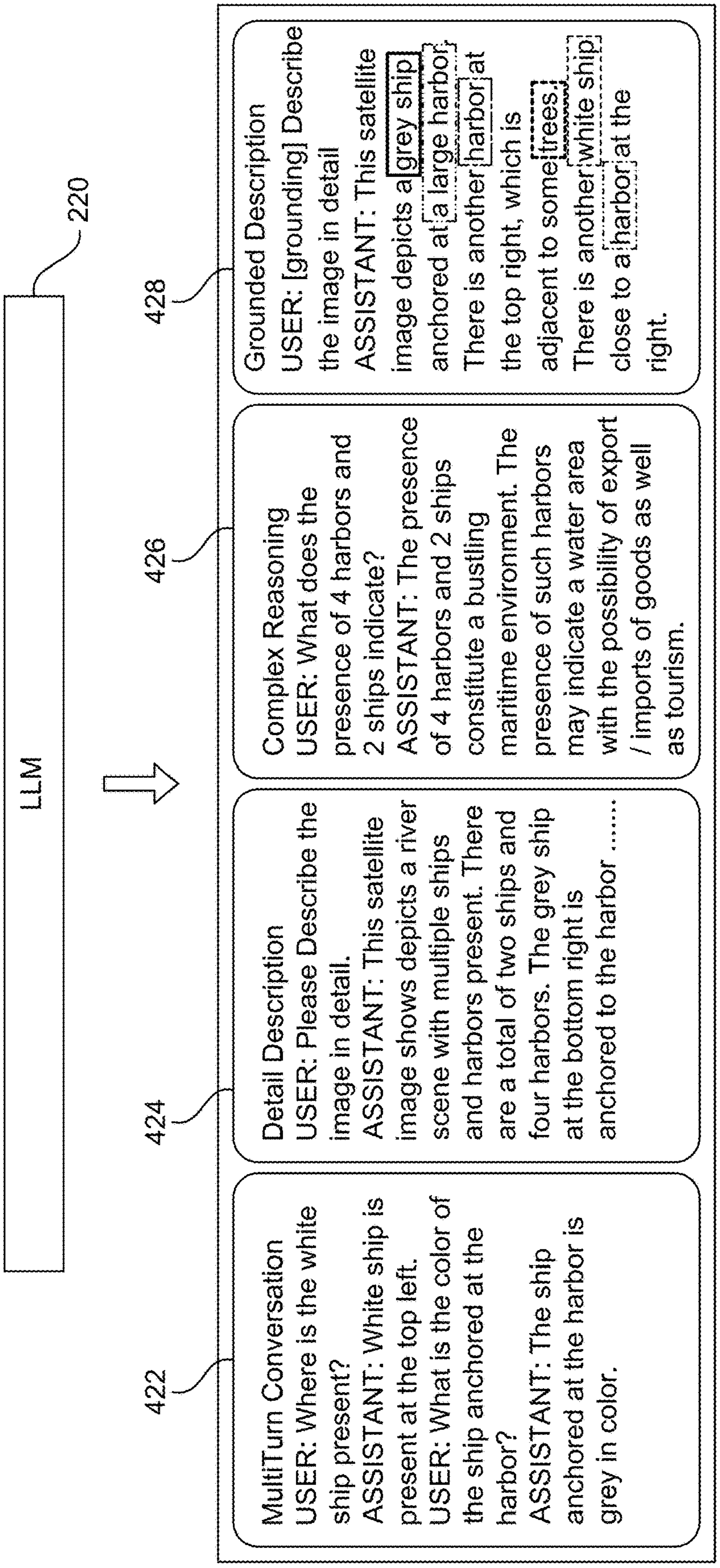

FIGS. 4A-4C illustrate types of annotations available in the instruction-set. FIG. 4B: A given RS image 402 has object attribute and relationship information 412, referring expressions 414 and region captions 416 along with their corresponding region annotations (shown over the image). FIG. 4C: Structured information 422, 424, 426, 428 is used to create the rich instruction-set with a total of 318 k image-instruction pairs.

Constituent Datasets: In the compilation of an instruction set, three distinct types of datasets are incorporated, encompassing the ones designed for object detection, scene classification, and visual question answering (VQA). Specifically, the compilation integrates three object detection (DOTA, DIOR, and FAIRIM which together form the SAMRS dataset), one scene classification (NWPURESISC-45), one VQA (LRBEN), and one flood detection VQA dataset (see Table 2). One dataset is described in Gui-Song Xia, Xiang Bai, Jian Ding, Zhen Zhu, Serge Belongie, Jiebo Luo, Mihai Datcu, Marcello Pelillo, and Liangpei Zhang. Dota: A large-scale dataset for object detection in aerial images. In *The IEEE Conference on Computer Vision and Pattern Recognition* (*CVPR*), 2018; Gong Cheng, Jiabao Wang, Ke Li, Xingxing Xie, Chunbo Lang, Yanqing Yao, and Junwei Han. Anchor-free oriented proposal generator for object detection. *IEEE Transactions on Geoscience and Remote Sensing,* 60:1-11, 2022; Xian Sun, Peijin Wang, Zhiyuan Yan, Feng Xu, Ruiping Wang, Wenhui Diao, Jin Chen, Jihao Li, Yingchao Feng, Tao Xu, Martin Weinmann, Stefan Hinz, Cheng Wang, and Kun Fu. Fair1m: A benchmark dataset for fine-grained object recognition in high-resolution remote sensing imagery. *ISPRS Journal of Photogrammetry and Remote Sensing,* 184: 116-130, 2022; Di Wang et al., *arxiv,* 2023; each incorporated herein by reference in their entirety. The object detection datasets allow region-level reasoning capability as they offer segmentation masks along with bounding boxes.

TABLE 2

List of datasets used to create the remote-sensing instruction set for GeoChat VLM training.

| Dataset | Category | # Classes | # Images | Image Size |
|---|---|---|---|---|
| DOTA | Object Detection | 18 | 17,480 | 1024 × 1024 |
| DIOR | Object Detection | 20 | 23,463 | 800 × 800 |
| FAIR1M | Object Detection | 37 | 64,147 | 600 × 600 |
| LRBEN(rsvqa) | Visual Question Answering | — | 600 | 256 × 256 |
| Floodnet | Visual Question Answering | — | 4056 | 3000 × 4000 |
| NWPU-RESISC-45 | Scene Classification | 45 | 31,500 | 256 × 256 |

As listed in Table 2, the datasets include object detection, visual question answering and scene classification datasets with varying image sizes and types of classes to ensure diversity.

Addition of Missing Classes: Although a wide variety of object classes are included in the object detection databases, several essential categories like buildings, roads, and trees are missing. To address this, a ViTAE-RVSA model is used, pre-trained on the LoveDA dataset, which encompasses the required important classes. A description of ViTAE-RVSA is in Di Wang, Qiming Zhang, Yufei Xu, Jing Zhang, Bo Du, Dacheng Tao, and Liangpei Zhang. Advancing plain vision transformer toward remote sensing foundation model. *IEEE Transactions on Geoscience and Remote Sensing,* 61:1-15, 2023; and Junjue Wang, Zhuo Zheng, Ailong Ma, Xiaoyan Lu, and Yanfei Zhong. LoveDA: A remote sensing land-cover dataset for domain adaptive semantic segmentation, 2021, each incorporated herein by reference in their entirety. The model is used to infer these classes on the SAMRS dataset, yielding pseudo labels. To mitigate potential noise in these predictions, the predictions of ViTAE-RVSA for which already have ground truth from the SAMRS dataset are removed to refine the results.

Attribute extraction: For referring expression annotations, it is important to derive a variety of attributes in RS images. To this end, five distinct types of attributes are selected, as outlined in Table 3. Object category information can be directly obtained from the SAMRS dataset. The K-Means clustering algorithm is used for color extraction. Specifically, the object's pixels are extracted from the image using ground-truth box and cluster them into K groups. The center of the largest cluster is then selected as the object's color. To specify the relative size of the object, objects are categorized into three sizes: small, normal, and large. This categorization is determined by measuring the area of all instances of a class in the entire dataset and assigning the $80^{th}$ percentile as the large label. Similarly, the $20^{th}$ percentile is designated as small size, with the remaining falling into the normal category. To determine the object's relative position within the images, the entire image is partitioned into a 3×3 grid, defining regions such as Top Right, Top, Top Left, Left, Center, Right, Bottom Right, Bottom Left, and Bottom. The relative position of an object is assigned based on the object's center pixel coordinates.

TABLE 3

List of attributes collected for objects. Attributes are used to obtain referring expressions e.g., small-sized plane to the left.

| | Attribute | Example |
|---|---|---|
| a1 | category | (e.g. "plane, ship") |
| a2 | color | (e.g. "gray, white") |
| a3 | relative size | (e.g. "small, large") |
| a4 | relative location | (e.g. "top right, bottom") |
| a5 | relation | (e.g. "parked at, driving through") |

To define the relation between objects in a given image, different objects are grouped based on their distance between the bounding boxes, and for each sub-graph, different relationships are assigned between objects based on their class labels. Table 4 presents various examples of object relationships. To establish relationships like "surrounded by," pixel-level coordinates are cross-referenced to verify if one object is entirely contained within another object.

TABLE 4

Example of relationships between different objects used in the proposed instruction dataset.

| Categories | Example |
|---|---|
| Ships and Harbors | (e.g. "anchored at, parked at") |
| Track Field and Soccer Field | (e.g. "Surrounded by, Inside") |
| Vehicles, Bridge, Road, Roundabout | (e.g. "passing through, passing through") |
| Vehicles and Building | (e.g. "parked") |
| Airport and Plane | (e.g. "parked") |
| Ship and Helipad | (e.g. "on, contains") |

Expression Generation: To emulate natural language expressions, predefined textual templates are employed based on Yang Zhan, Zhitong Xiong, and Yuan Yuan. Rsvg: Exploring data and models for visual grounding on remote sensing data. *IEEE Transactions on Geoscience and Remote Sensing,* 61: 1-13, 2023, incorporated herein by reference in its entirety. The phrase template encompasses the attributes {a1, . . . , a5} from Table 3. The expression for a group of objects of the same class is formulated as:

"The/A ⟨a3⟩ ⟨a2⟩ a1⟨in/on the a4⟩."

Attributes that may be absent are enclosed in ⟨ ⟩, and attributes {a2, a3} can be arranged in any sequence.

Similarly, the sentence template incorporates the relational attributes a5 to establish connections between two objects through this structure:

"The/A ⟨$a_i3$⟩ ⟨$a_i2$⟩ $a_i1$ $a_i5$ $a_j1$ ⟨in/on the $a_j4$⟩."

Here, the indices i and j represent the $i^{th}$ and $j^{th}$ object.

Visual Grounding: Although referring expression datasets are available in the natural image domain, they are lacking for the remote sensing domain. Conventional referring expression is described in Peter Young, Alice Lai, Micah Hodosh, and Julia Hockenmaier. From image descriptions to visual denotations: New similarity metrics for semantic inference over event descriptions. *Transactions of the Association for Computational Linguistics,* 2:67-78, 2014; and Licheng Yu, Patrick Poirson, Shan Yang, Alexander C Berg, and Tamara L Berg. Modeling context in referring expressions. In *Computer Vision-ECCV* 2016: 14*th European Conference*, Amsterdam, The Netherlands, Oct. 11-14, 2016, *Proceedings*, Part 1114, pages 69-85. Springer, 2016, each incorporated herein by reference in their entirety. To this end, short descriptions are used as referring expressions to create three different kinds of question answering pairs, i.e., grounding image description, referring expression, and region level captioning, as described in Table 1.

Figure 5A:
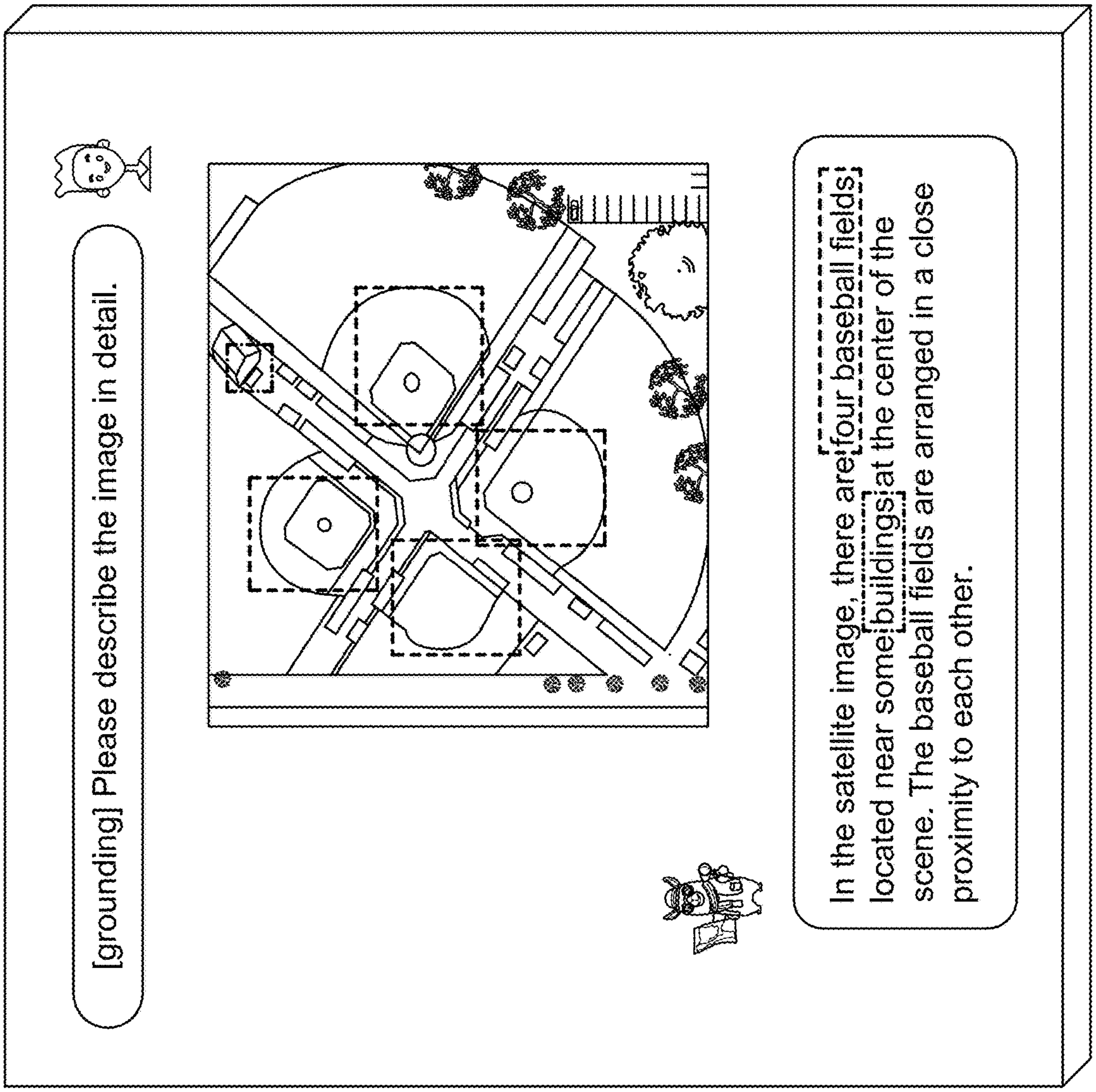
FIGS. 5A-5C are user interfaces that illustrate qualitative results for grounding, referring object detection, and disaster/damage detection, in accordance with an exemplary aspect of the disclosure.
Figure 5B:
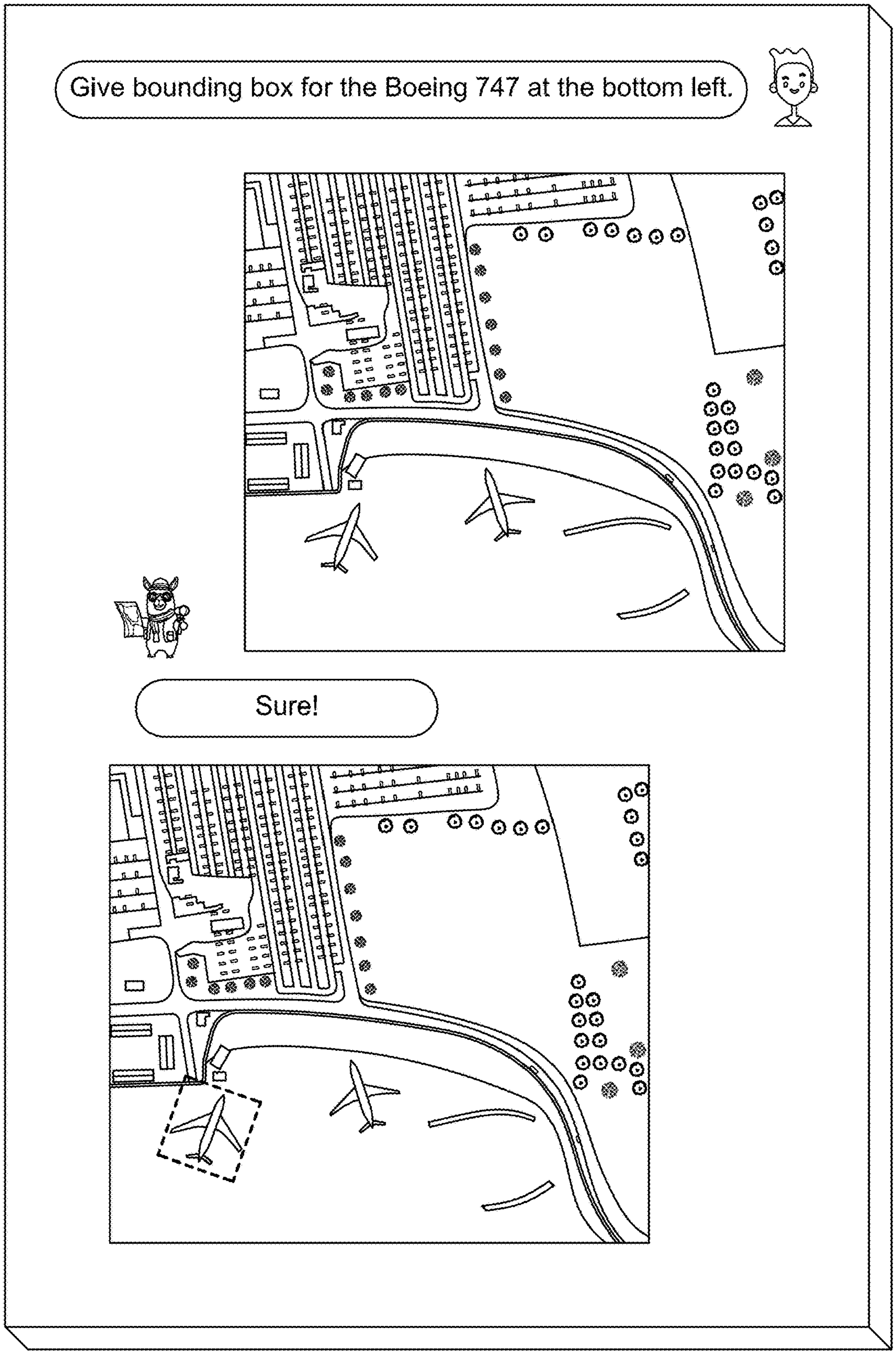
Figure 5C:
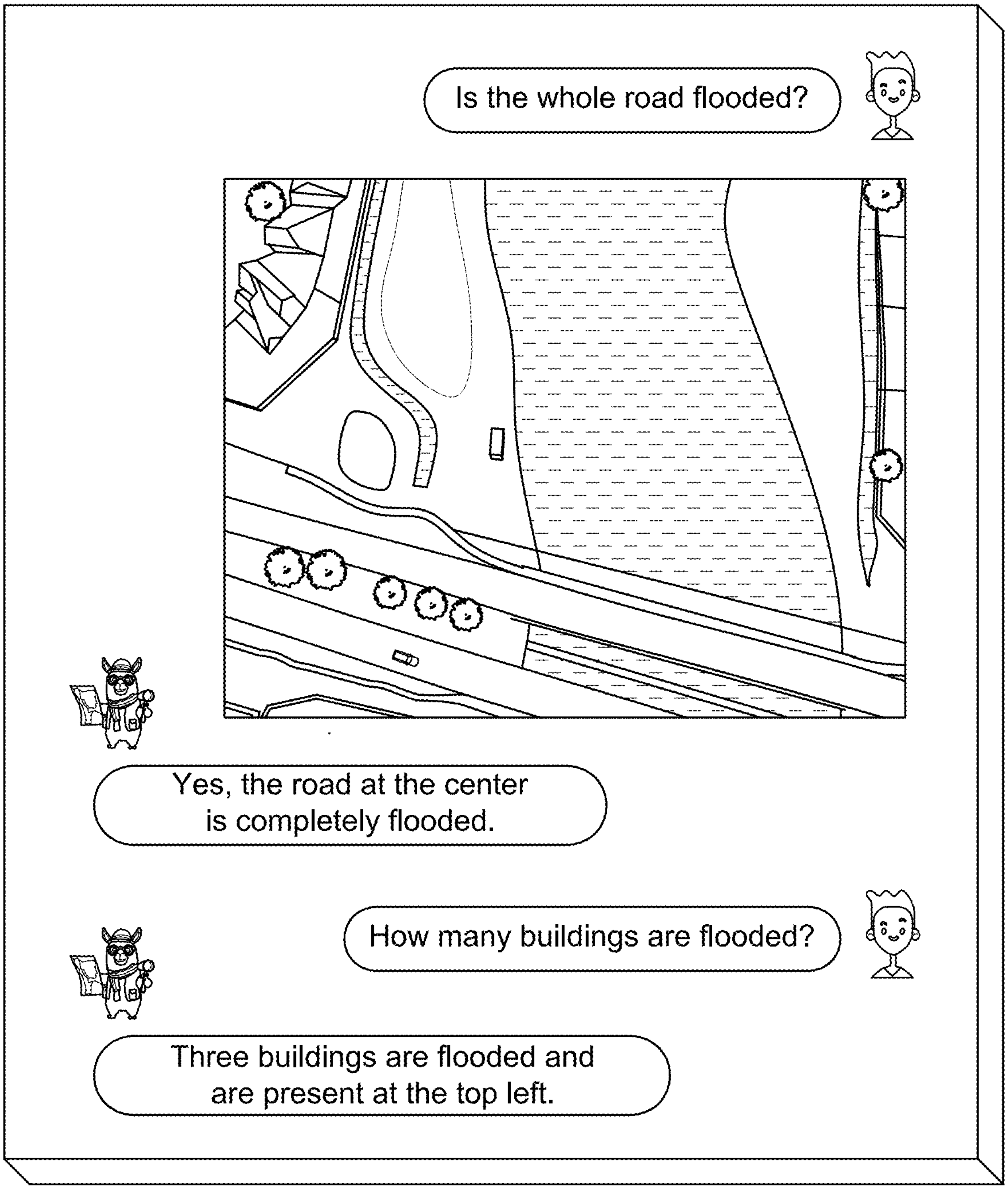
Figure 6A:
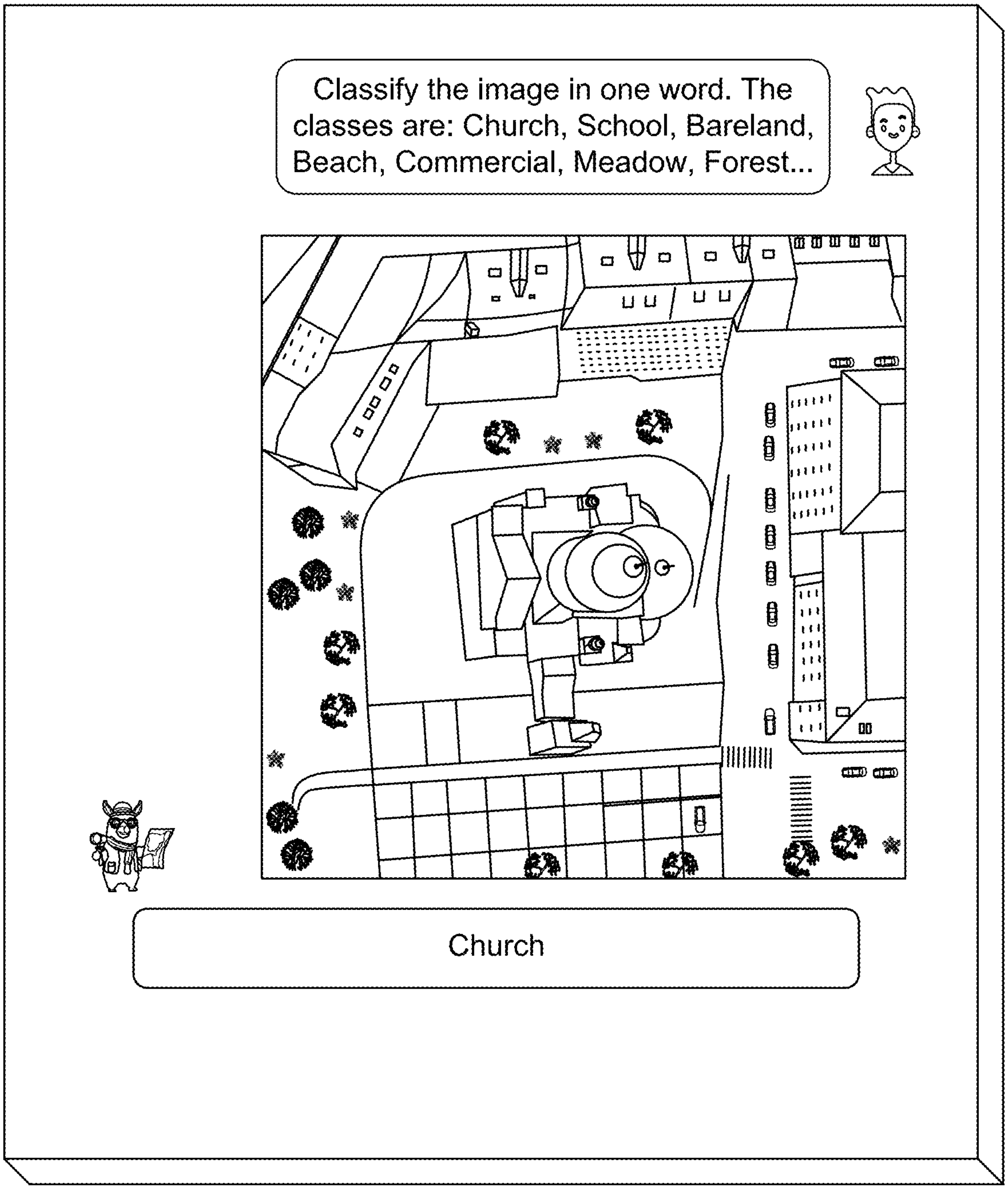
FIGS. 6A-6F are user interfaces that illustrate examples of the scene classification task.
Figure 6B:
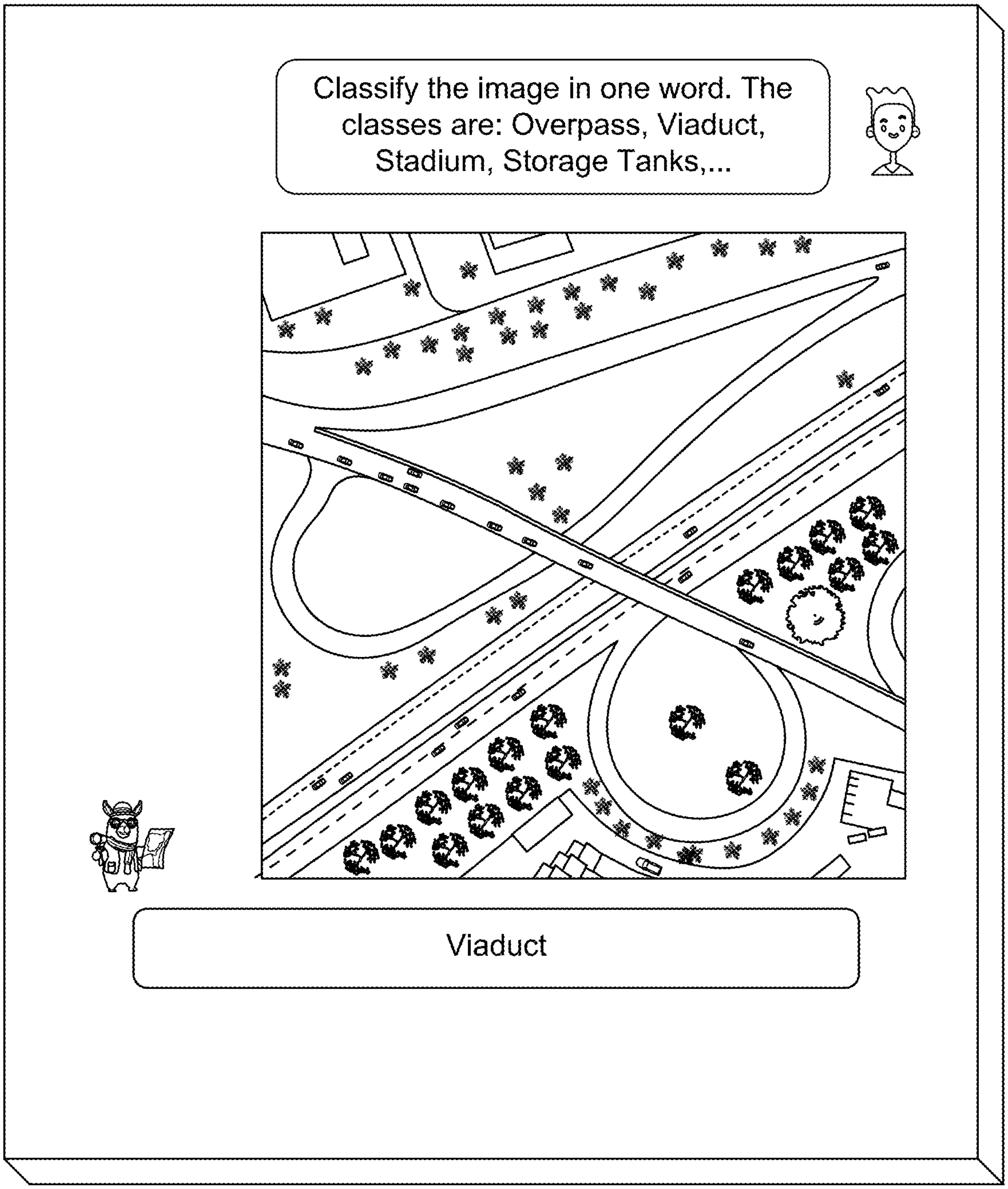
Figure 6C:
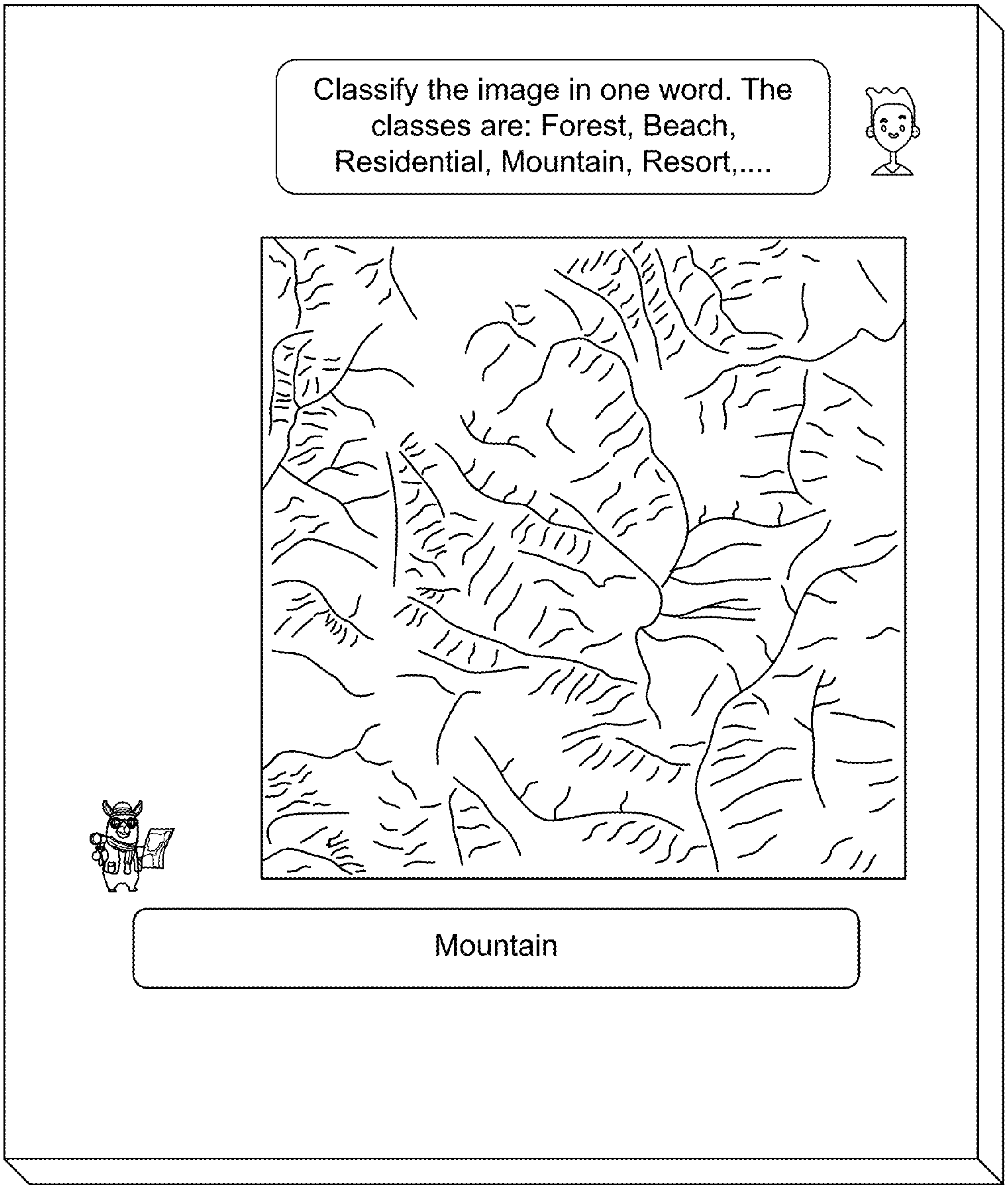
Figure 6D:
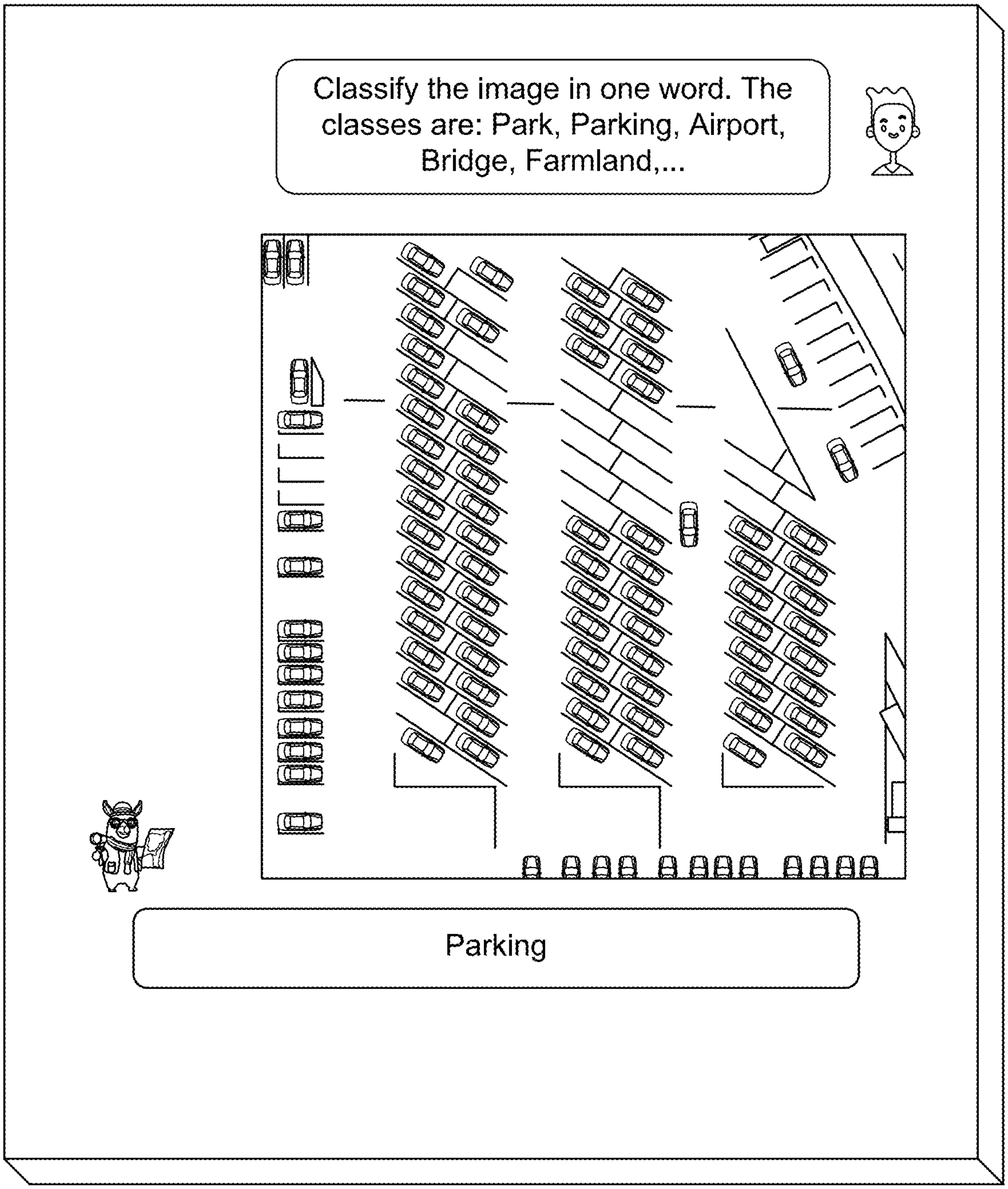
Figure 6E:
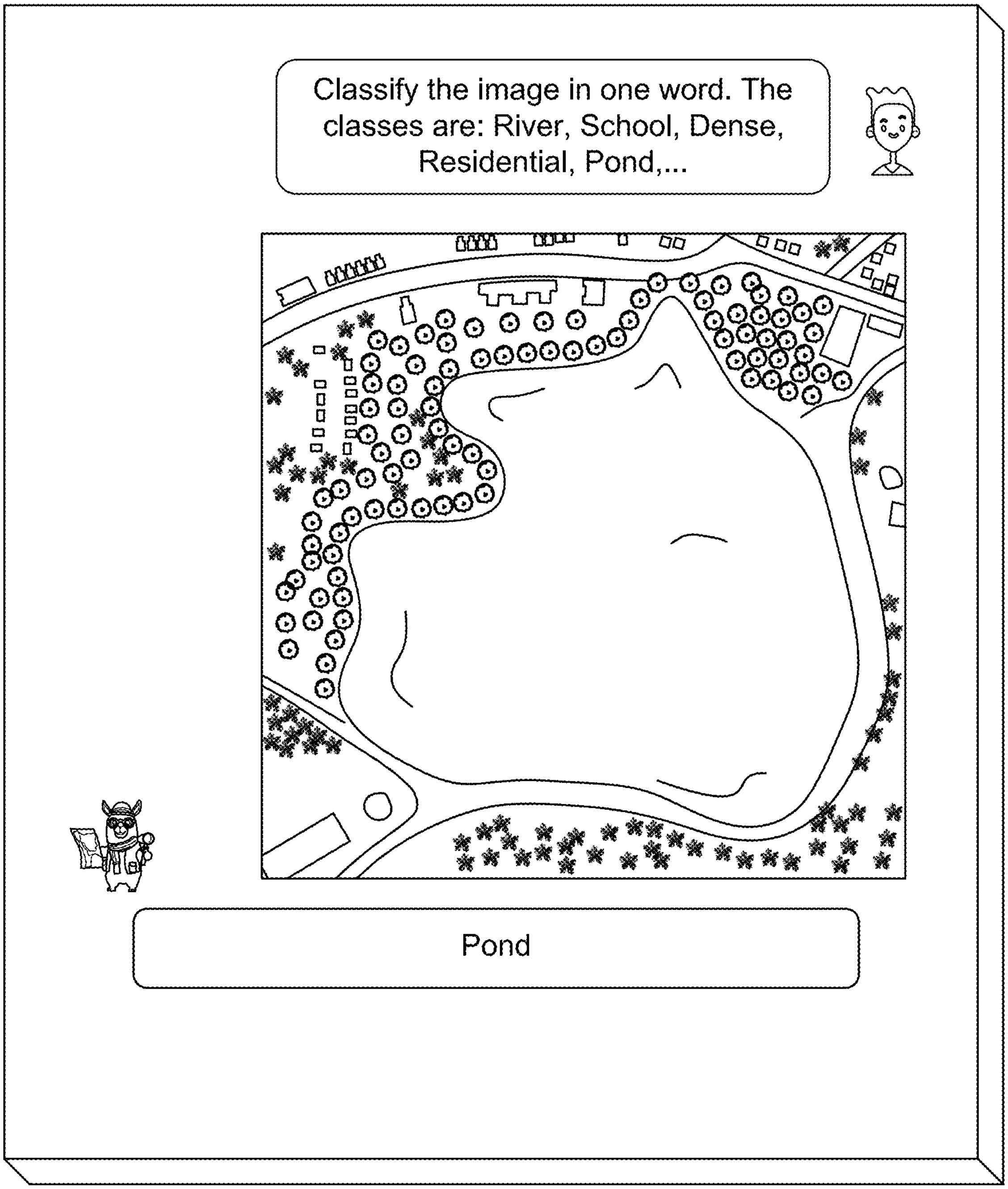
Figure 6F:
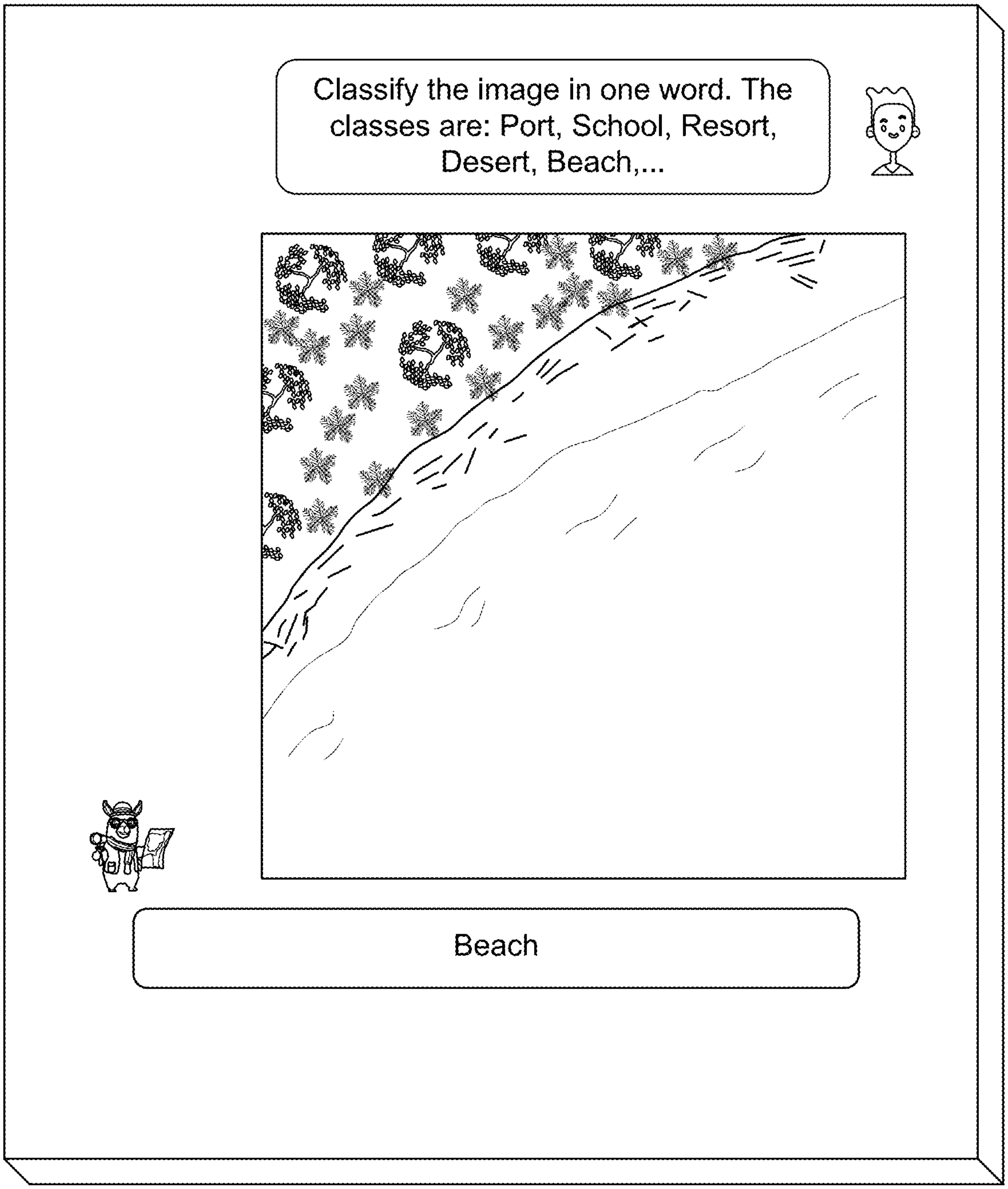

FIGS. 5A-5C are user interfaces that illustrate qualitative results for grounding, referring object detection, and disaster/damage detection. The user can provide task-specific tokens (e.g., [grounding]) to shape model responses according to the desired behavior. In FIG. 5C, the model can generate textual responses, in FIG. 5B, only visual grounding, and in FIG. 5A, both text and object groundings interleaved together. The model can also specify object types, object counts, object attributes and object relationships.

EXPERIMENTS

1. Implementation Details

The weights of the disclosed model are initialized with the pretrained CLIP-ViT, and LLM (Vicuna-v1.5 and LoRA finetuning is applied. These models are described in Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In *International conference on machine learning*, pages 8748-8763. PMLR, 2021, each incorporated herein by reference in their entirety. Utilizing LoRA, the parameters $W_q$ and $W_v$ are refined through low-rank adaptation, with a designated rank r set to 64 in an implementation. The model undergoes training consistently at an image resolution of 504×504 throughout the whole process. Each training step incorporates specifically crafted multi-modal instructional templates designed for a variety of vision-language tasks during the training process. The AdamW optimizer is used with a cosine learning rate scheduler to train the model. A approach to weight decay is described in Ilya Loshchilov and Frank Hutter. Decoupled weight decay regularization. *arXiv preprint arXiv:*1711.05101, 2017, incorporated herein by reference in its entirety. The global batch size as 144 is kept. The model is trained in two stages, First, train the model using all of the datasets for 1 epoch, correspondingly 2400 steps, followed by stage 2, of only train on the grounding dataset for 1600 more steps.

2. Scene Classification

Datasets for Evaluation.

For scene classification, the model is evaluated using AID and UCMerced, which are described in Gui-Song Xia, Jingwen Hu, Fan Hu, Baoguang Shi, Xiang Bai, Yanfei Zhong, Liangpei Zhang, and Xiaoqiang Lu. Aid: A benchmark data set for performance evaluation of aerial scene classification. *IEEE Transactions on Geoscience and Remote Sensing,* 55(7):3965-3981, 2017; and Yi Yang and Shawn Newsam. Bag-of-visual-words and spatial extensions for land-use classification. In *Proceedings of the* 18*th SIGSPATIAL international conference on advances in geographic information systems*, pages 270-279, 2010, each incorporated herein by reference in their entirety. AID is a large-scale aerial image collection compiled from Google Earth imagery, with 30 classes, such as a river, dense residential area, etc. The images are labeled by specialists in the field of remote sensing image interpretation. In total, the AID dataset has 10,000 images within 30 classes. The images have been taken from different countries as well as different weather conditions. For evaluation, use a 20% split of the AID dataset. UCMerced is a Land Use scene classification dataset, with 2,100 images and 21 classes. Each image is of size 256×256. The whole UCMerced dataset is used as a zero-shot test set.

Results. The models are prompted with all of the classes and prompt to classify the image using just one word/phrase. For example, a prompt is input like "Classify the image within one of the given classes: dense residential area, . . . , school. Answer with one word or short phrase.". The evaluation calculates zero-shot accuracy on both AID and UCMerced.

FIGS. 6A-6F are user interfaces that illustrate examples of the scene classification task for GeoChat.

GeoChat significantly outperforms other VLM's with an accuracy of 84.43% on UCMerced and 72.03% on AID, as presented in Table 5. Notably, the recent MiniGPT-4-v2 fails to follow the instructions provided for this specific task and returns unrelated classes that are not a part of the dataset. Its accuracy is close to 5% if the answers from Vicunav1.5 is passed and if asked to check if the output sentence refers to the ground truth class or not. In comparison, Qwen-VL and LLaVa-1.5 perform well in instruction following, but fall short to GeoChat, due to lack of domain knowledge.

TABLE 5

Zero-shot scene classification accuracy comparison on AID and UCMerced datasets, which are described in Gui-Song Xia, Jingwen Hu, Fan Hu, Baoguang Shi, Xiang Bai, Yanfei Zhong, Liangpei Zhang, and Xiaoqiang Lu. Aid: A benchmark data set for performance evaluation of aerial scene classification. *IEEE Transactions on Geoscience and Remote Sensing*, 55(7): 3965-3981, 2017; and Yi Yang and Shawn Newsam. Bag-of-visual-words and spatial extensions for land-use classification. In *Proceedings of the 18th SIGSPATIAL international conference on advances in geographic information systems*, pages 270-279, 2010.

| Model | UCMerced | AID |
|---|---|---|
| Qwen-VL | 62.90 | 52.60 |
| MiniGPTv2 | 4.76 | 12.90 |
| LLaVA-1.5 | 68.00 | 51.00 |
| GeoChat | 84.43 | 72.03 |

As shown in Table 5, in comparison to other generic VLMs, GeoChat performs favorably well. For other VLM's, see Jinze Bai, Shuai Bai, Shusheng Yang, Shijie Wang, Sinan Tan, Peng Wang, Junyang Lin, Chang Zhou, and Jingren Zhou. Qwen-vl: A frontier large vision-language model with versatile abilities. *arXiv preprint arXiv:*2308.12966, 2023; Jun Chen, Deyao Zhu, Xiaoqian Shen, Xiang Li, Zechun Liu, Pengchuan Zhang, Raghuraman Krishnamoorthi, Vikas Chandra, Yunyang Xiong, and Mohamed Elhoseiny.

Minigpt-v2: large language model as a unified interface for vision-language multi-task learning. *arXiv preprint arXiv:* 2310.09478, 2023; and Haotian Liu, et al., *arXiv preprint arXiv:*2310.03744, 2023, each incorporated herein by reference in their entirety.

3. Visual Question Answering

Datasets for evaluation. RSVQA-HRBEN comprises 10,569 high-resolution photos and 1,066,316 question-answer pairs, with 61.5%, 11.2%, 20.5%, and 6.8% divided into training, validation, test 1, and test 2 sets, respectively. This dataset has three question types: presence, comparison, and count. For evaluation, the test set-2 is used for RSVQA-HRBEN with 47 k question answer pairs. RSVQA-LR is made up of 772 low-resolution images and 77,232 question-answer pairs, with 77.8%, 11.1%, and 11.1% used for training, validation, and testing, respectively. There are four different categories of questions: presence, comparison, rural/urban, and count. An area is omitted and questions are counted during evaluation because the responses are numerical and quantifiable into numerous categories. In the RSVQA-LRBEN dataset, for example, counting questions are quantified into five categories: 0, between 1 and 10, between 11 and 100, between 101 and 1000, and greater than 1000. For evaluation, the test set of RSVQA-LRBEN with 7 k question-answer pairs is used.

Results. To constrain the answers to a simple yes/no and for rural/urban question types, a suitable prompt is added at the end of each question.

Figure 7A:
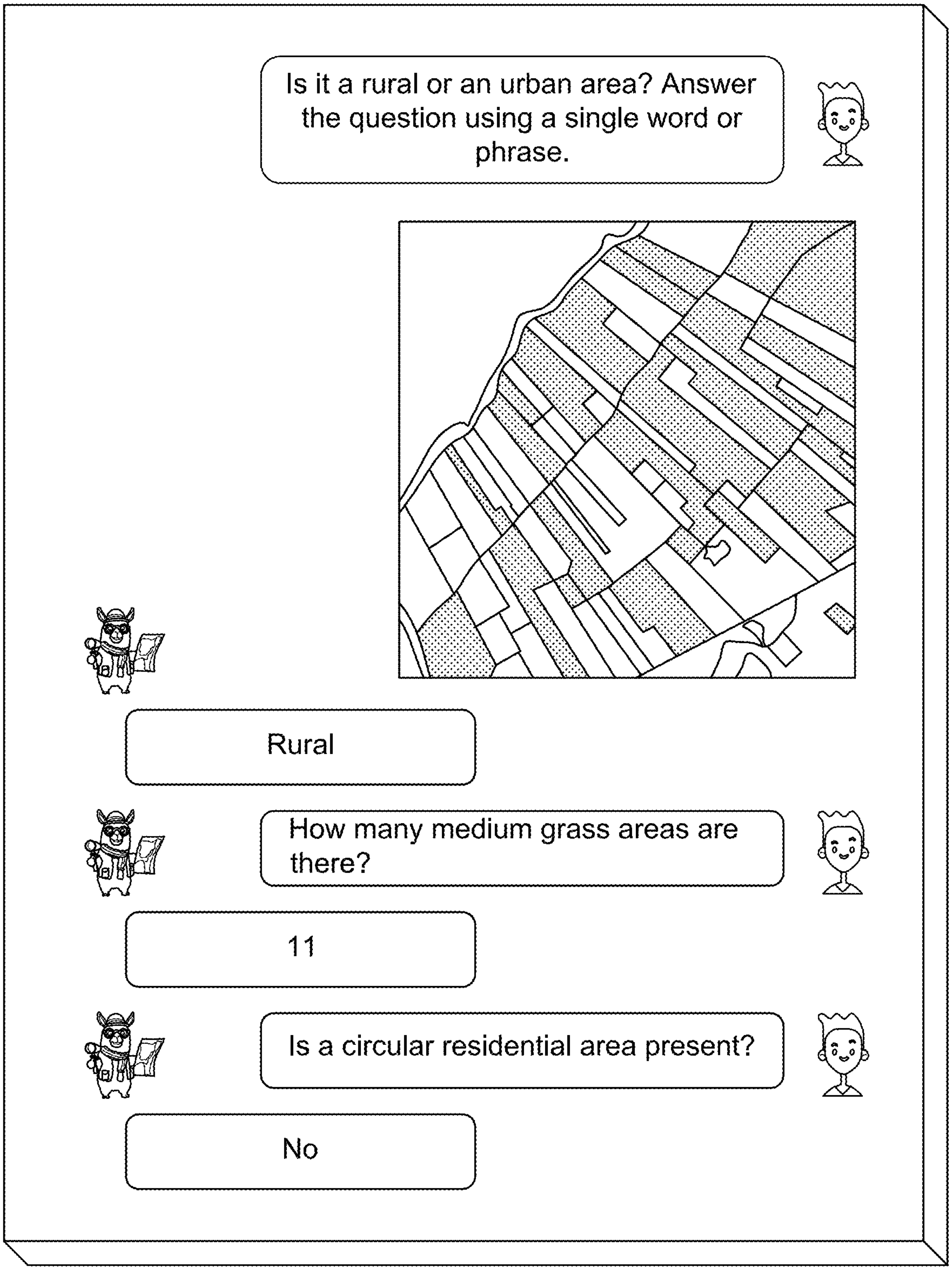
FIGS. 7A-7C are user interfaces that illustrate examples of the visual question answering task.
Figure 7B:
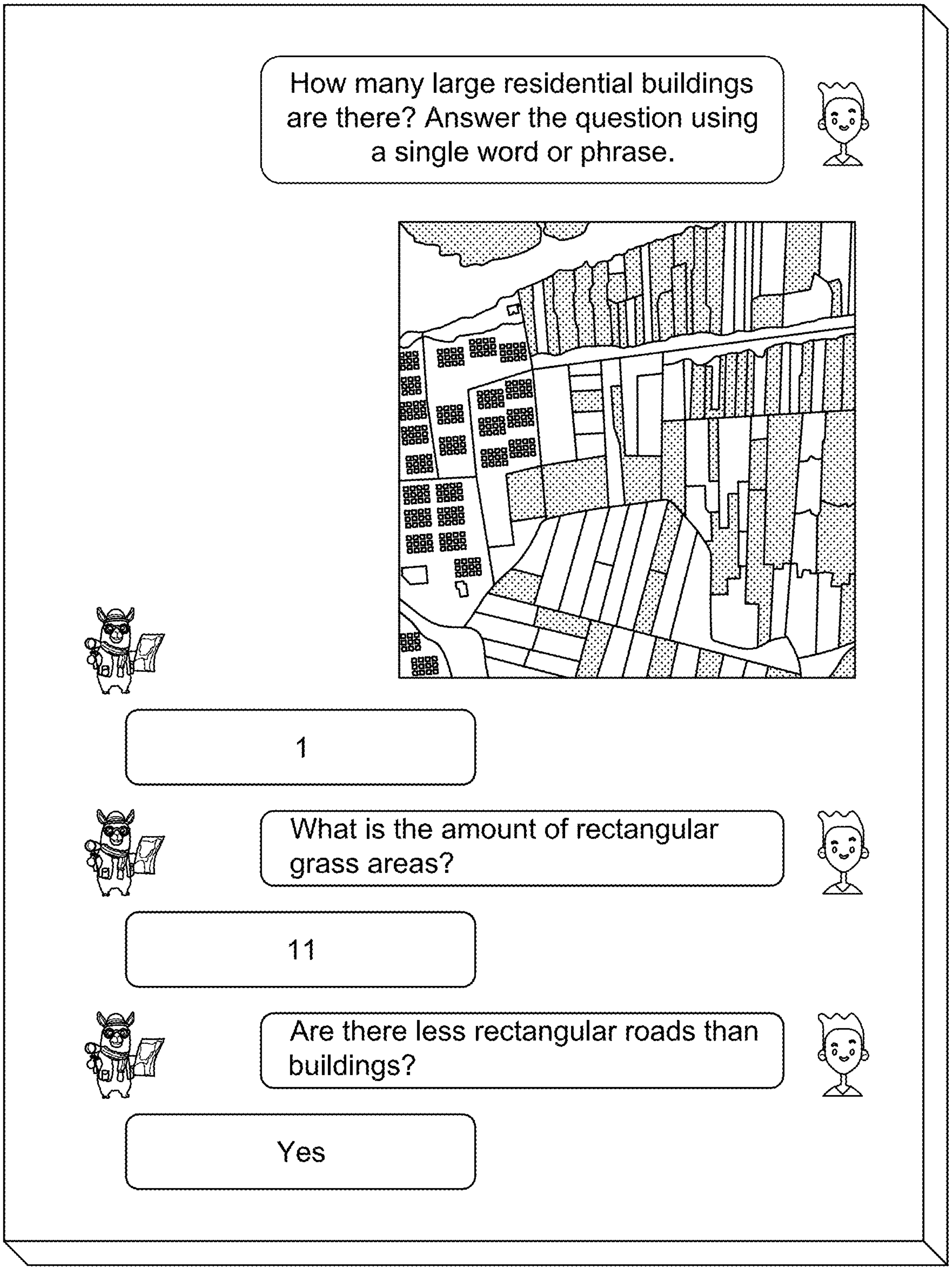
Figure 7C:
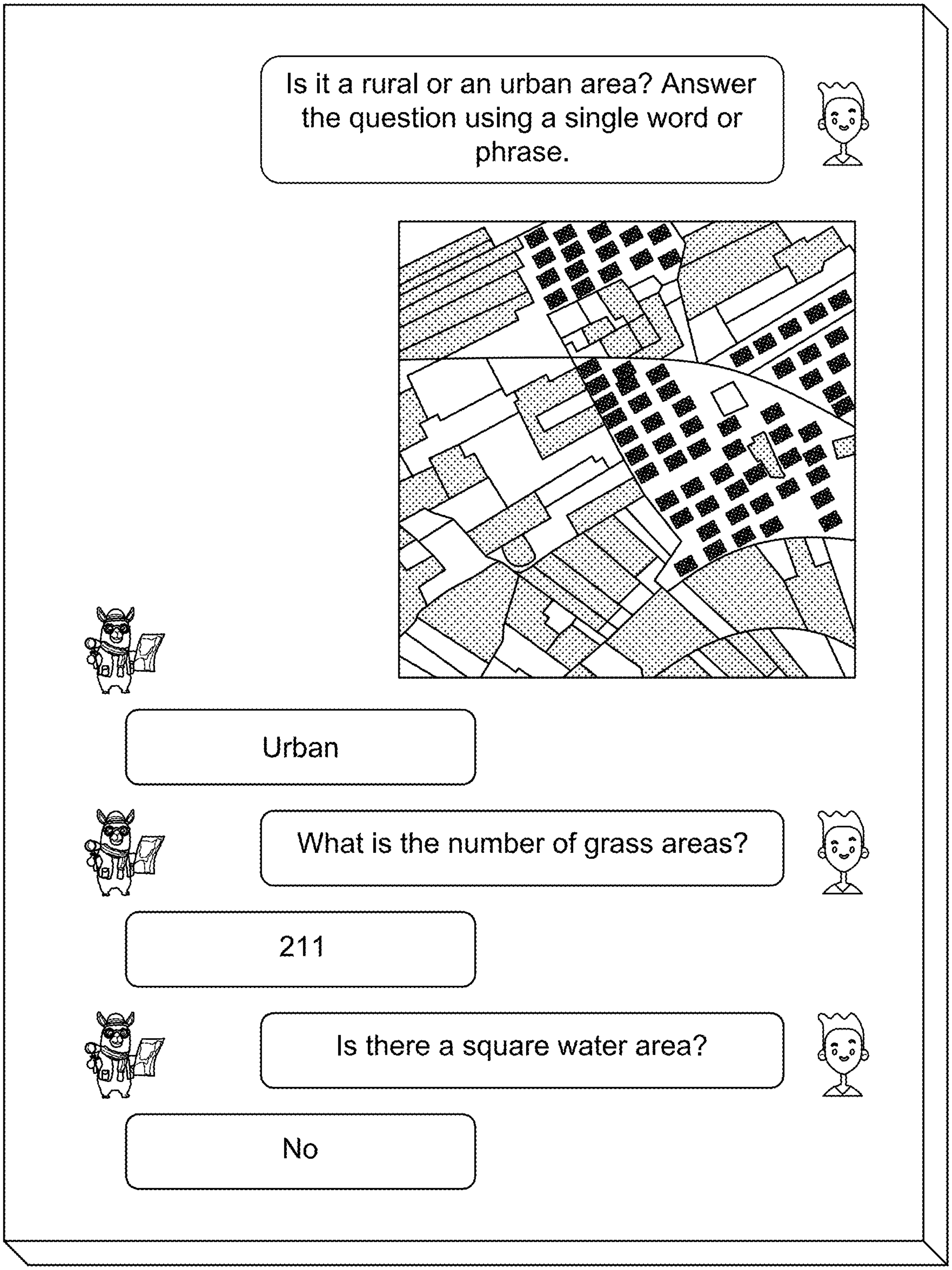
Figure 8A:
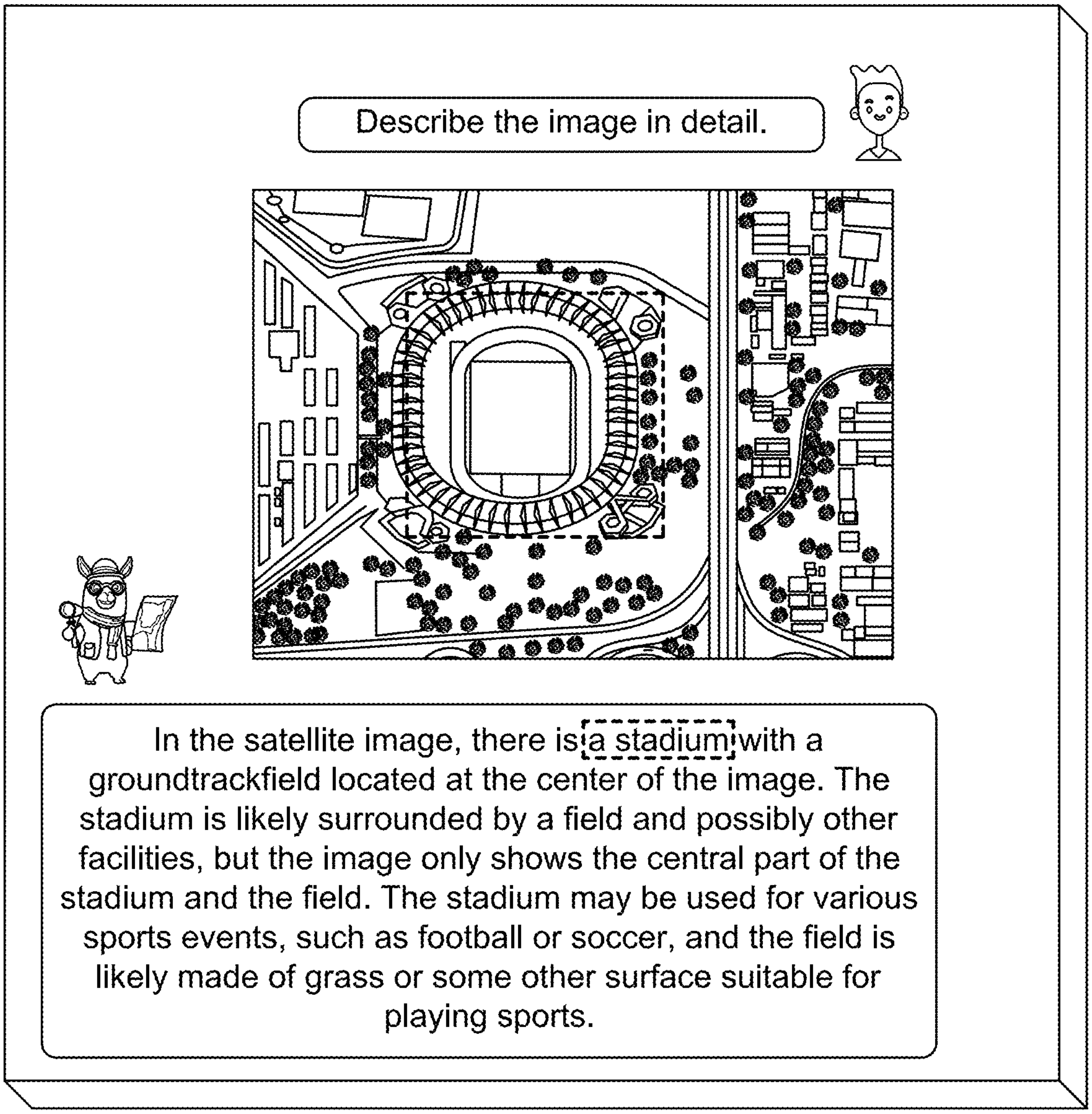
FIGS. 8A-8F are user interfaces that illustrate examples of the grounded description task.
Figure 8B:
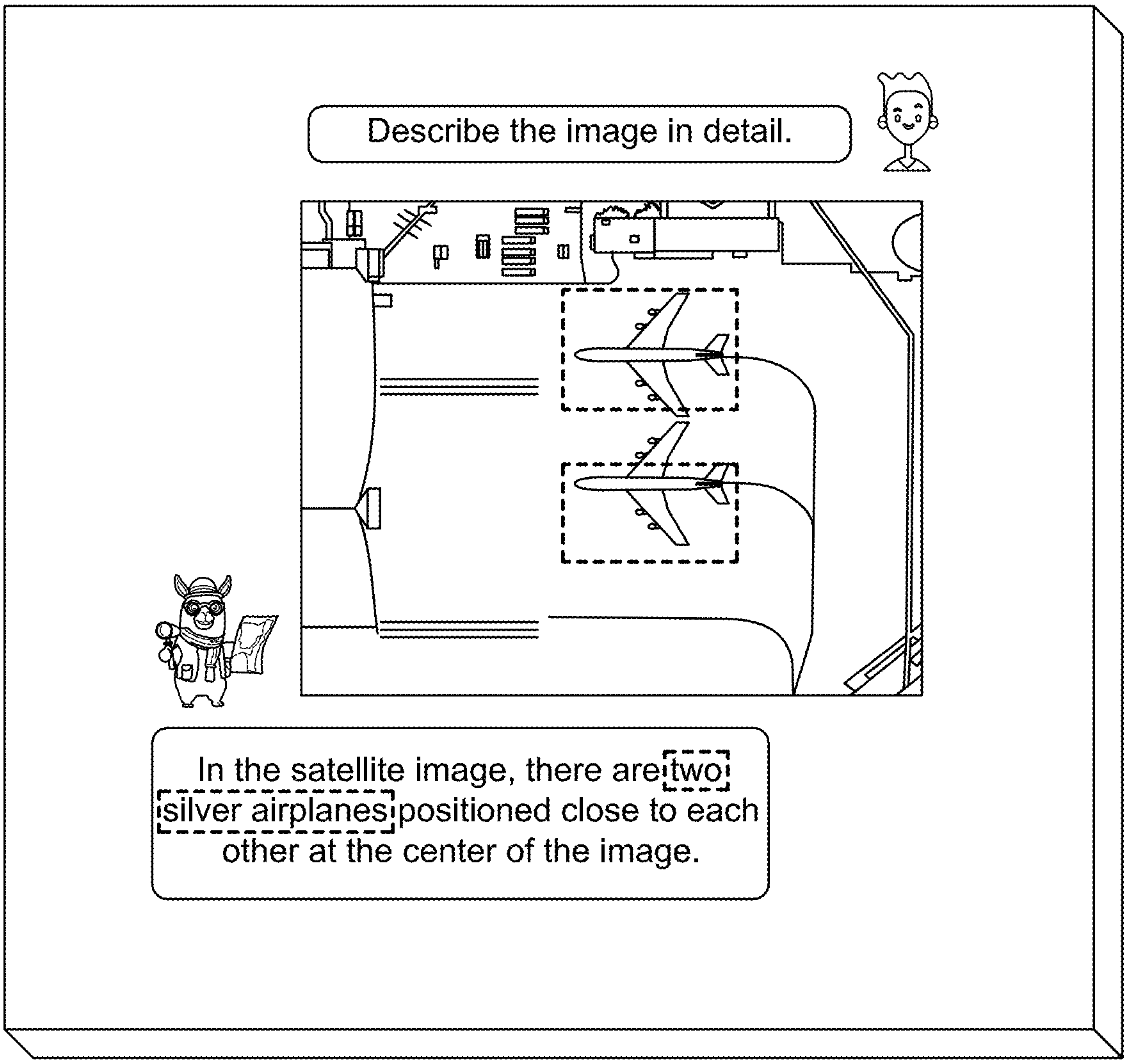
Figure 8C:
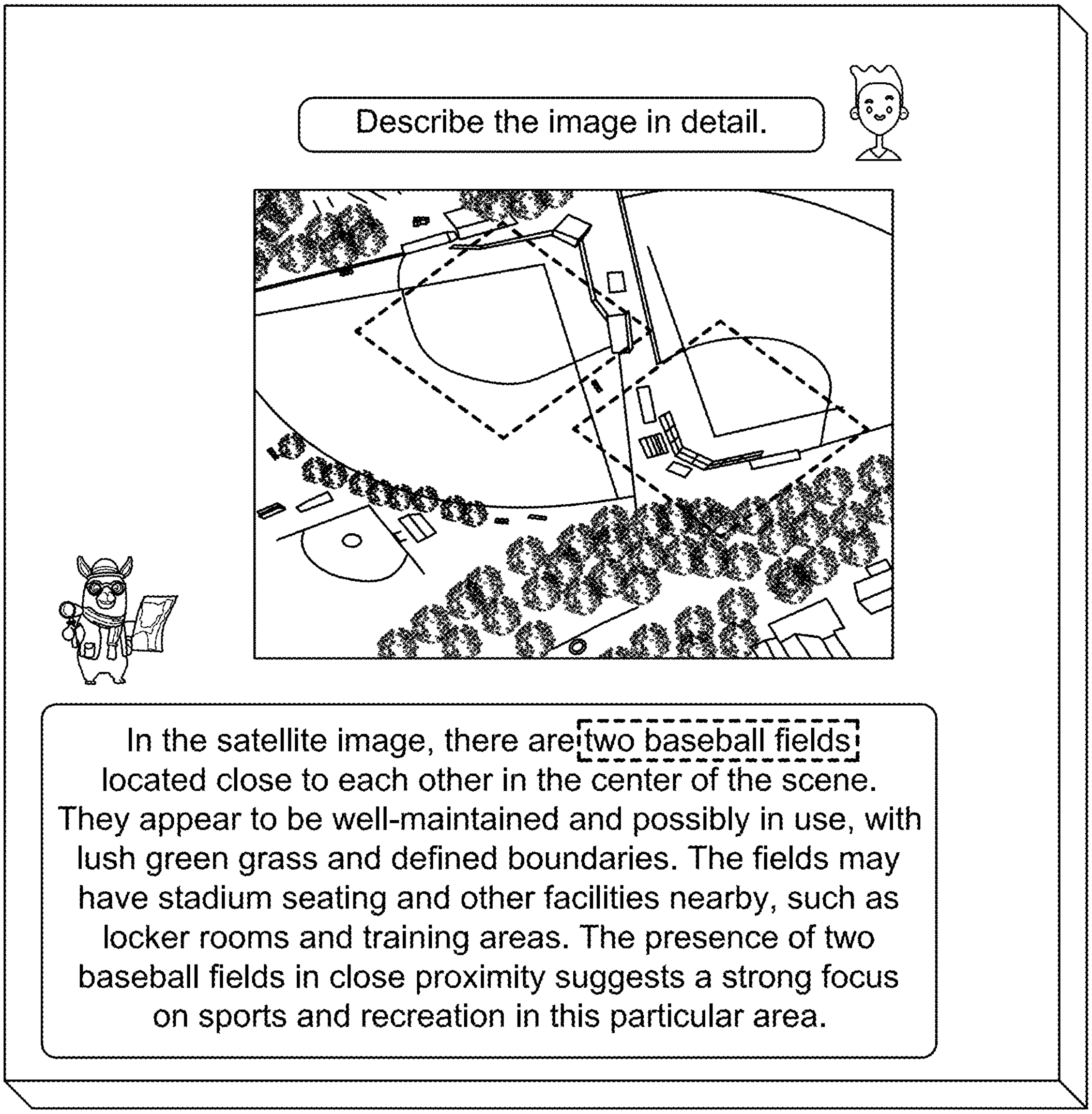
Figure 8D:
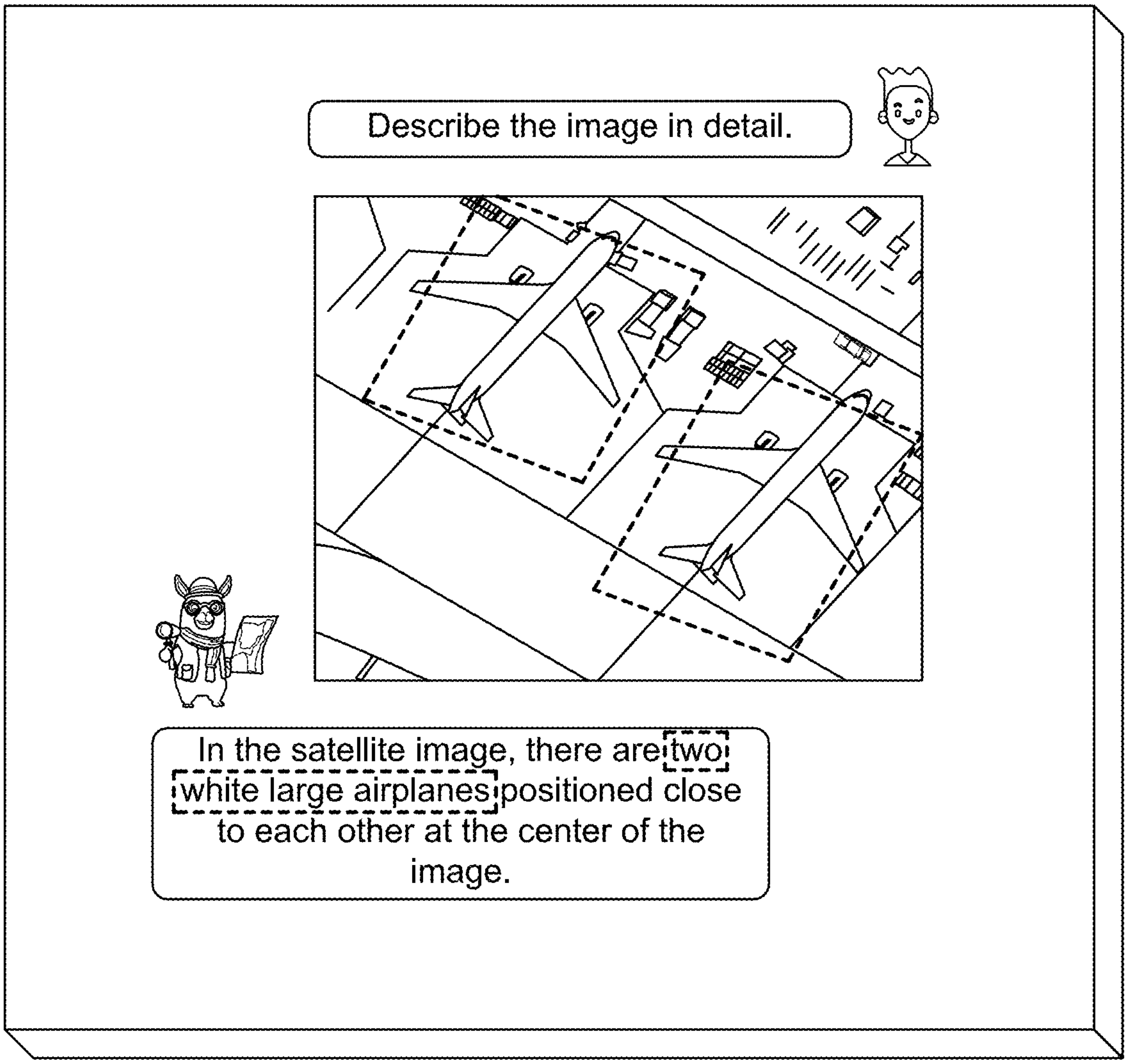
Figure 8E:
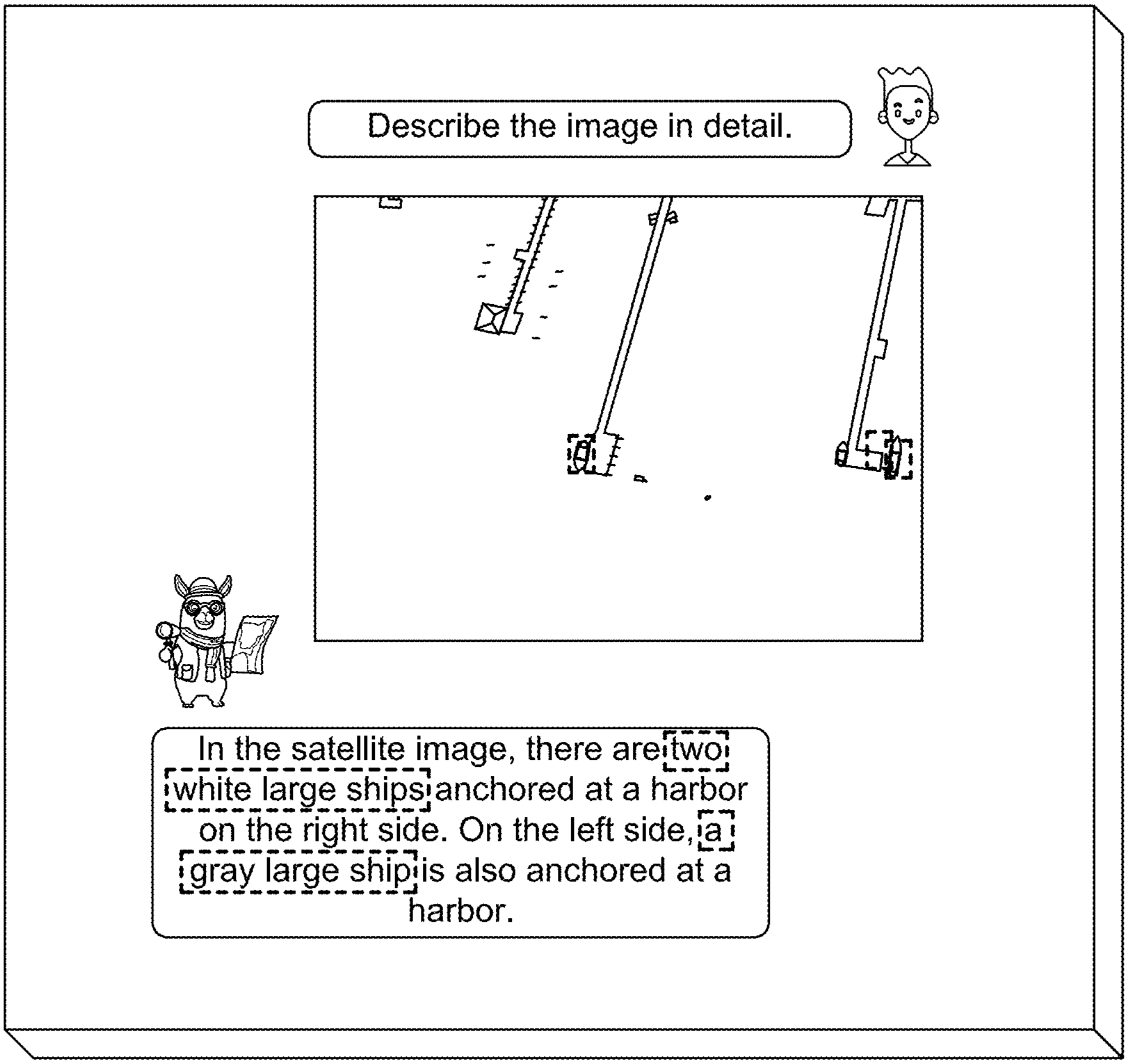
Figure 8F:
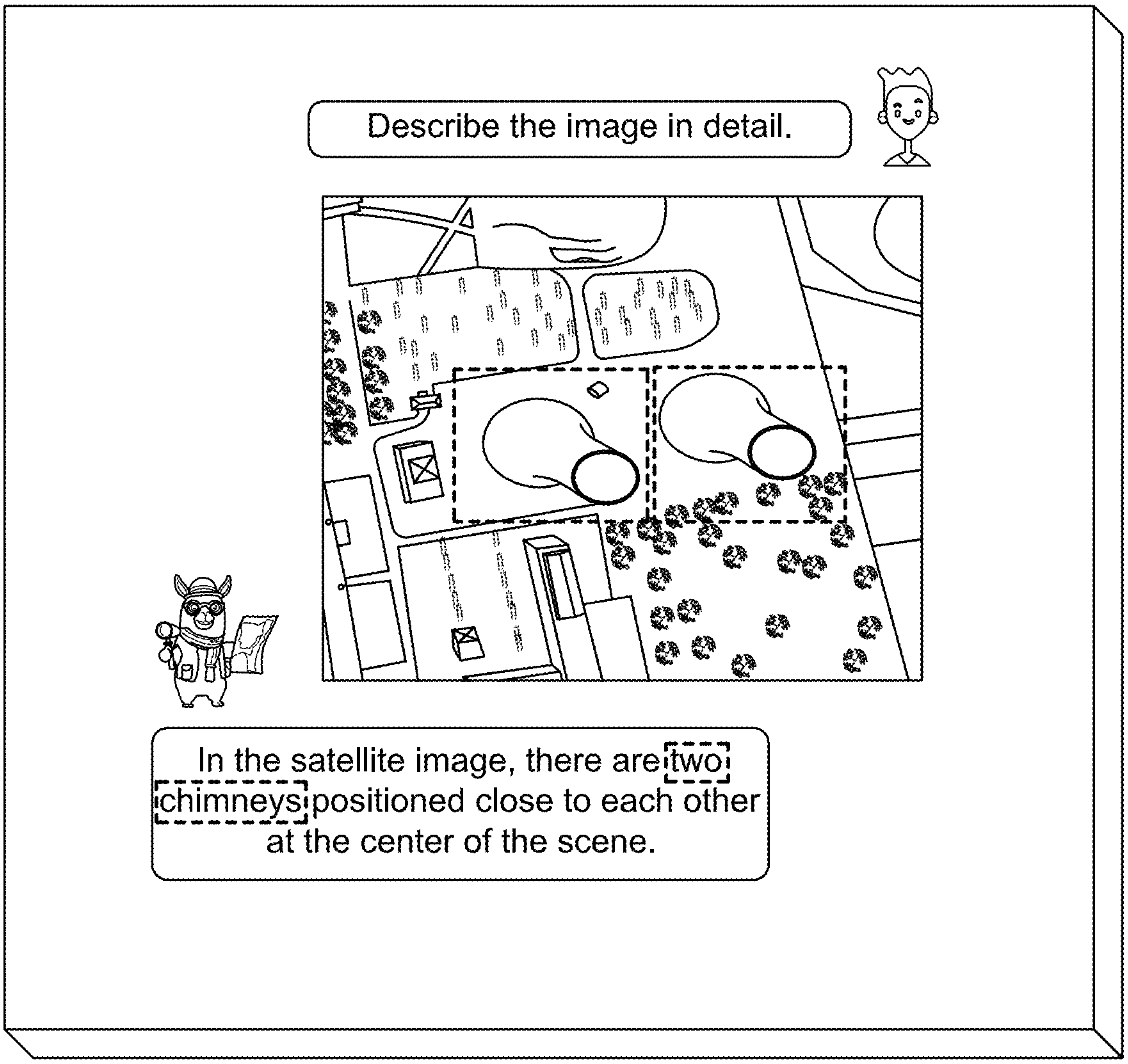
Figure 9A:
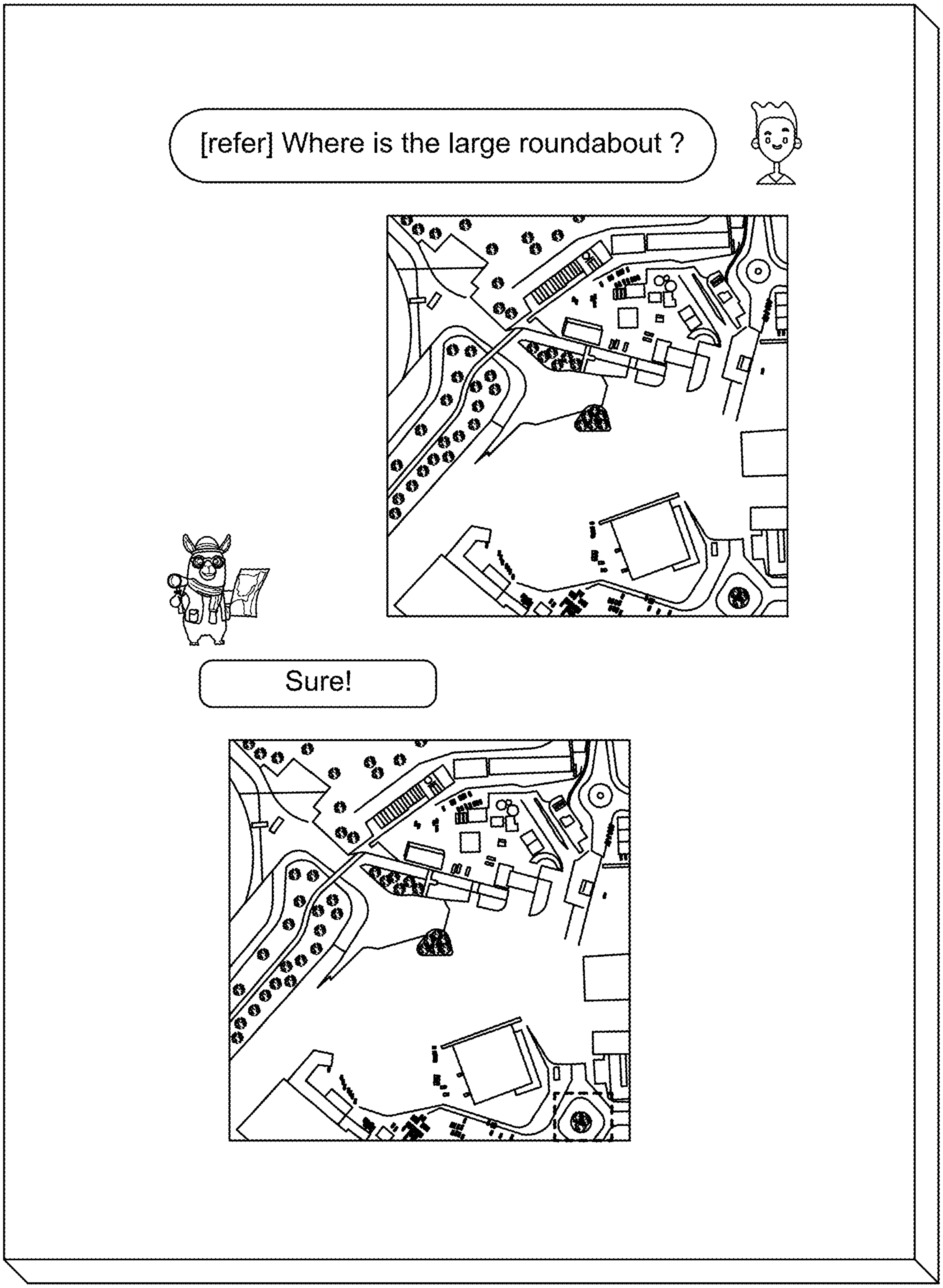
FIGS. 9A-9F are user interfaces that illustrate examples of the referring expression task.
Figure 9B:
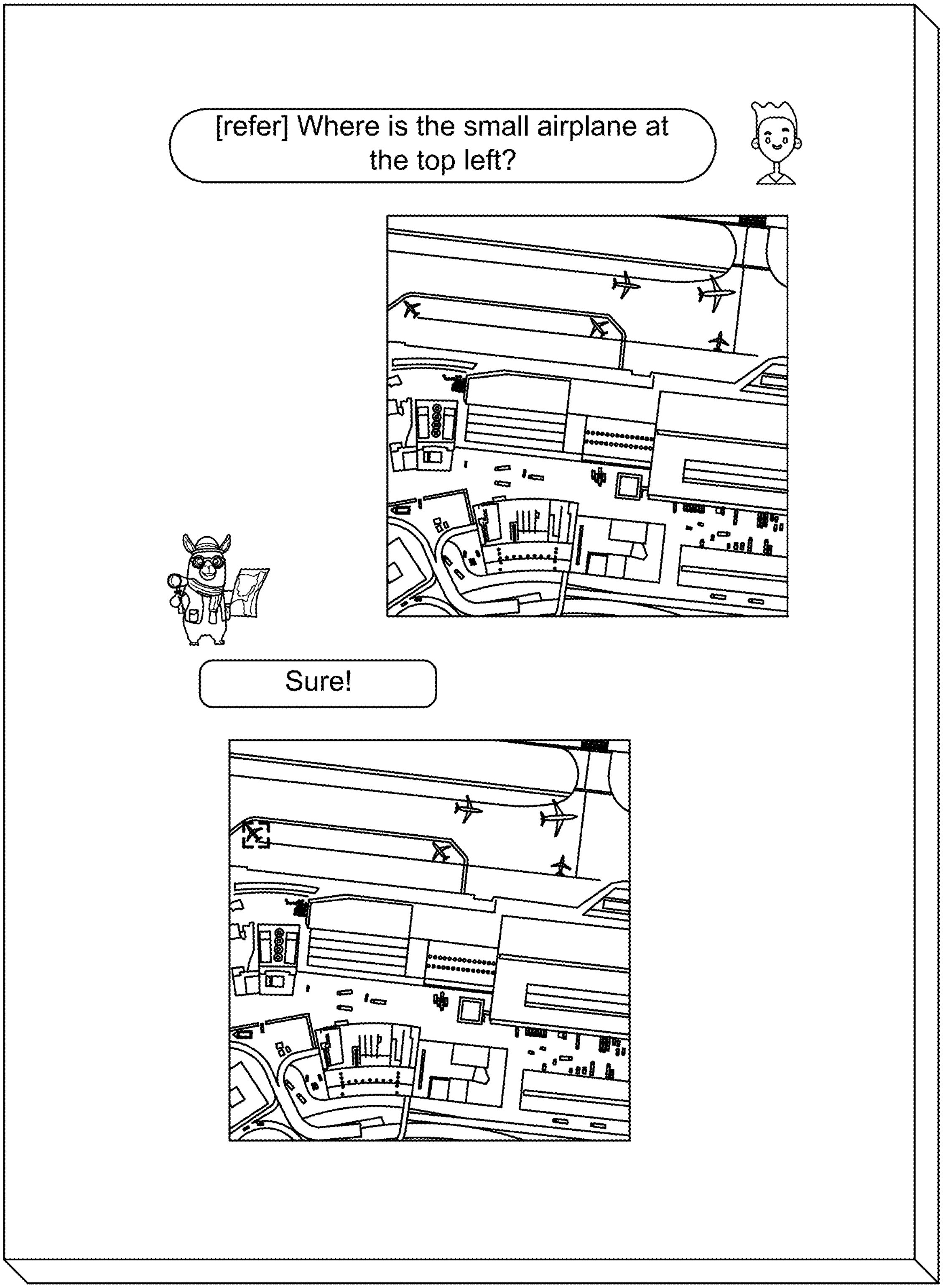
Figure 9C:
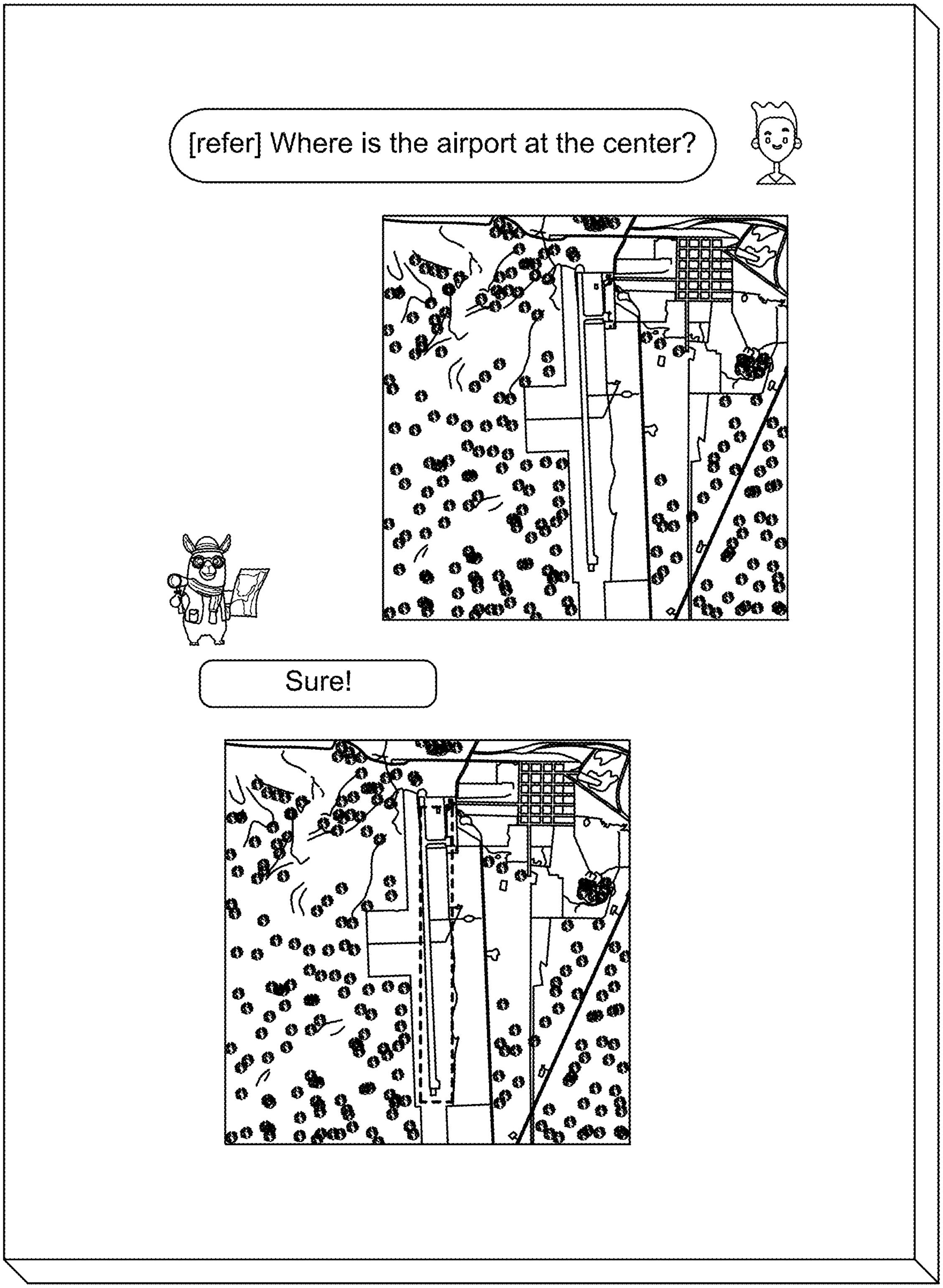
Figure 9D:
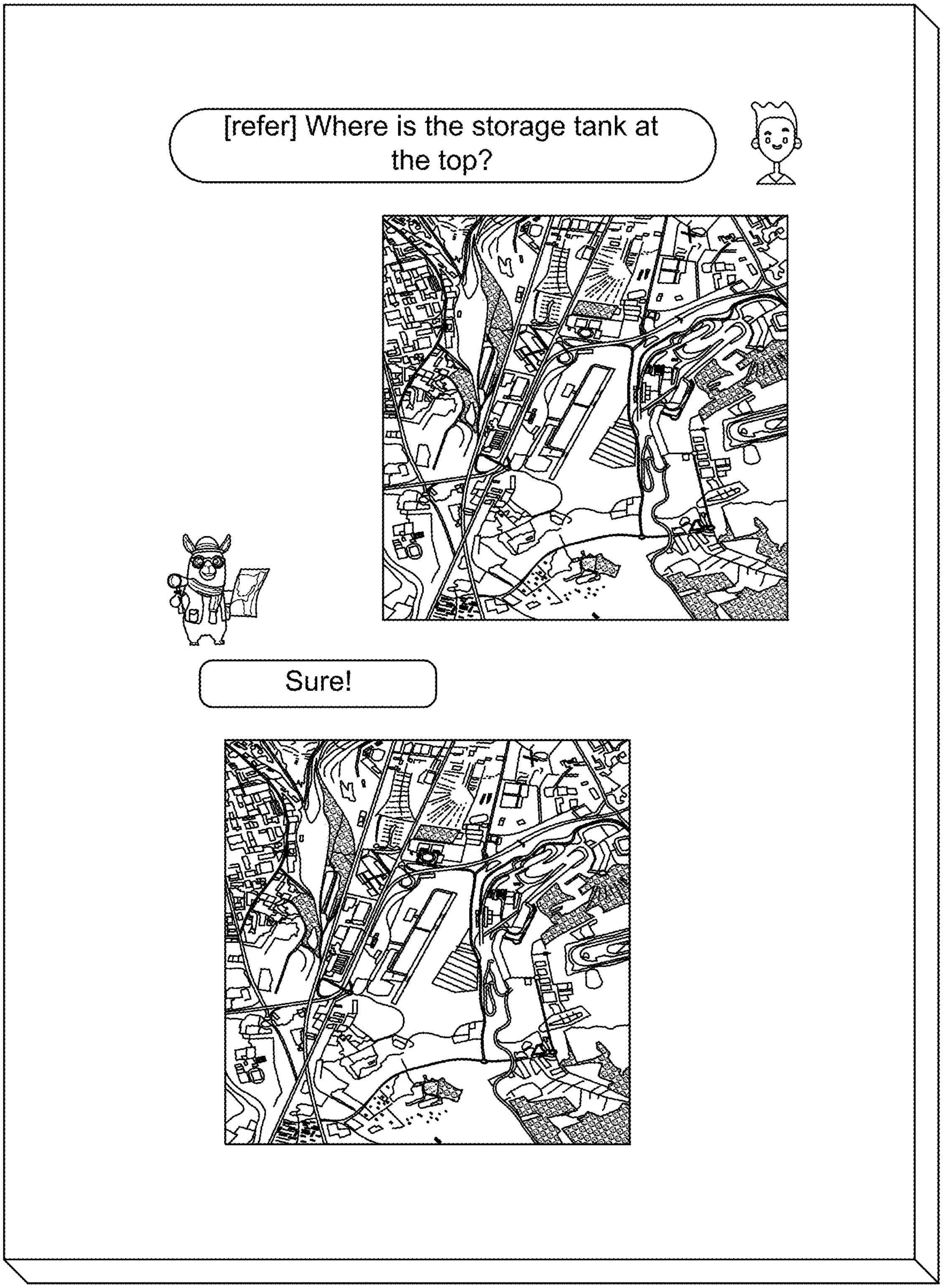
Figure 9E:
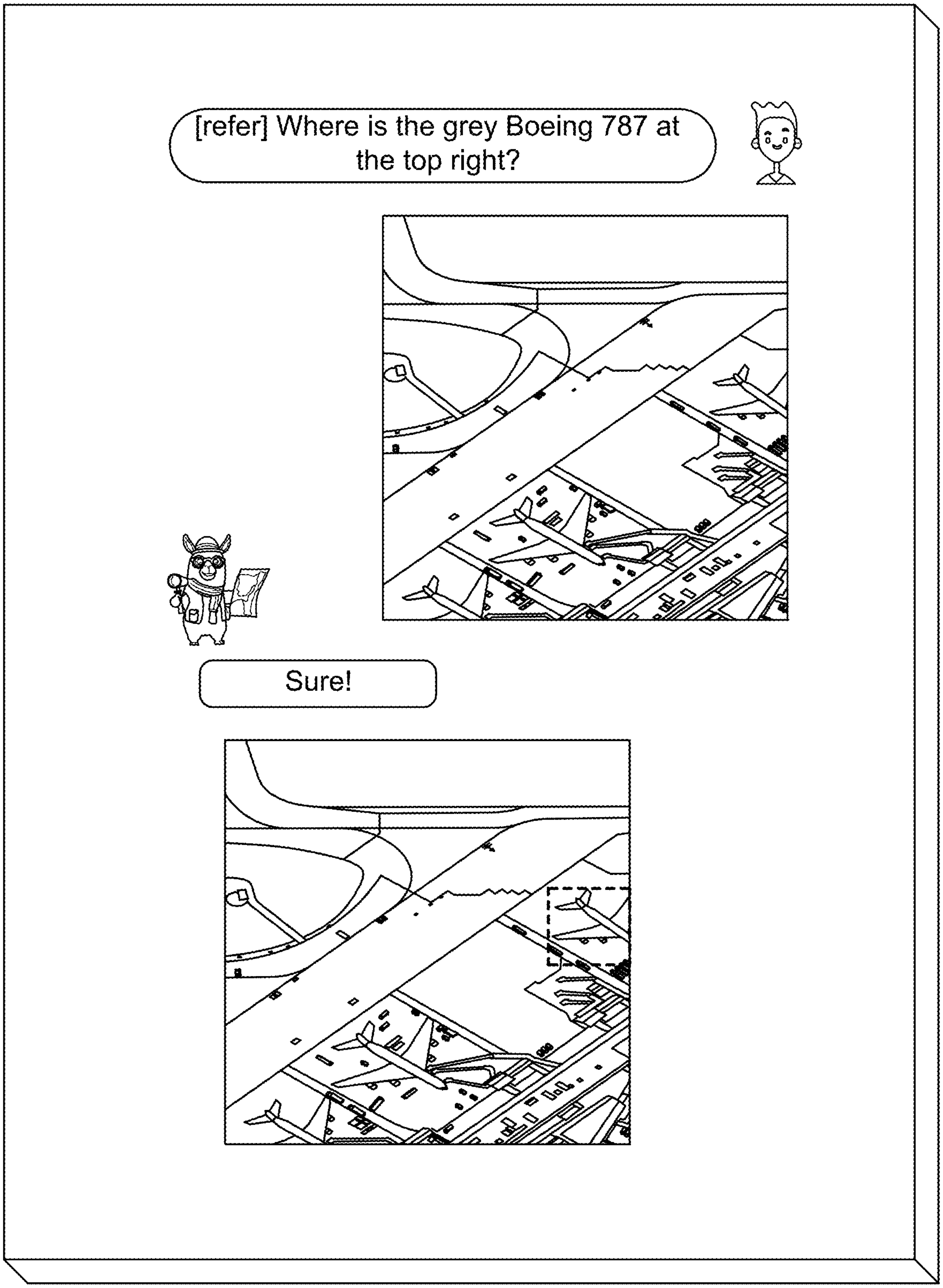
Figure 9F:
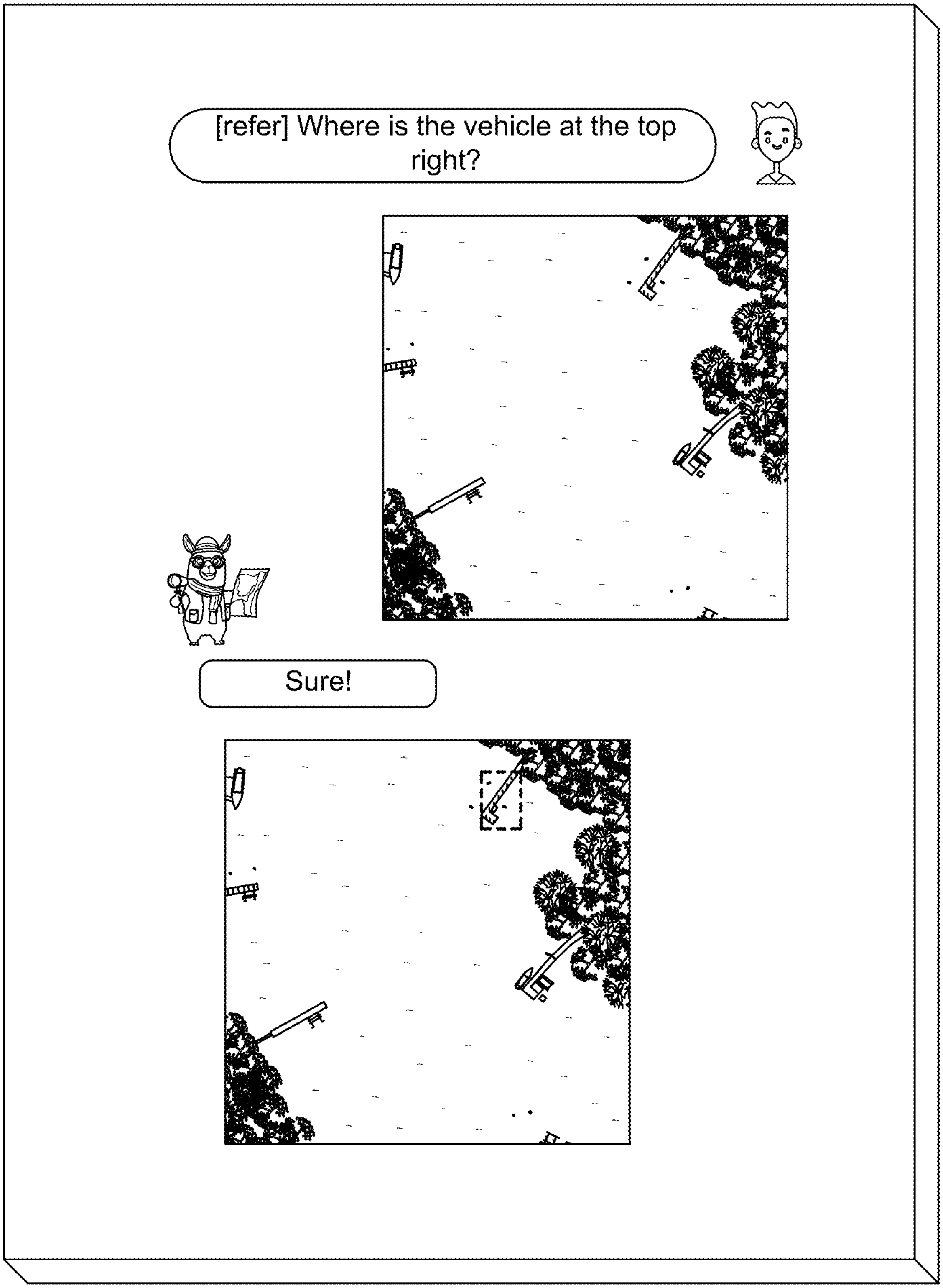
Figure 10A:
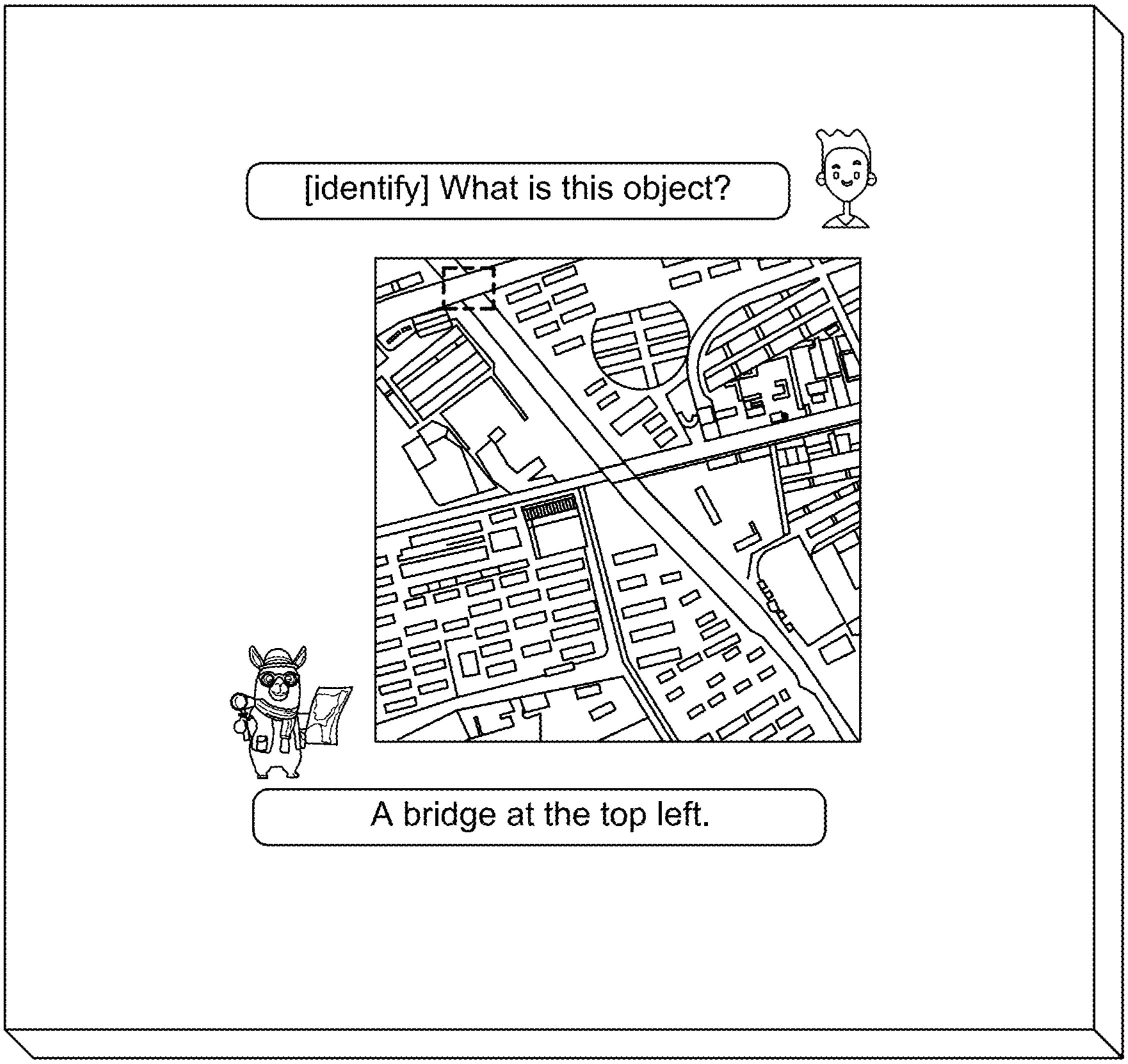
FIGS. 10A-10F are user interfaces that illustrate examples of the region description task.
Figure 10B:
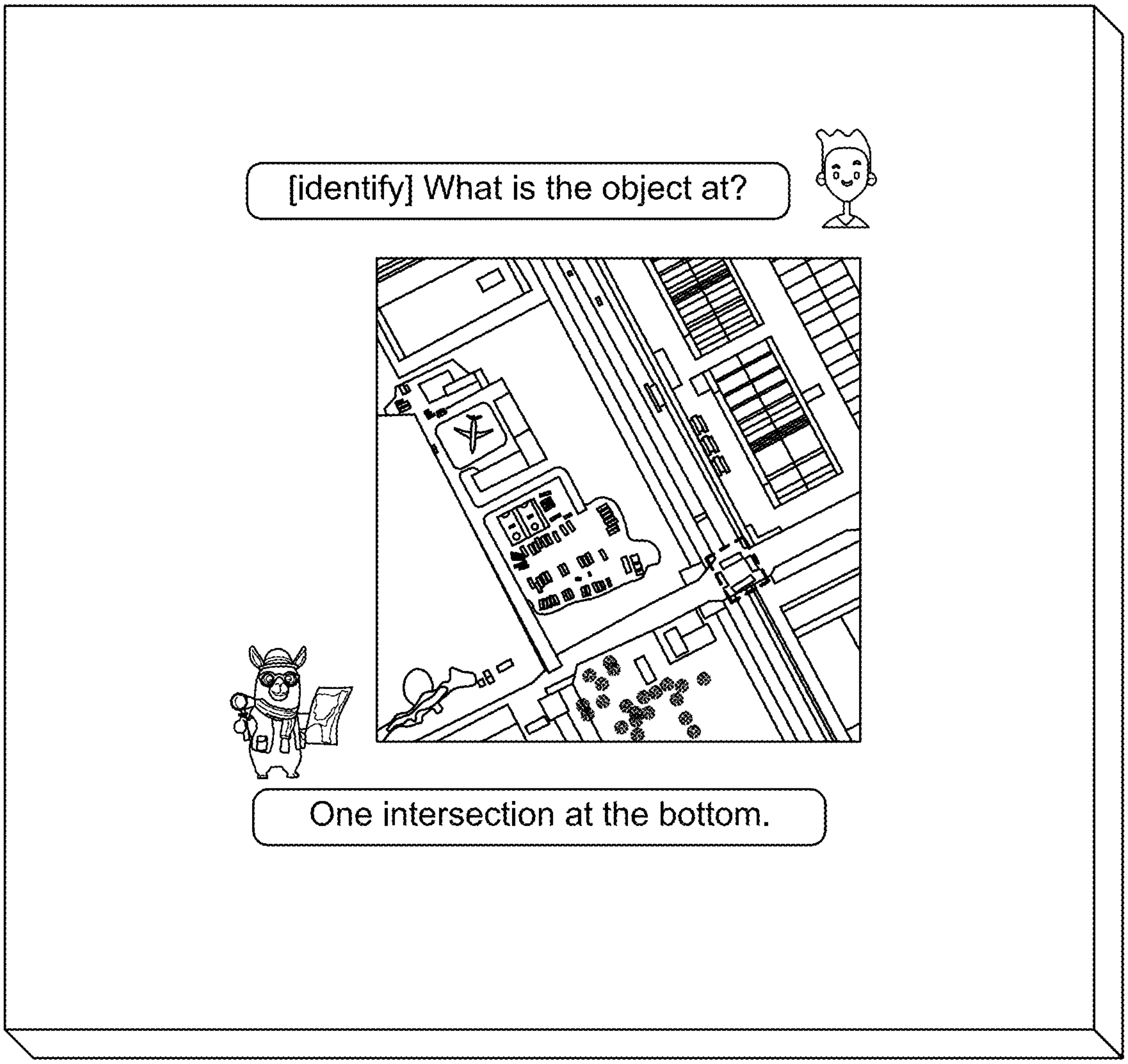
Figure 10C:
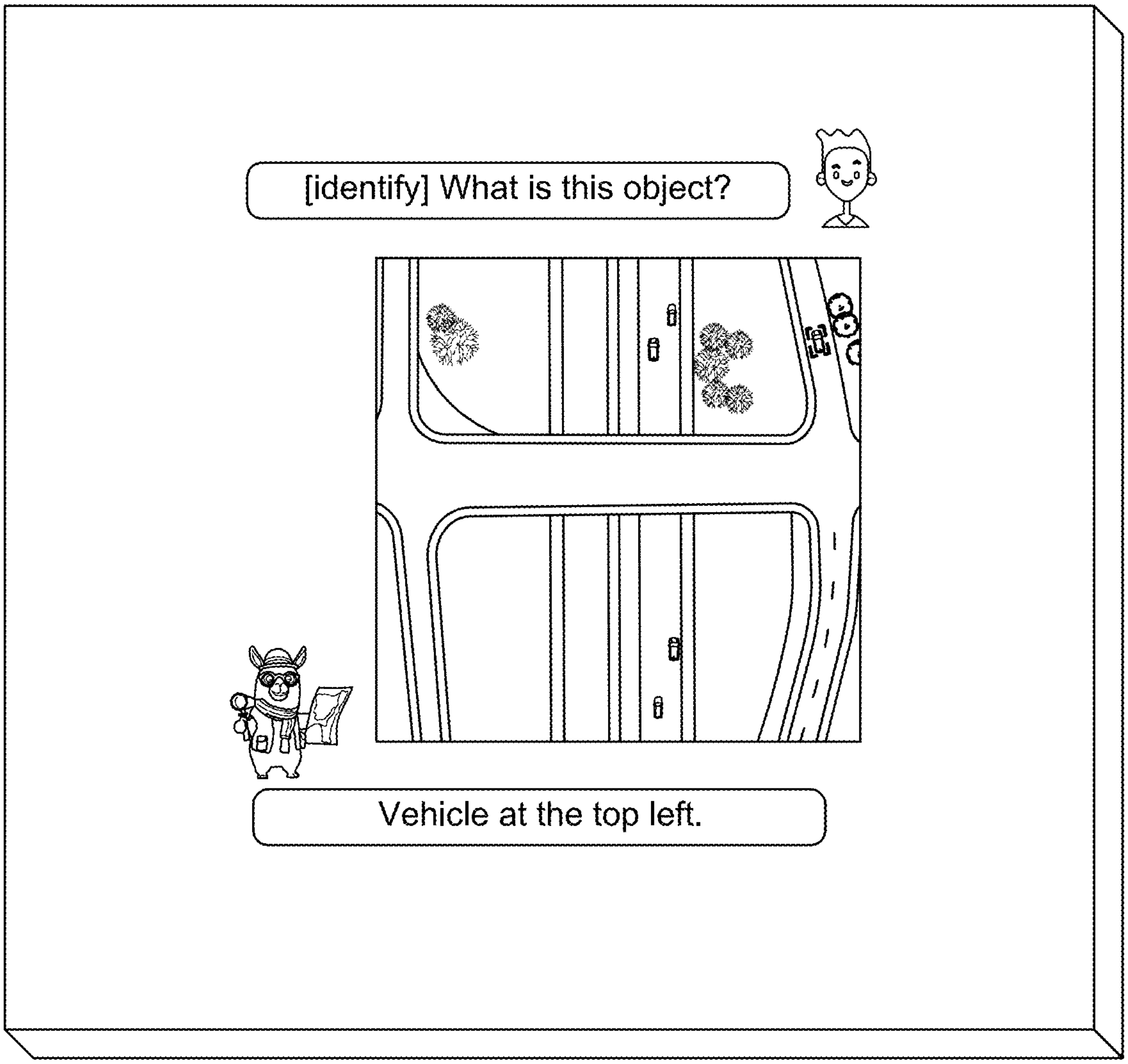
Figure 10D:
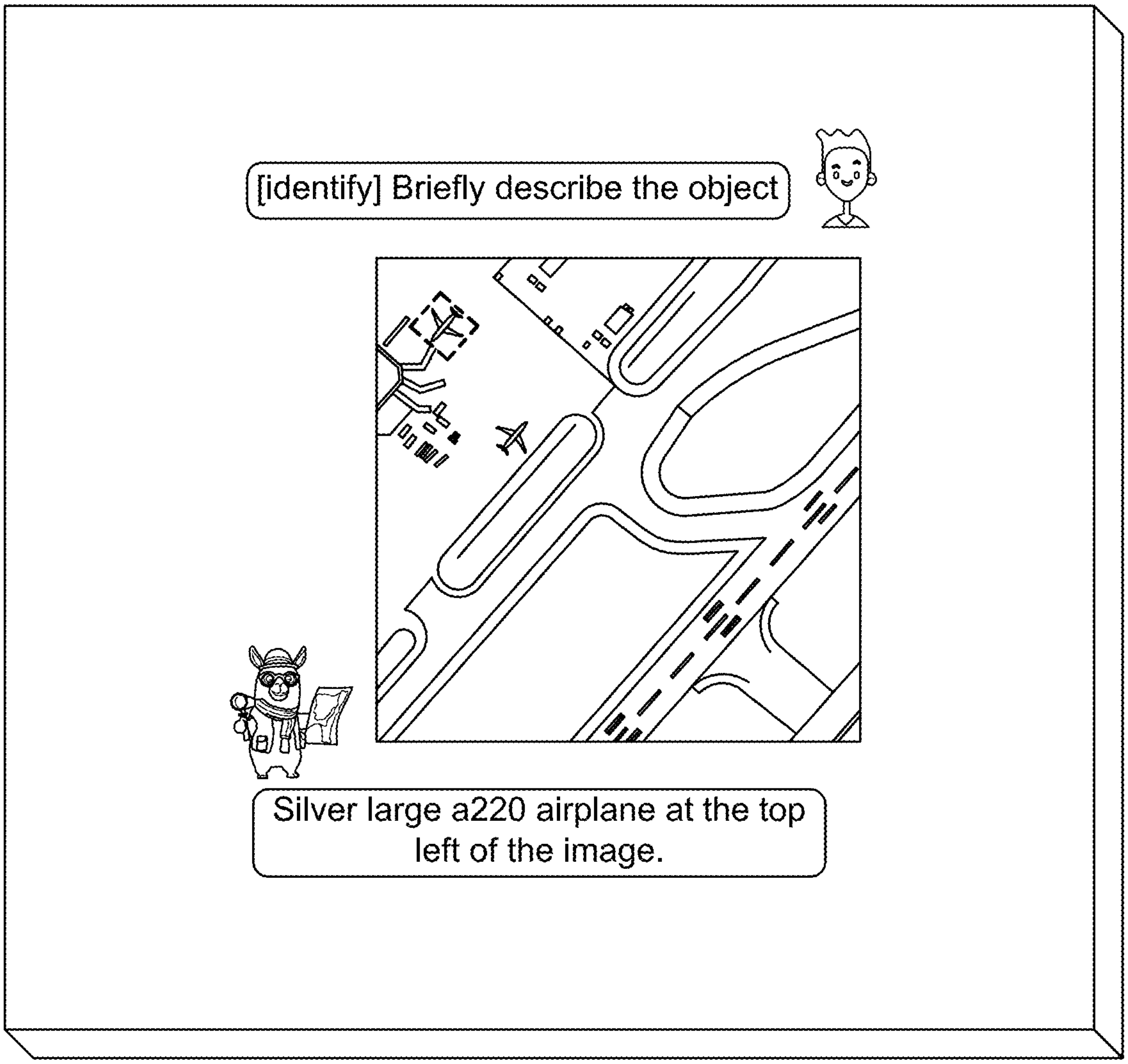
Figure 10E:
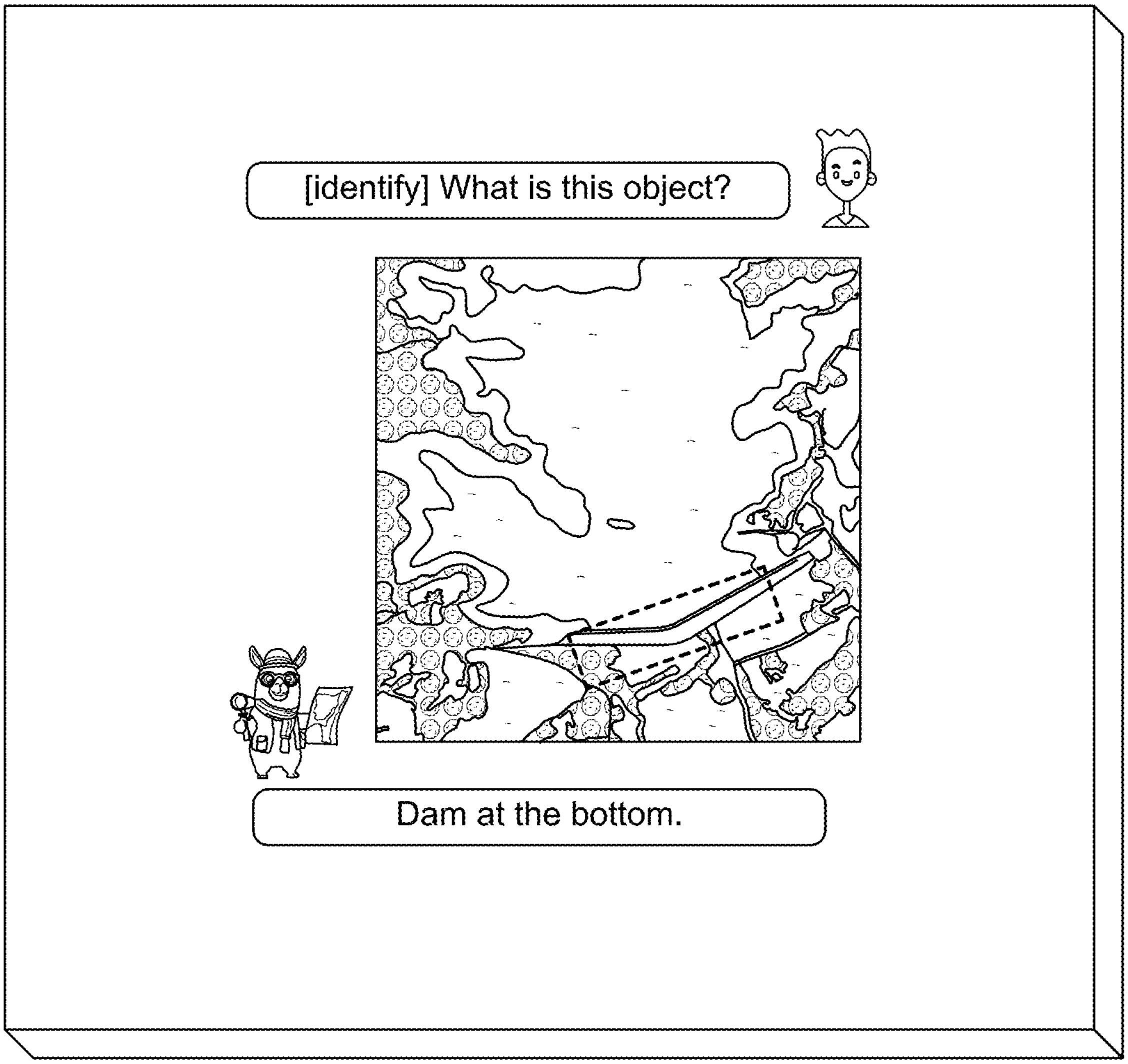
Figure 10F:
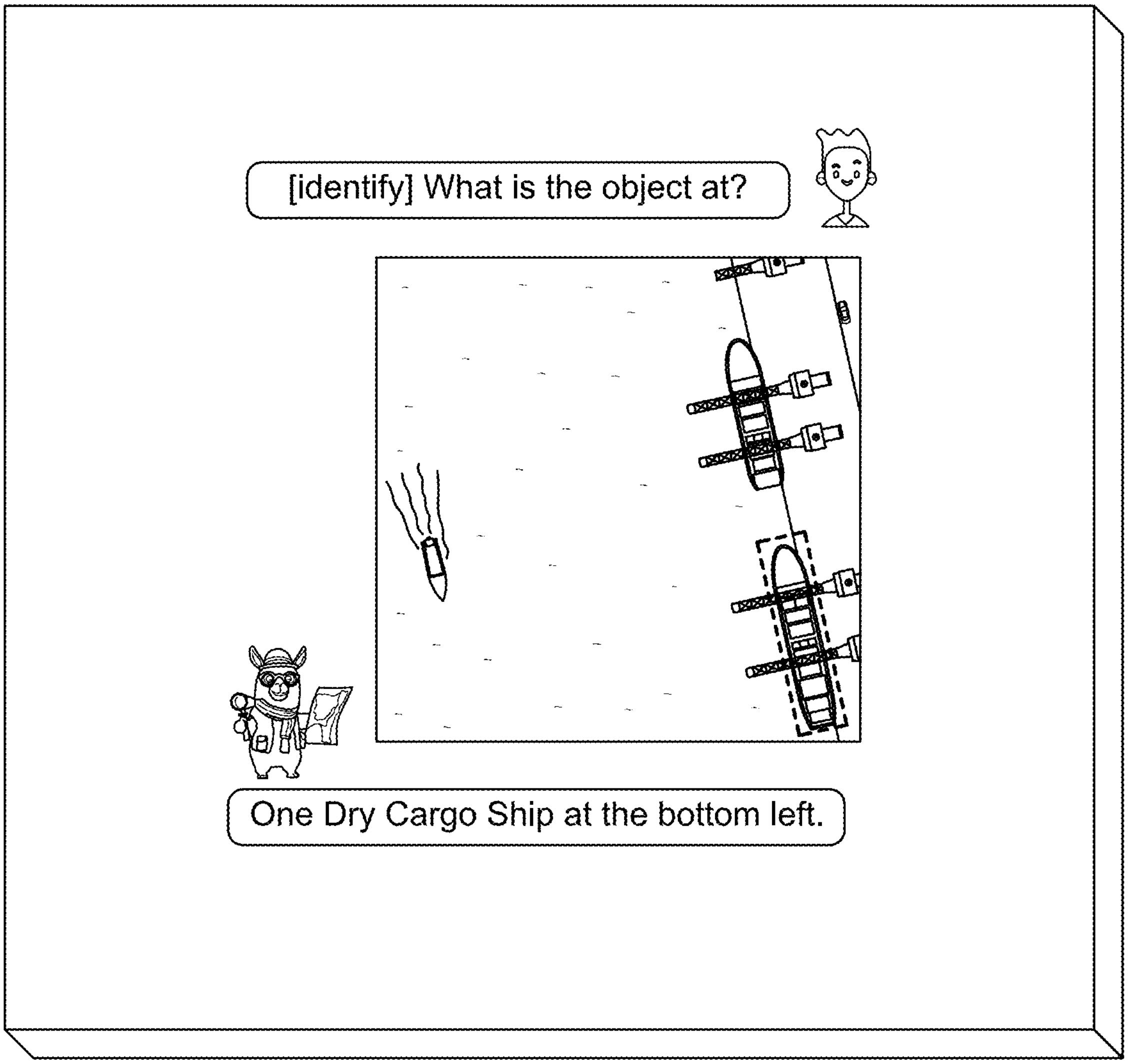

FIGS. 7A-7C are user interfaces that illustrate examples of the visual question answering task for GeoChat. GeoChat is able to hold multi-turn conversations, based on various types of questions, including presence, count, complex comparisons and so on. It is able to detect objects and hold conversations against low resolution images as well.

GeoChat performs close to the SOTA specialist models on RSVQA-LRBEN test set, which is RSGPT, finetuned on the target dataset for 5 iterations in comparison, also match the SOTA on urban-rural classification subset, as presented in Table 6. For RSVQA-HRBEN, GeoChat outperforms other VLM's in zero-shot setting on average accuracy by 3.9%, while beating the Comparison subset by 15.9% on LLaVA-v1.5, as shown in Table 8.

TABLE 6

Comparisons with general zero-shot (top) and RS-VQA specialized (middle) models on RSVQA-LRBEN dataset for VQA task. are evaluated in zero-shot setting, described in Sylvain Lobry, Diego Marcos, Jesse Murray, and Devis Tuia. Rsvqa: Visual question answering for remote sensing data. IEEE Transactions on Geoscience and Remote Sensing, 58(12): 8555-8566, 2020; Jinze Bai, Shuai Bai, Shusheng Yang, Shijie Wang, Sinan Tan, Peng Wang, Junyang Lin, Chang Zhou, and Jingren Zhou. Qwen-vl: A frontier large vision-language model with versatile abilities. *arXiv preprint arXiv: 2308.12966*, 2023; Jun Chen, Deyao Zhu, Xiaoqian Shen, Xiang Li, Zechun Liu, Pengchuan Zhang, Raghuraman Krishnamoorthi, Vikas Chandra, Yunyang Xiong, and Mohamed Elhoseiny. Minigpt-v2: large language model as a unified interface for vision-language multi-task learning. *arXiv preprint arXiv: 2310.09478*, 2023; and Haotian Liu, et al., *arXiv preprint arXiv: 2310.03744*, 2023.

| Method | Presence | Comparison | Rural/Urban | Avg. Accuracy |
|---|---|---|---|---|
| LLaVA-1.5 | 55.46 | 68.20 | 59.00 | 62.77 |
| Owen-vl-Chat | 38.57 | 67.59 | 61.00 | 55.35 |
| MiniGPTv2 | 55.16 | 55.22 | 39.00 | 54.96 |
| RSVQA | 87.47 | 81.50 | 90.00 | 86.32 |
| EasyToHard | 90.66 | 87.49 | 91.67 | 89.94 |
| Bi-Modal | 91.06 | 91.16 | 92.66 | 91.63 |

TABLE 6-continued

Comparisons with general zero-shot (top) and RS-VQA specialized (middle) models on RSVQA-LRBEN dataset for VQA task. are evaluated in zero-shot setting, described in Sylvain Lobry, Diego Marcos, Jesse Murray, and Devis Tuia. Rsvqa: Visual question answering for remote sensing data. IEEE Transactions on Geoscience and Remote Sensing, 58(12): 8555-8566, 2020; Jinze Bai, Shuai Bai, Shusheng Yang, Shijie Wang, Sinan Tan, Peng Wang, Junyang Lin, Chang Zhou, and Jingren Zhou. Qwen-vl: A frontier large vision-language model with versatile abilities. *arXiv preprint arXiv: 2308.12966*, 2023; Jun Chen, Deyao Zhu, Xiaoqian Shen, Xiang Li, Zechun Liu, Pengchuan Zhang, Raghuraman Krishnamoorthi, Vikas Chandra, Yunyang Xiong, and Mohamed Elhoseiny. Minigpt-v2: large language model as a unified interface for vision-language multi-task learning. *arXiv preprint arXiv: 2310.09478*, 2023; and Haotian Liu, et al., *arXiv preprint arXiv: 2310.03744*, 2023.

| Method | Presence | Comparison | Rural/Urban | Avg. Accuracy |
|---|---|---|---|---|
| SHRNet | 91.03 | 90.48 | 94.00 | 91.84 |
| RSGPT | 91.17 | 91.70 | 94.00 | 92.29 |
| GeoChat | 91.09 | 90.33 | 94.00 | 90.70 |

As shown in Table 6, GeoChat outperforms other zero-shot models and performs competitively to SoTA-supervised models like RSGPT which are specifically finetuned on target dataset (while the model of the present disclosure is a generic model not specifically finetuned on target dataset), described in Haotian Liu, et al., *arXiv preprint arXiv:* 2310.03744, 2023; Yakoub Bazi, Mohamad Mahmoud Al Rahhal, Mohamed Lamine Mekhalfi, Mansour Abdulaziz Al Zuair, and Farid Melgani. Bi-modal transformer-based approach for visual question answering in remote sensing imagery. *IEEE Transactions on Geoscience and Remote Sensing,* 60:1-11, 2022, each incorporated herein by reference in their entirety.

4. Visual Grounding

Datasets for evaluation. For the evaluation of grounding tasks, a new benchmark contains different referring and grounding tasks. The validation set is used and the same dataset used for the creation pipeline is used to construct the test benchmark. There are a total of 7653 [refer], 758 [grounding], and 555 grounding description questions. An accuracy@0.5 is used as the evaluation metric. Accuracy is calculated if the predicted box has an overlap of more than 0.5 IoU with the ground-truth box.

FIGS. 8A-8F are user interfaces that illustrate examples of the grounded description task. When asked to describe the image with the special token '[grounding]', GeoChat outputs both the description of the image as well as the bounding boxes for all the objects detected.

FIGS. 9A-9F are user interfaces that illustrate examples of the referring expression task. When asked about an object as a referred expression, GeoChat is able to locate it and draw rotated bounding boxes around it correspondingly.

FIGS. 10A-10F are user interfaces that illustrate examples of the region description task. Given a bounding box, GeoChat is able to provide brief descriptions about the area or the object covered by the bounding box.

Results. Table 7 shows the performance of the GeoChat method and MiniGPT-4-v2 on the benchmark. Overall, the GeoChat model performance is low on small objects or when it has to predict multiple boxes. Compared to MiniGPT-4-v2, the GeoChat model works better on medium size images. On the grounding description task, calculate both, the IoU for the multiple bounding boxes generated as well as the text answer generated. The GeoChat model provides a better description with slightly better box accuracy than MiniGPT-4-v2 (Table 9). As for region-level captioning, both models are evaluated based on the text accuracy with ground truth region-level captions (Table 10). The model significantly outperforms MiniGPT-4-v2 in terms of ROUGE and METEOR score.

TABLE 7

| Performance (acc@0.5%) comparison of GeoChat on the benchmark. | | | | | | | | |
|---|---|---|---|---|---|---|---|---|
| Model | Small | Medium | Large | Single-object grounding | Multi-object grounding | [refer] | [grounding] | Overall |
| MiniGPTv2 | 1.7 | 9.9 | 21.9 | 9.1 | 3.6 | 8.2 | 2.6 | 7.6 |
| GeoChat | 2.9 | 13.6 | 21.7 | 16.0 | 4.3 | 10.5 | 11.8 | 10.6 |

In Table 7, small, medium and large refer to the size of the objects based on the bounding box area. Single/multi-object refer to how many objects the question asks the model to predict. [refer]: object referenced using one attribute from a2, a3 or a4 in Table 3. [grounding]: objects referenced using a combination of attributes from a1-a5 in Table 3. Overall, GeoChat outperforms the baseline, but there is still significant room for further improvement on this complex task.

TABLE 8

| Comparison with other general ZS model's on RSVQA-HRBEN dataset for visual qa. | | | |
|---|---|---|---|
| Model | Presence | Comparison | Average Accuracy |
| Qwen-VL | 66.44 | 60.41 | 63.06 |
| LLaVA-1.5 | 69.83 | 67.29 | 68.40 |
| MiniGPTv2 | 40.79 | 50.91 | 46.46 |
| GeoChat | 58.45 | 83.19 | 72.30 |

In Table 8, all models have not been trained on the target dataset. GeoChat performs favorably well compared to generic VLMs.

TABLE 9

| Results on grounding description task. | | | |
|---|---|---|---|
| Model | acc@0.5 | acc@.25 | METEOR |
| MiniGPTv2 | 10.8 | 30.9 | 16.4 |
| GeoChat | 11.7 | 33.9 | 48.9 |

TABLE 10

| Region level captioning performance. | | | |
|---|---|---|---|
| Model | ROUGE-1 | ROUGE-L | METEOR |
| MiniGPTv2 | 32.1 | 31.2 | 10.0 |
| GeoChat | 87.3 | 87.2 | 83.9 |

Figure 11:
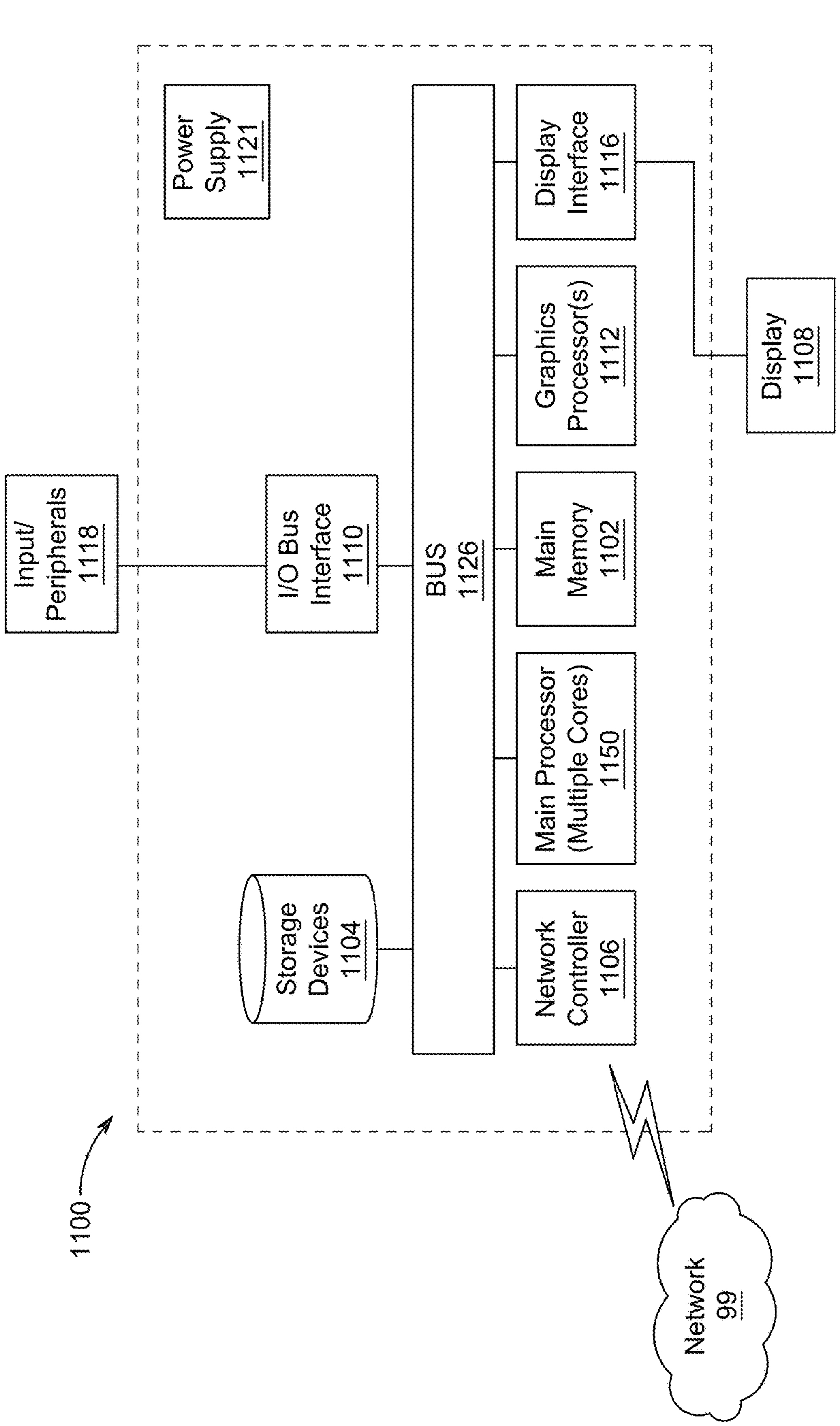
FIG. 11 is a block diagram illustrating an exemplary computer system for machine learning.

FIG. 11 is a block diagram illustrating an example computer system for implementing the machine learning training and inference methods according to an exemplary aspect of the disclosure. The computer system may be an AI workstation running an operating system, for example Ubuntu Linux OS, Windows, a version of Unix OS, or Mac OS. The computer system 1100 may include one or more central processing units (CPU) 1150 having multiple cores. The computer system 1100 may include a graphics board 1112 having multiple GPUs, each GPU having GPU memory. The graphics board 1112 may perform many of the mathematical operations of the disclosed machine learning methods. The computer system 1100 includes main memory 1102, typically random access memory RAM, which contains the software being executed by the processing cores 1150 and GPUs 1112, as well as a non-volatile storage device 1104 for storing data and the software programs. In preferred embodiments, the above-described machine learning models are software programs stored in a repository, for example GitHub, available for download. In preferred embodiments, the software programs are implemented using PyTorch or Tensorflow, configured for execution using GPUs.

Several interfaces for interacting with the computer system 1100 may be provided, including an I/O Bus Interface 1110, Input/Peripherals 1118 such as a keyboard, touch pad, mouse, Display Adapter 1116 and one or more Displays 1108 for displaying the above exemplary user interfaces, and a Network Controller 1106 to enable wired or wireless communication through a network 99. The interfaces, memory and processors may communicate over the system bus 1126. The computer system 1100 includes a power supply 1121, which may be a redundant power supply.

In some embodiments, the computer system 1100 may include a server CPU and a graphics card by NVIDIA, in which the GPUs have multiple CUDA cores. In some embodiments, the computer system 1100 may include a machine learning engine 1112.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A unified framework system for a computer implemented artificial intelligent assistant to perform multiple tasks for remote sensing, comprising:

task input field for receiving a task identity;

a global image encoder configured to receive a remote-sensing image and a user query and encode patch-level tokens at a high resolution via interpolation positional encodings using the remote-sensing image and the user query;

an MLP adapter configured to receive the patch-level tokens and adapt the patch-level tokens to a language space; and a large language model configured to generate natural language responses interleaved with corresponding object locations based on the language space and task specific prompts, wherein the global image encoder further includes a region input field for receiving region location parameters, and wherein the framework system is configured to switch based on the received task identity between different types of remote sensing visual interpretation tasks.

2. The unified framework system of claim 1, wherein the large language model is configured to accept and output region locations represented as box locations in a textual format to express a geographical position.

3. The unified framework system of claim 1, wherein the large language model, having a frozen full matrix, is trained by finetuning two small matrices in an adapter that approximate the full matrix of the large language model, and during inference, feeding the fine-tuned adaptor into a pretrained encoder and a pretrained MLP adapter.

4. The unified framework system of claim 1, wherein the large language model is finetuned to adapt the framework system for remote sensing images, where remote sensing images are aerial images taken at multiple scales.

5. The unified framework system of claim 1, wherein the framework system, when trained, is configured to, given suitable task tokens and user queries, generate visually grounded responses, including text with corresponding object locations, visual question answering on images and regions, scene classification, and normal natural language conversations.

6. The unified framework system of claim 1, wherein the global image encoder is configured to interpolate a positional encoding to scale with images sizes of 504×504.

7. The unified framework system of claim 1, wherein the large language model is configured to construct textual representations of bounding boxes to express spatial coordinates for the visual grounding tasks.

8. The unified framework system of claim 1, wherein the large language model is configured to take system prompts appended together within given inputs.

9. The unified framework system of claim 1, wherein the large language model is constructed by finetuning two matrices, where updates are constrained such that a weight matrix is frozen, while the two matrices contain trainable parameters.

10. The unified framework system of claim 1, wherein given a task token and a user query, the large language model is configured to perform multiple tasks including visually grounded responses, visual question answering on images and regions as well as scene classification and normal natural language conversations.

11. A non-transitory computer-readable storage medium including computer executable instructions, wherein the instructions, when executed by a computer, cause the computer to perform a method for performing multiple tasks for remote sensing, by a unified framework system, the method comprising:

inputting a remote-sensing image and a user query;

receiving a task identity;

encoding, by a global image encoder, patch-level tokens at a high resolution via interpolation positional encodings using the remote-sensing image and user query;

receiving, by an MLP adapter, the patch-level tokens and adapting the patch-level tokens to language space; and generating, by a large language model, natural language responses interleaved with corresponding object locations based on the language space and task specific prompts, receiving, by the global image encoder, region location parameters; and switching, based on the received task identity, between different types of remote sensing visual interpretation tasks.

12. The computer-readable storage medium of claim 11, wherein receiving as input or output, at the large language model, region locations represented as box locations in a textual format to express a geographical position.

13. The computer-readable storage medium of claim 11, wherein training the large language model, having a frozen full matrix, by, finetuning two small matrices in an adapter that approximate the full matrix of the large language model, and during inference, feeding the fine-tuned adaptor into a pretrained encoder and a pretrained MLP adapter.

14. The computer-readable storage medium of claim 11, further comprising finetuning the large language model to adapt the framework system for remote sensing images, where remote sensing images are aerial images taken at multiple scales.

15. The computer-readable storage medium of claim 11, further comprising given suitable task tokens and user queries, generating, by the trained framework system, visually grounded responses, including text with corresponding object locations, visual question answering on images and regions, scene classification, and normal natural language conversations.

16. The computer-readable storage medium of claim 11, further comprising interpolating, by the global image encoder, a positional encoding to scale with images sizes of 504×504.

17. The computer-readable storage medium of claim 11, further comprising constructing, by the large language model, textual representations of bounding boxes to express spatial coordinates for the visual grounding tasks.

18. The computer-readable storage medium of claim 11, further comprising receiving, by the large language model, system prompts appended together within given inputs.

19. The computer-readable storage medium of claim 11, further comprising finetuning, by the large language model, two matrices, where updates are constrained such that a weight matrix is frozen, while the two matrices contain trainable parameters.

20. The computer-readable storage medium of claim 11, wherein given a task token and a user query, performing, by the large language model, multiple tasks including visually grounded responses, visual question answering on images and regions as well as scene classification and normal natural language conversations.

* * * * *